(12) United States Patent
Chase et al.

(10) Patent No.: US 9,223,720 B2
(45) Date of Patent: Dec. 29, 2015

(54) SYSTEMS AND METHODS FOR RAPIDLY GENERATING SUITABLE PAIRS OF HASH FUNCTIONS

(71) Applicant: Oracle International Corporation, Redwood City, CA (US)

(72) Inventors: David R. Chase, Belmont, MA (US); Nils Gura, Belmont, CA (US); Guy L. Steele, Jr., Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 188 days.

(21) Appl. No.: 14/106,476

(22) Filed: Dec. 13, 2013

(65) Prior Publication Data

US 2015/0169467 A1 Jun. 18, 2015

(51) Int. Cl.
*G06F 12/10* (2006.01)
*H04L 12/54* (2013.01)
*G06F 17/30* (2006.01)

(52) U.S. Cl.
CPC ...... *G06F 12/1018* (2013.01); *G06F 17/30949* (2013.01); *H04L 12/5689* (2013.01)

(58) Field of Classification Search
CPC .................................................. G06F 12/1018
USPC ......................................................... 711/216
See application file for complete search history.

(56) References Cited

PUBLICATIONS

F. C. Botelho, D. Menoti, N. Ziviani. "A new algorithm for constructing minimal perfect hash functions", Technical Report TR004/04, Department of Computer Science, Federal University of Minas Gerais, pp. 1-13, 2004.
Buhler, Jeremy. Mercury BLAST dictionaries: Analysis and performance measurement. Report 2007-13. Depart of Computer Science and Engineering, Washington University in St. Louis, Mo. February, pp. 1-9, 2007.
J.Lawrence Carter, Mark N. Wegman, Universal classes of hash functions. Journal of Computer and System Sciences, vol. 18, Issue 2, Apr. 1979, pp. 143-154. ISSN 0022-0000.
Z.J. Czech, G. Havas, and B.S. Majewski. An optimal algorithm for generating minimal perfect hash functions, Information Processing Letters, 43(5):257-264, 1992.
Rasmus Pagh and Flemming Friche Rodler. 2004. Cuckoo hashing. J. Algorithms 51, 2 (May 2004), 122-144.

(Continued)

*Primary Examiner* — Cheng-Yuan Tseng
*Assistant Examiner* — Zubair Ahmed
(74) *Attorney, Agent, or Firm* — Robert C. Kowert; Meyertons, Hood, Kivlin, Kowert & Goetzel, P.C.

(57) ABSTRACT

A lookup circuit evaluates hash functions that map keys to addresses in lookup tables. The circuit includes multiple hash function sub-circuits, each of which applies a respective hash function to an input key, producing a hash value. Candidate pairs of hash functions to be implemented by the hash function sub-circuits (or hash function bit matrices thereof) may be generated and tested for suitability in hashing a particular collection of keys. Each hash function bit matrix may be generated according to heuristics chosen to improve the likelihood that it will be suitable for use in a pair, and may be tested against previously generated hash function bit matrices contained in one or more pools (each of which may contain matrices generated using different heuristics) to identify suitable pairs. The hash function bit matrices may be represented in the pools in a tabulated form, which may reduce the suitability testing time.

28 Claims, 14 Drawing Sheets

(56) References Cited

PUBLICATIONS

Tran Ngoc Thinh, Kittitornkun, S., and Tomiyama, S. Applying Cuckoo Hashing for FPGA-based Pattern Matching in NIDS/NIPS. Proc. International Conference on Field-Programmable Technology (ICFPT), 2007, pp. 121-128, 12-14 Dec. 2007.

Wikipedia article "Disjoint-set data structure" http://en.wikipedia.org/wiki/Disjointset_data_structure; pp. 1-5, accessed Oct. 31, 2013.

Xilinx, Inc. Virtex-5 FPGA User Guide. UG190 (v5.4) Mar. 16, 2012. http://www.xilinx.com/support/documentation/user_guides/ug190.pdf, pp. 173-210, [accessed Oct. 31, 2013].

Havas, George, Majewski, Bohdan S., Wormald, Nicholas C., and Czech, Zbigniew J. Graphs, hypergraphs and hashing. In Graph-Theoretic Concepts in Computer Science (Leeuwen, Jan, ed.). Lecture Notes in Computer Science 790 (Springer, Berlin and Heidelberg, 1994), pp. 153-165.

CMPH, C Minimal Perfect Hashing Library, Jun. 9, 2012, pp. 1-5.

Tarjan, Robert Endre. 1975. Efficiency of a Good But Not Linear Set Union Algorithm. Journal of the ACM 22, 2 (Apr. 1975), 215-225.

Robert E. Tarjan and Jan van Leeuwen. 1984. Worst-case Analysis of Set Union Algorithms. Journal of the ACM 31, 2 (Mar. 1984), 245-281.

U.S. Appl. No. 14/069,255, filed Oct. 31, 2013, Guy L. Steele Jr.

U.S. Appl. No. 14/069,259, filed Oct. 31, 2013, David R. Chase.

Thomas H. Cormen, et al., "Introduction to Algorithms", The MIT Press, 1990, pp. 440-461.

Prentice-Hall Series in Automatic Computation, "A Discipline of Programming", Edsger W. Dijkstra, 1976, pp. 161-167.

Henry S. Warren, Jr., "Hacker's Delight", 2003, pp. 74-75.

U.S. Appl. No. 14/069,253, filed Oct. 31, 2013, Guy L. Steele Jr.

SYSTEMS AND METHODS FOR RAPIDLY GENERATING SUITABLE PAIRS OF HASH FUNCTIONS

BACKGROUND

1. Field of the Disclosure

This disclosure relates generally to computing devices that implement lookup tables, and more particularly to systems and methods for generating and determining the suitability of pairs of hash functions for implementation within hardware lookup circuits.

2. Description of the Related Art

Computer networking devices such as routers, switches, and network interface cards commonly rely on lookup tables in hardware circuitry to quickly access information associated with incoming data packets for purposes such as routing, filtering, or load-balancing. Lookup tables for network applications allow for the fast retrieval of data values associated with a key, where the key is a bit string that can be found in or computed based on data received in incoming packets. Lookup tables can map a set of such keys to a set of addresses in a memory holding data associated with the keys.

Many existing hardware approaches focus on lookup tables that solve the longest-prefix match problem, specifically for IP routing applications. Such approaches typically assume fixed key sizes and a static/fixed set of tables with fixed-size entries, and they typically emphasize high lookup rates over low latency for individual lookups. For example, some traditional hardware implementations of lookup tables include content-addressable memories (CAMs) or, more specifically, ternary content-addressable memories (TCAMs). CAMs are dedicated hardware circuits combining memory locations for key entries with comparator logic such that a given input key can be quickly compared to all key entries stored in the memory in parallel. If an input key is found, the CAM either directly returns data associated with the key or the index of the memory location the matching key is stored in. This index can then be used to access data associated with the key, for example, by using the index as an address into a separate static random access memory (SRAM) or a dynamic random access memory (DRAM).

TCAMs allow key entries to not only use bit values of 0 and 1, but a third, "don't care" value, X. A value of X specifies that the corresponding bit position is not to be compared to the input key, but is to be considered a match. Some applications require that, in case of multiple matches, the entry with the longest sequence of matching, non-X bits starting from the most significant bit, commonly known as the longest-prefix match, to be the entry that is returned. While TCAMs offer low access latencies, their memory capacity is generally lower than the capacities offered by standard SRAMs of equal chip size. This is largely due to the added comparator logic per memory location. Furthermore, the power consumption of TCAMs tends to be high, and the hardware design dictates a maximum key size.

Some more recent hardware implementations of large lookup tables targeted at solving the longest-prefix match problem leverage standard SRAM technology. These implementations often utilize tree-based data structures such as TRIEs (which are also known as digital trees or prefix trees) stored in SRAMs. In some existing implementations, TRIEs map the digits of the keys to nodes in a tree structure such that the lookup of a key is done by traversing the tree from its root to its leaf nodes, such that at every node, the next digit in the input key determines the next-level node until a leaf node is reached. The traversal of the tree for key lookups may require multiple accesses to SRAM memory. For example, for m-bit keys, TRIEs require O(m) memory accesses in the worst case. By using multiple SRAMs and techniques such as pipelining, tree-based implementations can match or exceed the lookup rates offered by TCAMs. On the other hand, approaches that depend on multiple SRAM accesses commonly lead to significantly higher latencies for individual key lookups.

Existing software approaches, including software algorithms for evaluating perfect hash tables, provide more flexibility than existing hardware approaches in terms of the number of tables, key sizes, and data entry sizes. However, these algorithms are typically designed for sequential processing (e.g. as a sequence of processor instructions), and do not lead to efficient, parallel circuit implementations. For example, software techniques for fast lookups commonly include data structures such as hash tables or, more specifically, perfect hash tables. However, existing software algorithms for key lookups typically do not yield practical hardware implementations of lookup tables, as they often require long sequences of steps, sequential integer arithmetic, and/or conditional processing, i.e., properties that do not allow for efficient parallel or pipelined processing in hardware.

An existing FPGA-based lookup circuit applies the techniques of Cuckoo Hashing to look up keys in a table pattern. This circuit uses a two-level table to accommodate variable-length patterns. One form of "universal hashing" that has been described computes a hash function of a bit-string by multiplying the bit string, regarded as a bit vector by a matrix of bits in order to compute a linear transformation of the bit vector. One class of hash functions that has been described relies on combining the results of two or more primary hash functions, with the primary hash functions being regarded as mapping a set of keys into a graph or hypergraph.

An existing approach to identifying suitable pairs of hash functions for hashing a collection of keys uses a hash function that multiplies a bit vector by a bit matrix. In this existing approach, given a specific set of key-value pairs to be encoded in a lookup table, pairs of bit matrices are chosen at random until a suitable pair is found. However, this process can take a long time, and can expend a large amount of computational resources.

SUMMARY

The systems and methods described herein may in some embodiments implement programmable hash tables that provide low-latency access to data stored in memory. More specifically, the systems described herein may include hardware circuitry configured to implement lookup circuits. In various embodiments, these lookup circuits may evaluate hash functions that map a set of keys (e.g., bit strings) to a set of addresses in one or more lookup tables that hold data associated with the keys. As used herein, the terms "hash function evaluation circuit", and "lookup circuit" may be used somewhat interchangeably to refer to such hardware circuitry (or at least a portion thereof). In some embodiments, the hash functions that are implemented in the hardware circuitry may be selected for efficient evaluation in hardware circuitry (e.g., they may be chosen or generated in such a way that they can be implemented in hardware with low latency), and these hash functions may be used to construct the lookup tables. In some embodiments, the hash functions may be pre-computed in software based on a fixed key set and representations of those hash functions may be transferred to hash tables in one or more memories or to other hardware elements within the lookup circuits. The hardware circuitry may be configured to retrieve data associated with a hash of a given key that is presented as an input to the hardware circuitry.

In some embodiments, a lookup circuit may include multiple hash function sub-circuits, each of which applies a respective hash function to an input key value, producing a hash value. In some embodiments, the input key value may be represented by a bit vector. In some such embodiments, to apply a respective hash function to the input key value to produce a respective hash value, each of the hash function sub-circuits may be configured to multiply the input bit vector by a pre-defined sparse bit matrix and to add a pre-defined constant bit vector to the result of the multiplication. The hash value may identify a location in the memory (e.g., an entry in a lookup table) that stores a data value associated with the hash value. The hash value may be useable to access the data value stored in the identified location, and the data value may or may not be associated with the received input key value. In some embodiments, data representing the key associated with each data value may be stored along with its associated data value in the lookup table (e.g., as a key-value pair).

In some embodiments, the systems and methods described herein may be used to identify pairs of hash functions that are suitable for use in lookup circuits, including those that implement bit matrix multiplication with sparse bit matrices, and may reduce the cost of searching for suitable hash functions, when compared to other approaches. In some embodiments, once a pair of candidate hash functions has been identified, the techniques described herein may provide a substantially more efficient test for whether the pair of hash functions is suitable for hashing a given set of keys than existing approaches. In some embodiments, at least some of the candidate hash function bit matrices may be generated according to heuristics that are chosen to improve the likelihood that they will be suitable for use in pairs (e.g., to generate bit matrices that, when considered in pairs, are likely to induce a graph that is acyclic). For example, generating a candidate hash function bit matrix may include performing one or more pre-processing operations for reducing the input key matrix to eliminate bit positions (columns) that are constant across all keys and/or bit positions (columns) that are linearly dependent on other bit positions, for ensuring that the generated bit matrix has full rank, and/or for choosing row or column permutations to be applied to the generated bit matrix (some of which may be dependent on a diversity metric or a criticality metric computed for the input key matrix).

In some embodiments, each newly generated hash function bit matrix may be tested against one or more previously generated hash function bit matrices contained in one or more pools (each of which may contain hash function bit matrices generated using different heuristics) in order to identify suitable pairs of hash function bit matrices. In such embodiments, if a suitable pair of hash functions has not been identified after testing the newly generated hash function bit matrix against all previously generated hash function bit matrices contained in one or more applicable pools of hash function bit matrices, the newly generated hash function bit matrix may be added to one of the pools and/or another candidate hash function bit matrix may be generated and tested against some or all of the previously generated hash function bit matrices contained in one or more of the pools until a suitable pair of hash function bit matrices is identified.

In some embodiments, the hash function bit matrices may be represented in the pools in a tabulated form, which may reduce the suitability testing time. For example, in some embodiments, after generating each hash function bit matrix, a tabulation operation may be performed that multiplies each of the keys in the key matrix by the newly generated hash function bit matrix and stores the resulting hash values in a tabulated representation of that hash function bit matrix for subsequent use in suitability testing for pairs of hash function bit matrices. The tabulated representations of each hash function bit matrix stored in a pool of such representations may be re-used (without needing to re-compute the hash values) each time the hash function bit matrix in the pool is tested against a newly generated hash function bit matrix.

In some embodiments, determining whether two hash functions (each of which is represented by a respective bit matrix and a respective bit vector) are suitable for hashing a particular collection of keys in a lookup circuit may be dependent on the particular circuitry of the lookup circuit, various characteristics of the set valid keys or of the collection of key-value pairs, and/or the nature of the application in which the lookup circuit is employed. For example, in some embodiments, the use of particular hash function circuitry may require that a graph induced by the pair of hash functions is (or would be) acyclic, while in other embodiments, there may be no such requirement.

In some embodiments, once it has been determined that a pair of hash functions is suitable for hashing a given collection of keys in a particular lookup circuit, a representation of each of the two hash functions may be transferred to the lookup circuit. For example, a representation of at least one of the two hash functions may be transferred to a memory in the lookup circuit, to fixed combinatorial logic in the lookup circuit, or to programmable combinatorial logic in the lookup circuit. In some embodiments, for at least one of the two hash functions, the representation of the hash function may include a random bit matrix that meets a pre-defined sparseness constraint.

Figure 1:
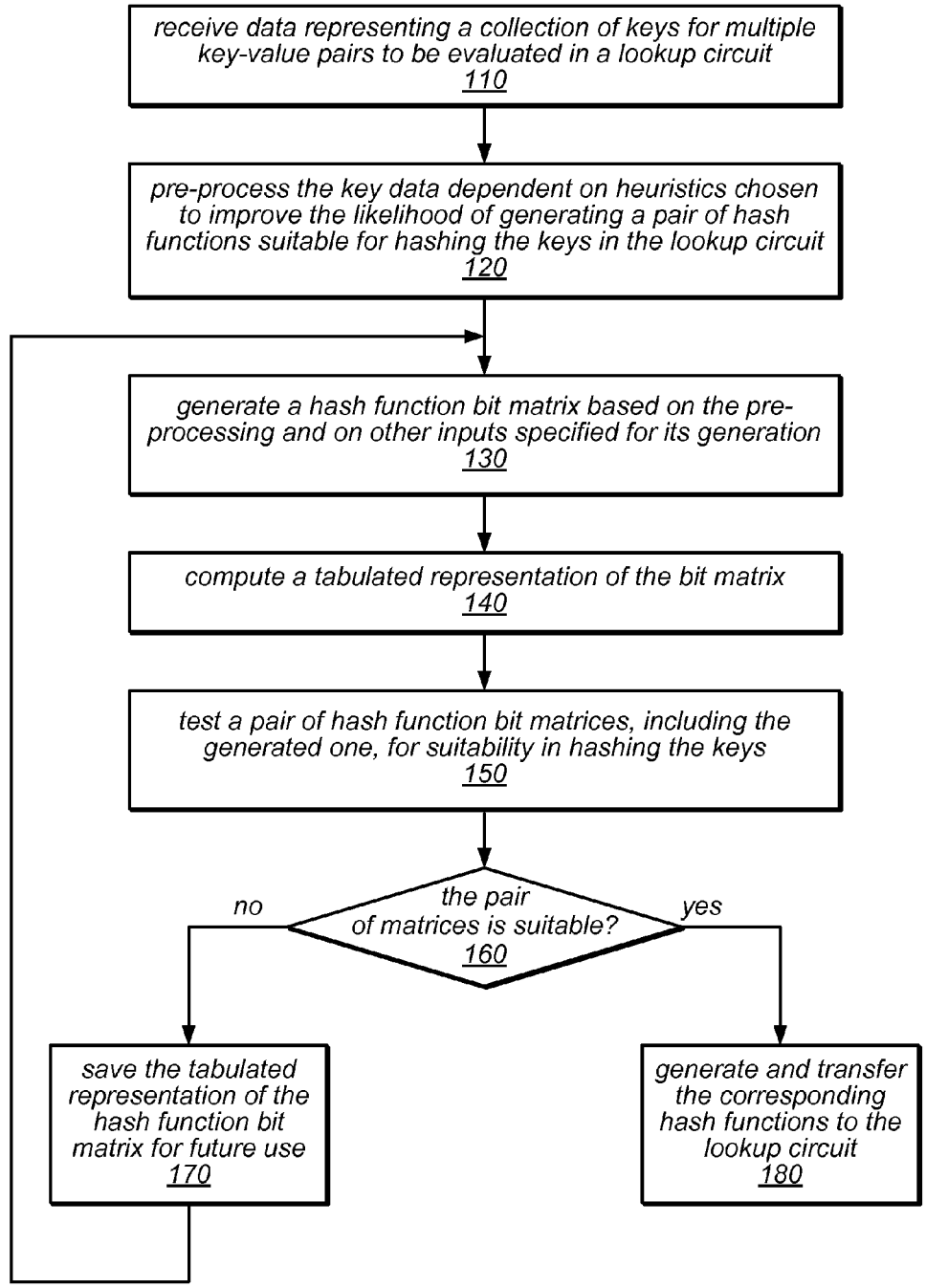
FIG. 1 is a flow diagram illustrating one embodiment of a method for generating and testing a pair of tabulated hash function bit matrices.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement configuring hash function circuitry and/or evaluating hash functions for performing table lookup operations using such circuits. More specifically, the systems described herein may utilize hash functions (e.g., perfect hash functions, minimal perfect hash functions or other hash functions) targeted at efficient evaluation in hardware circuitry to construct lookup tables. In some embodiments, the hash functions may be pre-computed in software based on a fixed key set and then transferred into a hardware lookup circuit. The lookup circuit may store a representation of the hash functions in one or more memories or in other circuit elements and may be configured to retrieve and return data that is associated with various keys when they are presented to the circuit as inputs. In some embodiments, the lookup circuit may also be configured to verify the validity of a presented key, update data associated with a key, insert new key/value pairs, and/or delete key/value pairs.

The lookup circuits described herein may be implemented in various circuit-level network processing devices including network interface cards, network processors, smart routers/switches, etc., according to different embodiments. For example, in some embodiments, these circuits may be implemented as part of an application-layer network device, such as a network device that is designed for low-latency processing of application messages in hardware. In general, the systems and methods described herein may be employed in a variety of applications that require the fast retrieval of information associated with at least one key per incoming message, in different embodiments.

In some embodiments, the system in which the circuits and techniques described herein are employed may be a user-programmable device. In such embodiments, the hash tables described herein may be generated based on a user-provided program and/or user-provided table data, which may not be known at circuit design time. In some embodiments, the user may define the various hash tables and/or lookup tables (including the valid keys for the table, the data associated with each of the valid keys, the key size, the number of keys supported, the number and/or size of the data words associated with the keys, and/or other parameters of the hash tables and/or lookup tables) in a domain-specific programming language. In other embodiments, the user may define a mapping between valid key values and associated data words (e.g., in a comma-separated values file), and program instructions may be used to determine the key size, the number of keys supported, and the number and/or size of the data words associated with the keys, and to generate a hash function evaluation circuit configuration that implements a hash function (e.g., a minimal perfect hash function or another type of hash function) based on that information (which may include one or more hash tables or other representations of the hash functions, as described herein). In some embodiments, program instructions may be used to generate pairs of hash functions (each or which is represented as a bit matrix plus a bit vector) and to test the suitability of each pair of hash functions for hashing a collection of keys in a lookup circuit.

In some embodiments, the lookup circuits described herein may trade off some amount of flexibility for markedly lower latency, when compared to other approaches. For example, the lookup circuits may support only a single lookup table of fixed size, but may deliver the data associated with an input key (and, in some cases, a validity signal) faster than other lookup circuits. In some embodiments, some of the memories may be able to be updated while the lookup circuit is in operation, while others may not. For example, in some embodiments, flexibility may be provided in the context of a field programmable gate array (FPGA) implementation that operates in conjunction with a software infrastructure capable of reprogramming the FPGA wiring, if necessary, when the set of key-value pairs changes. In some embodiments that employ FPGA technology, the hash functions may be programmed through FPGA wiring rather than using tables stored in memory.

In some embodiments, the hardware circuitry may implement hash tables (e.g., hash tables for perfect hash functions, minimal perfect hash functions or other hash functions) by accessing multiple memory locations selected by multiple hash function sub-circuits, where each hash function sub-circuit is configured to multiply an input key, represented as a bit vector, by a sparse bit matrix, and then XOR the result with another bit vector (e.g., a constant bit vector). In some embodiments, the choice to use a sparse bit matrix may allow lookup operations to be implemented in circuitry with reduced access latency. For example, in embodiments in which a hash function sub-circuit multiplies input key bit vectors by a sparse bit matrix in which each row includes at most six 1-bits, a hash function producing an n-bit result may be computed using n FPGA lookup table circuit (LUTs) operating in parallel, with a latency of just one "LUT delay". In some embodiments, a hash function sub-circuit may be implemented using a collection of odd-parity circuits having different numbers of inputs (e.g., various odd-parity-of-6 circuits, odd-parity-of-11 circuits, and/or odd-parity-of-12 circuits).

One common application in which the hash function evaluation circuits and techniques described herein may be employed is the mapping of Internet Protocol (IP) addresses to Ethernet addresses for the purpose of routing IP packets to their destinations across multiple hops in the network. Given short packets and the high bandwidth of network links, in these types of applications, table lookups may need to be executed at a rate high enough to sustain the link rate. For example, a 10 Gb/s Ethernet link may have a maximum packet arrival rate of almost 15 million packets per second at minimum packet size, requiring 15 million table lookups per second to make routing decisions in a timely manner. For some such IP routing applications, the mapping of IP addresses to Ethernet addresses may not only require a determination of whether an IP address is held in the key memory, but whether there exists at least one key entry for which at least some of the bits (e.g., at least some of the most significant bits) matches the input key.

As noted above, existing hardware implementations of lookup tables for routing applications typically focus on high lookup rates, require solving the longest-prefix match problem, and often rely on fixed key and data entry sizes (as given by IP and Ethernet addresses). However, for applications in some computer networking devices, e.g., those examining incoming data packets beyond the network-layer header, lookup tables with different properties may be desirable. In particular, some applications may not require solving the longest-prefix match problem, but may require low, deterministic lookup latencies. In addition, it may be desirable to provide "early access" to associated data by making it available faster than an associated verification signal that indicates whether or not the data is actually valid, that is, associated with the key presented for query.

A hash function H for a set K of m distinct keys, each having r bits, is a mapping function that maps each key $k \in K$ to a p-bit integer $i = H(k)$. If the hash function H always maps distinct keys to distinct integers (that is, $k_1 \neq k_2$ implies that $H(k_1) \neq H(k_2)$), then the mapping is called a perfect hash function (PHF). If, furthermore, the unique integers i produced by H for the m distinct keys form a set of consecutive integers, e.g., $0 \leq i \leq m-1$ for all i, the mapping is called a minimal perfect hash function (MPHF).

In some embodiments, given a hash function H for a key set K, the lookup of data associated with a key k may first require the evaluation of H(k) to compute a unique index i. The index i may then be used as an address into a memory holding a d-bit data entry D(k) associated with k. In some embodiments, the systems and methods described herein may be used to implement, in hardware circuitry, hash functions that can be evaluated in constant time for all keys k.

In some embodiments, the lookup circuits described herein may use the results of the application of two or more hash functions on a presented key, computed in parallel by hardware circuits, to probe an equal number of memory locations simultaneously. The contents of the accessed locations may be used to determine whether the lookup table holds data associated with the presented key. If so, the associated data may be delivered. A data-validity signal may also be generated, in some embodiments.

As noted above, in some embodiments, the lookup circuits described herein may include hash functions that perform bit matrix multiplication using sparse bit matrices, as defined by a sparseness constraint. For example, a sparseness constraint may specify a pre-defined upper or lower bound on the number of 1-bits, a pre-defined upper or lower bound on the number of 0-bits, a pre-defined number of 1-bits or 0-bits desired in each row, a constraint on the ratio between the number of 0-bits and the number of 1-bits in each row (e.g., a requirement that there be at least twice as many 0-bits as 1-bits in each row), a constraint on the ratio between the number of 1-bits and the number of 0-bits in each row (e.g., a requirement that there be at least twice as many 1-bits as 0-bits in each row) or another type of constraint on the number of 1-bits and/or the number of 0-bits in each row. In some embodiments, a useful choice (based on the circuit implementation) may be to allow no more than six 1-bits on each row, even for lookup circuits that handle keys having a large number of bits (e.g., 96), as this choice may reduce the hardware latency for computing the hash function and, therefore, may reduce the latency for delivering the data associated with the key.

Note that identifying pairs of sparse bit matrices that will work well together in a lookup circuit may be more difficult than identifying pairs of bit matrices that do not have a sparseness constraint. The systems and methods described herein may apply various heuristics to the generation of individual bit matrices (including, but not limited to, sparse bit matrices) in an attempt to improve the success rate in identifying suitable pairs of the generated bit matrices. For example, generating a candidate hash function bit matrix may include performing one or more pre-processing operations for reducing the input key matrix to eliminate bit positions (columns) that are constant across all keys and/or bit positions (columns) that are linearly dependent on other bit positions, for ensuring that the generated bit matrix has full rank, and/or for choosing row or column permutations to be applied to the generated bit matrix (some of which may be dependent on a diversity metric or a criticality metric computed for the input key matrix). It has been observed that this approach to generating (or choosing) individual bit matrices for use in hash functions makes it more likely that when pairs of these matrices are tested for suitability, the tests will succeed. In some embodiments, the use of a combinatorial search for suitable collections of hash function bit matrices using one or more pools of such matrices may allow any increased costs incurred in generating bit matrices using such heuristics to be amortized over multiple searches.

In some embodiments, the systems and methods described herein may be used to perform suitability testing for candidate pairs (or other collections) of hash functions for used in a lookup circuit (e.g., to determine whether a pair of hash functions is suitable for hashing a given collection of keys in a particular lookup circuit). The suitability tests described herein may be used to determine whether a graph induced by a pair of hash functions is (or would be) acyclic, or to determine whether a collection of hash functions meets other suitability criteria that are applicable to particular circuitry of the lookup circuit, various characteristics of the set of keys or of the collection of key-value pairs to be evaluated by the lookup circuit, and/or the nature of the application in which the lookup circuit is employed. In some embodiments, the systems and methods described herein may amortize the cost of generating bit matrices for use as hash functions by testing each generated bit matrix against a large number of other previously-generated bit matrices (representations of which may be placed in one or more candidate pools), rather than successively generating a pair of matrices and then discarding them both if that pair of matrices is determined to be unsuitable for use in the lookup circuit. In some embodiments, this approach may produce a quadratic improvement in the cost of candidate hash function bit matrix generation. In some embodiments, each hash function bit matrix may be used many times (e.g., it may be tested against a large number of other hash function bit matrices). In some embodiments, the results of applying the matrix to the collection of keys may be tabulated and saved for use in subsequent suitability testing, rather than having to be re-computed in order to test each candidate pair of hash function bit matrices.

One embodiment of a method for generating and testing a pair of tabulated hash function bit matrices is illustrated by the flow diagram in FIG. 1. As illustrated at 110, in this example, the method may include receiving a collection of keys for multiple key-value pairs to be evaluated in a lookup circuit. The method may also include pre-processing the key data dependent on one or more heuristics that have been chosen in an attempt to improve the likelihood of generating a pair of hash functions that are suitable for hashing the keys in the lookup circuit, as in 120. As illustrated in this example, the method may include generating a hash function bit matrix based on the results of the pre-processing operation(s) and on other inputs that were specified for the generation of the hash function bit matrix, as in 130, and computing a tabulated representation of the hash function bit matrix, as in 140. For example, a tabulation operation may be performed that multiplies each of the keys in the collection of keys by the newly generated hash function bit matrix and stores the resulting hash values in a tabulated representation of that hash function bit matrix for subsequent use in suitability testing for pairs of hash function bit matrices.

As illustrated in this example, the method may include testing a pair of hash function bit matrices, including the newly generated one, for suitability in hashing the keys, as in 150. If it is determined that the pair of matrices is not suitable for hashing the keys (shown as the negative exit from 160), the method may include saving the tabulated representation of the hash function bit matrix for future use (as in 170), and repeating the operations illustrated in 120-160 (e.g., generating another candidate bit matrix and testing it as part of another pair of bit matrices) until a suitable pair of matrices is identified. Note that in some embodiments, at least some of the data produced as part of pre-processing may be re-used (or a matrix generation function that was produced during pre-processing may be re-used). However, if it is determined that the pair of matrices is suitable for hashing the keys (or once a suitable pair of matrices is identified, shown as the positive exit from 160, the method may include generating and then transferring the hash functions corresponding to the identified bit matrices to the lookup circuit, as in 180.

In some embodiments, the computation for looking up a key k using a perfect hash function H, i.e., the computation to evaluate H(k), may be split into two steps. In the first step, two primary hash functions F1 and F2 may be evaluated for the key k, resulting in two values F1(k) and F2($k$) of p bits each. In the second step, a secondary hash function G may be evaluated for the values F1(k) and F2(k), such that H(k)=G (F1(k), F2(k)). Even if the primary hash functions F1 and F2 are not perfect, the overall hash function H may be perfect if F1, F2, and G are chosen correctly. Such methods are sometimes generalized to use more than two primary hash functions; for example, three hash functions F1, F2, and F3 may be used, along with a secondary combining function of three arguments, so that H(k)=G(F1(k), F2(k), F3(k)). Several such methods are found in the literature. To compute primary hash functions F1 and F2, one of these existing algorithms relies on the conditional summation of random integers modulo a chosen integer t. However, the computation of a modular sum of integers may be undesirable for implementation in hardware as it requires integer adders with carry chains and multiple conditional subtractions to compute a result in the range of 0 . . . t−1.

As noted above, an existing lookup circuit that is based on field programmable gate arrays, or FPGAs, uses the techniques of Cuckoo Hashing to look up keys in a table pattern uses a two-level table to accommodate variable-length patterns. In some embodiments, the lookup circuits described herein may use keys of fixed length and a single level of table lookup, which may reduce lookup latency when compared to existing techniques. In some such embodiments, some or all of the data associated with a given key may be made available after only a single level of table lookup. In various embodiments, the lookup techniques described herein may differ from existing Cuckoo Hashing techniques in several other respects. For example, the existing FPGA-based circuit referenced above computes hash values sequentially, such that a lookup operation includes computing one hash function first, probing a table in memory, and making a decision about the results of that hash function before computing another hash function. In contrast, the lookup circuits described herein may compute multiple hash values in parallel (e.g., substantially concurrently).

In various embodiments, the lookup circuits described herein may implement hash functions that need not be minimal perfect hash functions or even perfect hash functions. However, for hardware implementation, it may be desirable to choose hash functions that can be evaluated in constant time for all keys k. Therefore, in some embodiments, the lookup circuits described herein may implement two or more hash functions, each requiring roughly the same fixed amount of time to compute, which may allow them to be computed substantially simultaneously in hardware. When a key is presented to the lookup circuit, each of the hash functions may be applied to the key. In some embodiments, the resulting p-bit hash values may be used as memory addresses in order to access key-value pairs stored in one or more memories. In some such embodiments, at most one key-value pair stored in the memories of the circuit may be identified as matching a presented key, and the associated data in that key-value pair may be selected for output (e.g., the data associated with the presented key may be delivered or otherwise provided as an output of the lookup circuit as a result of the lookup operation). Note that in some embodiments, the outputs of two or more hash functions may be the same for a particular key, in which case they would identify the same (single) location in memory at which data associated with the particular key is stored.

Figure 2:
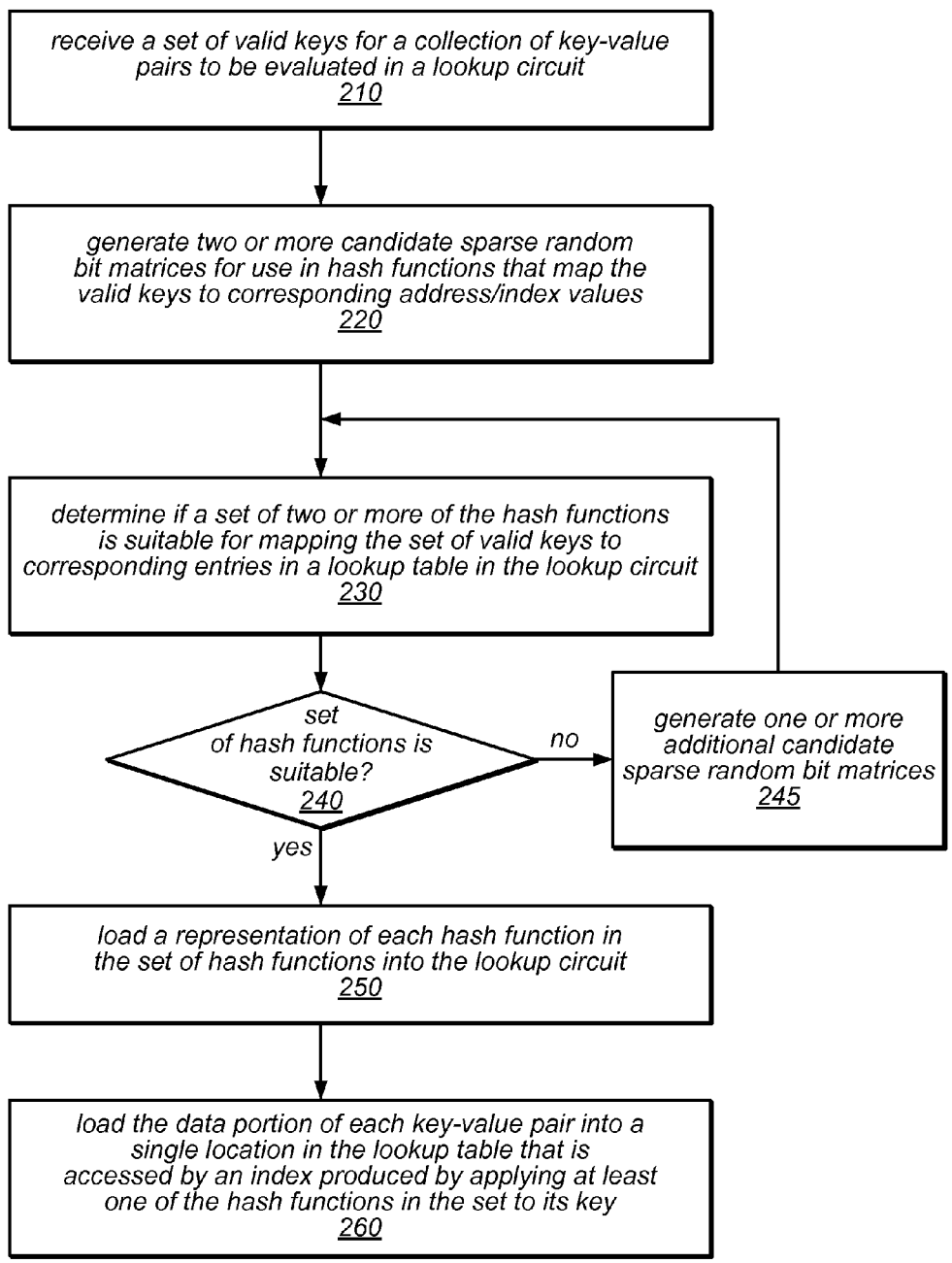
FIG. 2 is a flow diagram illustrating one embodiment of a method for loading a lookup circuit with a set of hash functions.

One embodiment of a method for loading a lookup circuit with a set of hash functions (e.g., a fixed number of hash functions corresponding to the number of hash function sub-circuits in the lookup circuit) is illustrated by the flow diagram in FIG. 2. As illustrated in this example, the method may include receiving a set of valid keys for a collection of key-value pairs to be evaluated in a lookup circuit, as in 210. The method may include generating two or more sparse random bit matrices for use in hash functions that map the valid keys to corresponding address/index values, as in 220. As described in more detail herein, in some embodiments, tabulated representations of the bit matrices may be placed in a pool of such representations for subsequent suitability testing.

The method may also include determining if a set of two or more of the hash functions (e.g., hash functions for which tabulated representations exist in a pool) is suitable for mapping the set of valid keys to corresponding entries in a lookup table in the lookup circuit, as in 230. For example, if the lookup circuit includes two hash function sub-circuits, the method may include determining whether a pair of hash functions is suitable for use in the circuit, while if the lookup circuit includes three hash function sub-circuits the method may include determining whether a triplet of hash function is suitable for use in the circuit. Note that in different embodiments, the criteria used to determine whether the set of generated hash functions is suitable may vary dependent on the particular circuitry of the lookup circuit, various characteristics of the set of valid keys or of the collection of key-value pairs, and/or the nature of the application in which the lookup circuit is employed. For example, in some embodiments, suitability may be determined based on whether a graph of the set of hash functions (e.g., a pair of hash functions) is acyclic, on whether the set of hash functions is able to handle (e.g., evaluate) the set of key-value pairs for all valid keys (e.g., to produce exactly one unique address/index value for each valid key among the hash functions in the set), or on other suitability criteria.

As illustrated in this example, if it is determined that the set of hash functions is not suitable for use in the lookup circuit (shown as the negative exit from 240), the method may include generating one or more additional candidate sparse random bit matrices to be tested as part of a set of hash function bit matrices (e.g., as part of a pair or triplet of bit matrices, depending on the number of hash function sub-circuits in the lookup circuit), as in 245. For example, in some embodiments, after one pair of hash functions has been tested and determined not to be suitable, the method may include generating one or more additional candidate sparse random bit matrices for use in another pair of hash functions and testing it for suitability. Note that the other pair of hash functions may or may not include either of the hash functions in the previously tested pair of hash functions. In other embodiments, after one pair of hash functions has been tested and determined not to be suitable, the method may include testing a different combination of previously generated hash functions for which tabulated representations exist in a pool, rather than generating additional candidate sparse random bit matrices. On the other hand, if it is determined that the set of hash functions is suitable for use in the lookup circuit (or once a suitable set of hash functions has been identified), the method may include loading a representation of each of the hash functions in the set of identified set of hash functions into the lookup circuit (e.g., loading a representation of each of the hash functions into a respective hash function sub-circuit). This is illustrated in FIG. 2 by the positive exit from 240 and 250.

As illustrated in this example, in some embodiments, the method may also include loading the data portion of each key-value pair into a single location in the lookup table that is accessed by an index produced by applying at least one of the hash functions in the set to its key, as in 260. For example, the method may include loading data for the key-value pairs into one or more lookup tables in one or more memories within the lookup circuit, in various embodiments.

In some embodiments of the systems described herein, each of the hash functions implemented in the lookup circuit may be defined through the multiplication of a respective bit matrix A of dimensions p×r by a key k that is represented as a bit vector $k=(k_0, \ldots, k_{r-1})$ of length r, followed by an addition of a respective bit vector, $y=(y_0, \ldots, y_{p-1})$ of length p. In some embodiments, the addition may be performed modulo 2. In one such embodiment, the mathematical formula for the computation of a function H, where H may be one of two or more hash functions implemented in a lookup circuit, may be represented by Equation 1, shown below:

$$H(k) = A * k + y \quad \text{Eqn. 1}$$

$$= \begin{pmatrix} a_{0,0} & \cdots & a_{0,r-1} \\ \vdots & \ddots & \vdots \\ a_{p-1,0} & \cdots & a_{p-1,r-1} \end{pmatrix} \begin{pmatrix} k_0 \\ \vdots \\ k_{r-1} \end{pmatrix} + \begin{pmatrix} y_0 \\ \vdots \\ y_{p-1} \end{pmatrix}$$

$$= \begin{pmatrix} a_{0,0}k_0 +_2 & a_{0,1}k_1 +_2 & \cdots & a_{0,r-1}k_{r-2} +_2 & y_0 \\ \vdots & \vdots & \ddots & \vdots & \vdots \\ a_{p-1,0}k_0 +_2 & a_{p-1,1}k_1 +_2 & \cdots & a_{p-1,r-1}k_{r-1} +_2 & y_{p-1} \end{pmatrix}$$

$$= \begin{pmatrix} h_0(k) \\ \vdots \\ h_{p-1}(k) \end{pmatrix}$$

In this example, the operator "$+_2$" represents modulo 2 addition, and the following are assumed:
$a_{i,j} \in \{0,1\}$
$k_i \in \{0,1\}$
$y_i \in \{0,1\}$
$h_i(k) \in \{0,1\}$ In some embodiments, the p×r bit matrix A may be generated and/or chosen such that it is a sparse bit matrix, which may allow the hash function it represents to be implemented using circuitry with low latency. For example, in one such matrix, each row of the matrix may include at least twice as many 0-bits as 1-bits, or may be limited to a pre-defined upper bound on the number of 1-bits, in different embodiments.

Figure 3:
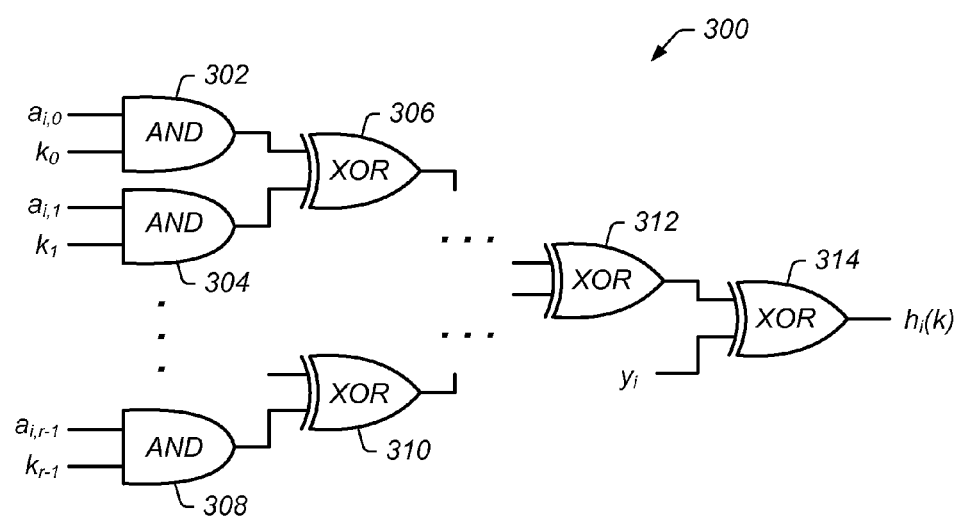
FIG. 3 is a block diagram illustrating a hardware circuit comprising AND gates and XOR gates that is configured to compute one bit of a hash function, according to one embodiment.

In some embodiments, the multiplication of two bits may be efficiently computed in hardware with an AND gate and the sum of two single-bit addends modulo 2 may be efficiently computed with an XOR gate. Hence, the sum of r single-bit addends modulo 2 may be computed with r−1 XOR gates. One such implementation is illustrated in FIG. 3, according to one embodiment. Specifically, FIG. 3 illustrates a hardware circuit 300 that includes multiple AND gates (including AND gates 302, 304, and 308) and a tree of XOR gates (including XOR gates 306, 310, 312, and 314) that are configured to compute one bit of H(k), as described above. In this example, the hardware circuit 300 is configured to compute bit $h_i(k)$ from the illustrated inputs (e.g., $a_{i,0}$ through $a_{i,r-1}$, and $k_0$ through $k_{r-1}$). To compute all p bits of function H, p parallel circuits similar to circuit 300 shown in FIG. 3 would be needed.

In general, with each of the lookup circuits described herein, a key is presented to an input of the circuit, and data associated with the key is provided at an output of the circuit. In some embodiments, an additional output signal may indicate whether or not the data provided at the output is valid. For some applications, it may be desirable for a lookup circuit not to be purely combinatorial, but to have alterable state. More specifically, it may be desirable for the lookup circuit to provide means for updating the set of key-value pairs in the lookup table. As described in more detail below, in some embodiments, the lookup circuit may implement additional inputs (e.g., a write signal and key/data input data) and may implement a mechanism to update the contents of the lookup circuit based on those inputs (e.g., to allow state information about hashing functions and key-value pairs to be updated). For example, when a write signal is asserted, this may indicate that the information presented to a key/data input should be stored in the memory of the lookup circuit.

Figure 4:
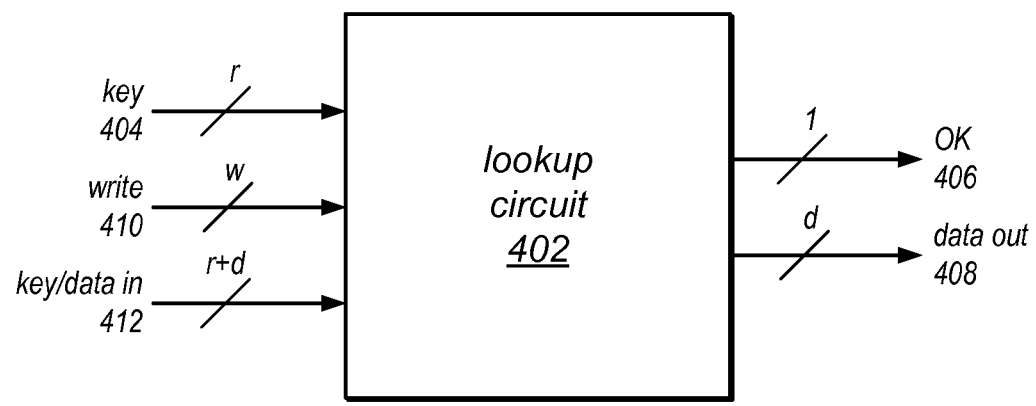
FIG. 4 is a block diagram illustrating an abstract representation of a combinatorial lookup circuit, according to one embodiment.

FIG. 4 is a block diagram illustrating an abstract representation of a combinatorial lookup circuit, according to one embodiment. In this example, lookup circuit 402 is configured to accept as an input a key 404 (in this case, a bit string of length r) and to produce two outputs, namely a single-bit validity signal 406 ("OK") that indicates whether a lookup table with lookup circuit 402 contains a key-value pair whose key is equal to the input key 404), and d bits of associated data 408. In this example, if the validity signal 406 is true, then the associated data 408 is equal to the value in the key-value pair whose key was found to match the input key 404. However, if the validity signal 406 is false, then the associated data 408 may be any bit pattern (i.e., the data 408 may not be associated with the input key 404). In this example, the lookup circuit 402 also accepts two additional inputs, namely a set of w write signals 410 (where w may be 1 or more than 1), and (r+d) bits of key/data information 412. At a clock transition or other specific time, the key/data information 412 may be used to update the lookup table in a manner controlled by the write signals 410. Note that in other embodiments, the contents of the lookup table may be fixed (thus, the lookup circuit may not include these additional inputs) and/or the lookup circuit may not output a validity signal (e.g., in embodiments in which all input keys are known to be mapped to valid key-value pairs in the lookup circuit).

Figure 5:
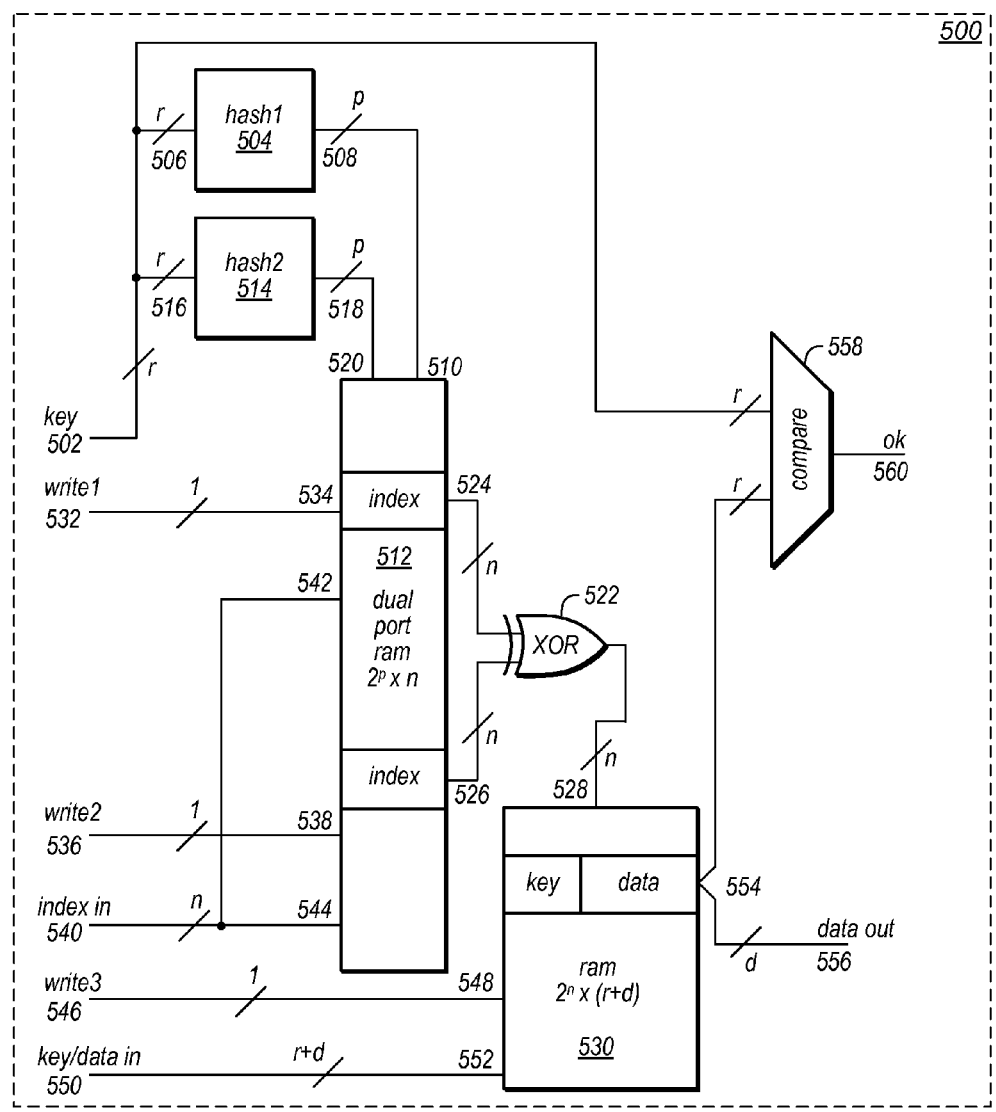
FIG. 5 is a block diagram illustrating a lookup circuit that accepts inputs and produces outputs similar to those accepted and produced by the abstract lookup circuit illustrated in FIG. 4, according to one embodiment.

FIG. 5 is a block diagram illustrating a lookup circuit that is configured to accept inputs and to produce outputs that are similar to those accepted and produced by the abstract circuit 402 shown in FIG. 4, according to one embodiment. In this example, lookup circuit 500 is configured to accept as an input a key 502 (a bit string of length r), corresponding to the input key 404 of FIG. 4. The lookup circuit 500 is also configured to accept a first single-bit write signal 532 and a second single-bit write signal 536, which together may correspond to the write signals 410 of FIG. 4 (with w=2). In this example, lookup circuit 500 is also configured to accept r+d bits of key/data input information 550, corresponding to the key/data inputs 412 of FIG. 4, and an n-bit index input signal 540.

The lookup circuit 500 includes a first primary hash function sub-circuit 504 that is configured to accept the key 502 at an input port 506 and to produce a p-bit output that is connected to a first address input 510 of a dual-ported RAM 512. In this example, the first address input 510 of the dual-ported RAM 512 is at least p bits wide. In some embodiments, the first primary hash function sub-circuit 504 may be configured to implement the functionality of a primary hash function F1. In some embodiments, the first primary hash function sub-circuit 504 may be implemented asp copies of the circuit shown in FIG. 3, using a bit matrix A1 and a bit vector y1. In this example, the lookup circuit 500 also includes a second primary hash function sub-circuit 514 that is configured to receive the key 502 at an input port 516 and to produce ap-bit output 518 that is connected to a second address input 520 of the dual-ported RAM 512. In this example, the second address input 520 of the dual-ported RAM 512 is at least p bits wide. In some embodiments, the second primary hash function sub-circuit 504 may be configured to implement the functionality of a primary hash function F2. In some embodiments, the second primary hash function sub-circuit 514 may be implemented as p copies of the circuit shown in FIG. 3, using a bit matrix A2 and a bit vector y2, where A2 may be the same as A1 or may be different from A1, and y2 may be the same as y1 or may be different from y1. As described in more detail herein, in some embodiments, one or both of the p+r bit matrices A1 and A2 may be generated and/or chosen such that they are sparse bit matrices, which may allow the hash functions they represent to be implemented using circuitry with low latency. For example, in each of these matrices, each row of the matrix may include at least twice as many 0-bits as 1-bits, or may be limited to a pre-defined upper bound on the number of 1-bits, in different embodiments.

In this example, dual-ported RAM 512 contains at least $2^p$ words of memory, where each word holds at least n bits. In some embodiments, the dual-ported RAM 512 may be configured to operate, at a clock transition or other specific time, to read a memory word from an address selected by the p-bit bit string presented at the first address input 510, and to present n bits of data from that memory word to the first read-data output port 524. In this example, the dual-ported RAM 514 also includes a second read-data output port 526, and the dual-ported RAM may be configured to operate, at a clock transition or other specific time, to read a memory word from an address selected by the p-bit bit string presented at the second address input 520 and to present n bits of data from that memory word to the second read-data output port 526.

In the example illustrated in FIG. 5, the lookup circuit 500 includes n two-input XOR gates 522 (conventionally depicted by a single XOR-gate symbol with inputs labeled as having n bits each). In some embodiments, each of the n XOR gates includes two inputs that are connected (respectively) to corresponding bits of the first read-data output port 524 of the dual-ported RAM 512 and to corresponding bits of the second read-data output port 526 of the dual-ported RAM 512. The XOR gates 522 and the dual-ported RAM 512 may collectively be configured to implement the functionality of a specific secondary function G, namely the bitwise exclusive OR of the two n-bit strings obtained from the dual-ported RAM 512 by using the two p-bit bit strings presented (respectively) to the first address input 510 and the second address input 520 as addresses.

In an alternate embodiment of lookup circuit 500, the XOR gates 522 may be replaced by n two-input XNOR gates, also known as "equivalence" or "bi-conditional" gates, each of which produces the result "1" when its two input bits are the same, and the result "0" when its two input bits are different. In another alternate embodiment of lookup circuit 500, the XOR gates 522 may be replaced by an addition circuit that is configured to accept two n-bit inputs that are regarded as integers and to produce an n-bit output representing the sum of the inputs. In yet another alternate embodiment of lookup circuit 500, the XOR gates 522 may be replaced by a subtraction circuit that is configured to accept two n-bit inputs that are regarded as integers and to produce an n-bit output representing the difference of the inputs. In still other embodiments, the XOR gates 522 may be replaced by other circuits that are configured combine two n-bit inputs in any of a variety of ways that will allow the lookup circuit 500 to operate in a manner similar to that described herein. For example, in some embodiments, the XOR gates 522 may be replaced by an addition circuit that performs integer addition of two n-bit inputs modulo a chosen integer t.

In the lookup circuit 500, the n output bits of the XOR gates 522 are connected to an address input 528 of a single-ported RAM 530. In this example, the address input 528 of the single-ported RAM 530 is at least n bits wide. In this example, the single-ported RAM 530 contains at least z words of memory, each of which includes holds at least r+d bits. In some embodiments, z may be equal to $2^n$. In other embodiments, z may be smaller than $2^n$, and external circuitry, which may be under software control, may be configured to ensure that every bit string presented to address input 528 is a valid address that identifies a memory address within single-ported RAM 530. For example, in some embodiments, z may be equal to $3 \times 2^{n-2}$, and external circuitry, which may be under software control, may be configured to ensure that the two highest-order bits of every n-bit address presented to address input 528 are never both 1-bits. In still other embodiments, z may be larger than $2^n$, the XOR gates 522 may be replaced with a circuit that is configured to accept two n-bit inputs and to produce w output bits (where w is larger than n), and the address input 528 of single-ported RAM 530 may be at least w bits wide rather than at least n bits wide. In another embodiment, the XOR gates 522 may be replaced by a programmable circuit that is configured to select one of at least two different functions for combining two n-bit bit strings to produce a bit string to be presented to the address input 528.

In lookup circuit 500, the first write signal 532 is connected to a first write-enable input 534 of the dual-ported RAM 512, and the second write signal 536 is connected to a second write-enable input 538 of the dual-ported RAM 512. As noted above, the lookup circuit 500 includes an n-bit index input signal 540 that is connected to each of a first write-data input port 542 of the dual-ported RAM 512 and a second write-data input port 544 of the dual-ported RAM 512. The dual-ported RAM 512 may be configured to operate, at a clock transition or other specific time, to accept data from the first write-data input port 542 and to write that data into a memory word at an address selected by the p-bit bit string presented at the first address input 510 of the dual-ported RAM 512, provided that the first write-enable input 534 of the dual-ported RAM 512 is true. However, if the first write-enable input 534 of the dual-ported RAM 512 is false, then the data from the first write-data input port 542 of the dual-ported RAM 512 will not be written to the memory. Similarly, the dual-ported RAM 512 may be configured to operate, at a clock transition or other specific time, to accept data from the second write-data input port 544 and to write that data into a memory word at an address selected by the p-bit bit string presented at the second address input 520 of the dual-ported RAM 512, provided that the second write-enable input 538 of the dual-ported RAM 512 is true. However, if the second write-enable input 538 of the dual-ported RAM 512 is false, then the data from the second write-data input port 544 of the dual-ported RAM 512 will not be written to the memory. In some embodiments, the lookup circuit 500 may be operated in a manner such that the first write signal 532 and the second write signal 536 are never both true at the same time.

In the example illustrated in FIG. 5, the lookup circuit 500 includes a third single-bit write signal 546 that is connected to a write-enable input 548 of the single-ported RAM 530. As noted above, the lookup circuit 500 includes r+d bits of key/data input information 550 that is connected to a write-data input port 552 of the single-ported RAM 530. The single-ported RAM 530 may be configured to operate, at a clock transition or other specific time, to accept data from the write-data input port 552 and to write that data into a memory word at an address selected by the n-bit bit string presented at the address input 528 of the single-ported RAM 530, provided that the write-enable input 548 of the single-ported RAM 530 is true. However, if the write-enable input 548 of the single-ported RAM 530 is false, then the data from the write-data input port 552 of the dual-ported RAM 530 will not be written to the memory.

In this example, the single-ported RAM 530 may also be configured to operate, at a clock transition or other specific time, to read a memory word from an address selected by the n-bit bit string presented at the first address input 510, and to present r+d bits of data from that memory word to a read-data output port 554 of the single-ported RAM 530. From the read-data output port 554 of the single-ported RAM 530, the rightmost d bits are connected to a d-bit associated data output 556 of the lookup circuit 500.

In the example illustrated in FIG. 5, the lookup circuit 500 includes an r-bit comparator 558 that includes a first input port connected to the key input 502 and a second input port connected to the leftmost r bits of the read-data output port 554 of the single-ported RAM 530. In this example, comparator 558 may be configured to produce a single-bit output signal indicating whether its two input ports have matching data, and the single-bit output signal of the comparator 558 is connected to the validity signal 560 of the lookup circuit 500. In some embodiments, the comparator 558 may be configured to produce true for the validity signal if, and only if, the read-data output port 554 is presenting r+d bits of data of which the leftmost r bits match the input key 502.

In some embodiments, the comparator 558 may be configured to compare two keys and to deliver a true signal if and only if the bit strings presented to its two input ports match exactly. In an alternate embodiment, the comparator 558 may be configured to deliver a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria is also possible and falls within the spirit and scope of this disclosure.

In some embodiments, external circuitry, which may be under software control, may be configured to alter the secondary combining function G by writing new index information to one or more memory locations in the dual-ported RAM 512 by presenting the key to key input 502, presenting index data to index input 540, and presenting a true signal to the first write signal 532. In such embodiments, in response to receiving these inputs, the lookup circuit 500 may be configured to operate, at a clock transition or other specific time, to write the index data presented to the index input 540 to a memory location determined by the first primary hash function sub-circuit 504 from the key 502. Similarly, external circuitry, which may be under software control, may also be configured to write index data (e.g., a specific key-value pair) to another (possibly different) memory location in the dual-ported RAM 512 by presenting the key to key input 502, presenting index data to index input 540, and presenting a true signal to the second write signal 536. In response to receiving these inputs, the lookup circuit 500 may be configured to operate, at a clock transition or other specific time, to write the index data presented to the index input 540 to a memory location determined by the second primary hash function sub-circuit 514 from the key 502.

In some embodiments, external circuitry, which may be under software control, may be configured to write a specific key-value pair to a memory location in the single-ported RAM 530 by presenting the key to key input 502, presenting the key and value together to key/data input 550, and presenting a true signal to the third write-enable input 546. In response to receiving these inputs, the lookup circuit 500 may be configured to operate, at a clock transition or other specific time, to write the key-value pair presented to the key-data input 550 to a memory location determined by the first primary hash function sub-circuit 504, the second primary hash function sub-circuit 514, the dual-ported RAM 512, and the XOR gates 522, dependent on the key 502. In some embodiments, the d bits of associated data may be changed for a single key-value pair already recorded in the lookup circuit 500 simply by writing a new key-value pair that happens to have the same key as before in the manner described above.

In some embodiments, external circuitry, which may be under software control, may be configured to effectively delete a specific key-value pair from a memory location in the single-ported RAM 530 by presenting the key to key input 502, presenting a different key and an arbitrary value together to key/data input 550, and presenting a true signal to the third write-enable input 546. In this case, the lookup circuit 500 may be configured to operate, at a clock transition or other specific time, to write the different key and the arbitrary value presented to the key-data input 550 to a memory location determined by the first primary hash function sub-circuit 504, the second primary hash function sub-circuit 514, the dual-ported RAM 512, and the XOR gates 522, dependent on the key 502. Note that if the different key is chosen to be a specific bit pattern that will not match any key intended to be presented as key input 502, then the contents of the memory word after it is written will not match the input key 502 on any future lookup request.

In some embodiments, external circuitry, which may be under software control, may be configured to effectively query the lookup circuit 500 to find out whether it contains associated data for a specific key k by presenting the key k to key input 502. In this case, the lookup circuit 500 may be configured to operate, at a clock transition or other specific time, to examine a first memory location within the dual-ported RAM 512 determined by the first primary hash function sub-circuit 504 from the key 502, and also to examine a second memory location within the dual-ported RAM 512 determined by the second primary hash function sub-circuit 514 from the key 502. The lookup circuit 500 may be further configured to combine the contents of the two examined memory locations within the dual-ported RAM 512 by using XOR gates 522 to produce a new value to be presented to the address input 528 of the single-ported RAM 530. In response to receiving this new value at address input 528, the lookup circuit 500 may be configured to examine a memory location within the single-ported RAM 530 determined by the value presented to the address input 528 of the single-ported RAM 530. In some embodiments, the lookup circuit 500 may be further configured to operate, using the comparator 558, to assert true for validity signal 560 if, and only if, the examined memory location within the single-ported RAM 530 contains a key (e.g., in the leftmost r bits) that matches key input 502. The lookup circuit 500 may also operate to deliver to associated data output 556 the rightmost d bits of the examined memory location within the single-ported RAM 530. In such embodiments, if validity signal 560 is true, then the associated data output 556 will present a d-bit value that is part of a key-value pair stored in the memory of the single-ported RAM 530 whose key matches the key presented to key input 502.

In some embodiments, lookup circuit 500 (and/or other ones of the lookup circuits described herein) may be intended for use within a larger system that makes appropriate decisions as to whether to assert the first write signal 532 or the second write signal 536 when storing index data into the dual-ported RAM 512 of the lookup circuit 500. For example, external circuitry, which may be under software control, may be configured to implement a loading process to load a collection of key-value pairs into a memory in the lookup circuit. Once a set of suitable primary hash functions and index values has been found for a collection of valid key-value pairs and has been stored in the lookup circuit 500, the lookup circuit 500 can be used to perform queries directed to those key-value pairs rapidly, e.g., in constant time.

In some embodiments, the primary hash function sub-circuits 504 and 514 may be "hard-wired," that is, fixed and unchanging. For example, each of them may be implemented as a hardware circuit such as the one illustrated in FIG. 3. In an alternate embodiment, the primary hash function sub-circuits 504 and 514 may be implemented according to Equation 1 shown above, but using a circuit that includes a writable memory that contains information specifying the bit matrix A and the bit vector y. In another alternate embodiment, the primary hash function sub-circuits 504 and 514 may be implemented in a manner other than that specified in Equation 1 shown above, using a circuit that includes a writable memory that allows the precise behavior of the primary hash function sub-circuits to be altered under external control. In various alternate embodiments, external software may be configured to examine a set of key-value pairs, choose a pair of primary hash functions, update the writable memory associated with each of the primary hash function sub-circuits 504 and 514 so that they will operate in a manner consistent with the chosen hash functions, and then proceed to write the index data into the memory of the dual-ported RAM 512 and to write the key-value pairs into the memory of the single-ported RAM 530. In some embodiments, this approach may allow a greater number of sets of key-value pairs to be successfully handled by the lookup circuit 500 than in some existing lookup circuits because the behavior of the hash functions may be customized for any particular set of key-value pairs.

Note that in various embodiments of the lookup circuits described herein, index values suitable for storing into the dual-ported RAM 512 may be computed using any of a variety of suitable techniques. For example, in one embodiment, index values suitable for storing into the dual-ported RAM 512 may be computed using the methods of an algorithm developed by Fabiano C. Botelho, David Menoti and Nivio Ziviani (which is referred to herein as the BMZ algorithm). In another embodiment, z is equal to $2^n$, and index values suitable for storing into the dual-ported RAM 512 may be computed using a graph-construction strategy. For example, a set S of key-value pairs may be converted into a mathematical graph that includes one edge for each key-value pair and one node for each distinct value among all the values that can be produced by applying either of the hash functions F1 and F2 to any key in the set S of key-value pairs. In this example, each edge may connect the two nodes that correspond to the two hash values produced by applying the hash functions F1 and F2 to the key of the key-value pair that corresponds to that edge. If the resulting graph includes a cycle, then the procedure may be configured to report a failure. However, if the resulting graph is acyclic, then a suitable set of index values may be created by first assigning addresses to edges of the graph and then assigning index values to nodes of the graph.

In the first step, each edge may be assigned any n-bit bit string suitable for addressing the single-ported RAM 530, as long as distinct edges are assigned distinct bit strings. In the second step, as long as the graph has a node that is connected by at least one edge and has not been assigned an index value, the third and fourth steps described below are repeated. In the third step, any one node may be chosen arbitrarily and assigned an arbitrary n-bit index value (for example, the bit pattern that is all 0-bits). In the fourth step, as long as the graph contains at least one edge that connects a node that has not yet been assigned an index value to a node that has already been assigned an index value, the following steps are repeated: any one edge (which may be referred to as "e") that connects a node (which may be referred to as "n1") that has not yet been assigned an index value to a node (which may be referred to as "n2") that has already been assigned an index value may be arbitrarily chosen, then the n-bit bit string that is the bitwise XOR of the index value already assigned to n2 and the n-bit bit string assigned to e may be assigned to n1.

In some embodiments, because this graph is acyclic, this procedure will assign an index value to every node of the graph, and each node will be assigned exactly one index value. The index value assigned to each node may then be stored into a memory location in the dual-ported RAM 512 whose address is the hash value to which that node corresponds. In some embodiments, if a key belonging to one of the key-value pairs in the set S is presented to the key input 502, the lookup circuit 500 may be configured to compute two hash values that correspond to the two distinct nodes in the graph connected by the edge corresponding to that key-value pair, and to fetch from the dual-ported RAM 512 the two index values that were assigned to those two nodes. The lookup circuit may then use XOR gates 522 to compute the n-bit address that was assigned to the edge corresponding to that key-value pair.

In this example, because each edge was assigned a distinct n-bit bit pattern, each key will identify a different memory location within the single-ported RAM 530. Therefore, all the key-value pairs in the set S can be stored into distinct memory locations within the single-ported RAM 530, and if a key belonging to one of the key-value pairs in the set S is presented to the key input 502, the lookup circuit 500 will deliver the data associated with that key to the associated data output 556, and assert true for the validity signal 560. In some embodiments, if all of the other locations within the single-ported RAM 530 are written with various ones of the key-value pairs from the set of key-value pairs S, then if a key not belonging to one of the key-value pairs in the set S is presented to the key input 502, the lookup circuit 500 may be configured to assert false for the validity signal 560. Note that a variety of other strategies may be used for computing index values to be used with the lookup circuit 500, in other embodiments.

In some embodiments of the lookup circuits described herein, for each input key that is received, two hash function sub-circuits may be configured to apply respective hash functions to the key, and the resulting hash values may be used to look up data stored in two locations in the memory. The lookup circuit may include a selection sub-circuit (sometimes referred to herein as a selector) that chooses one of those two pieces of data to be provided as an output of the lookup circuit. In some embodiments, the selection of one of the two pieces of data may be controlled by (or at least dependent on) the output of a comparator that is also used in deriving a validity signal, as described herein. In some embodiments, the lookup circuit may include a dual-ported memory (e.g., a dual-ported RAM) in which valid data is stored along with the key with which it is associated. In such embodiments, the two pieces of data are retrieved from the dual-ported memory by presenting each of the two hash values at a different one of the two input ports of the memory, and each of the two key/value pairs is output at a corresponding one of the two output ports of the memory. As previously noted, in some embodiments, at most one of the two pieces of data will include (or be associated with) a key that matches the input key. In such embodiments, the loading process will have chosen to store the data (and also, in some cases, the key) for that key-value pair in one of the two locations identified by the two hash values computed for the input key, and the other location may store data associated with another key that happens to hash to one of the same hash values as the input key.

In some embodiments, in order to determine which of the two pieces of data to provide as an output, the lookup circuit may be configured to determine which of the two locations identified by hashes of the input key contains a key that matches the input key (i.e., which of the two locations is the one into which the loading process decided to store the key-value pair corresponding to the input key). Note that because the loading process described herein results in two (or more) potential locations in which to store data for each key-value pair, in some embodiments, lookup circuits that employ this approach may be able to store data for more keys than lookup circuits that employ other loading schemes. For example, in some other lookup circuits in which multiple keys can hash to the same value (but in which there can be only one location per hashed value), when the loading process attempts to store data for a particular key-value pair in a location identified by a hash of its key, data associated with another key might already be stored there.

In some embodiments of the lookup circuits described herein, when an input key is presented to the circuit, it may be fed to two hash function sub-circuits, the outputs of which will identify respective locations in memory (e.g., in a lookup table or other data structure configured to store information for key-value pairs). In some such embodiments, the identified locations will always (or nearly always) be two different locations. In these embodiments, if the input key and its associated data are stored in the table, the loading process will see to it that they will be stored in one of the two locations that are identified by the outputs of the two hash function sub-circuits. However, because of the nature of hash functions, there may be some chance that the two hash functions will collide. If they do collide, data will be read from the same location twice (e.g., using the identical hash values computed by both hash functions). Note that if there are too many keys in the set of valid key-value pairs that hash to the same hash values (and memory locations), the loading function may fail and a different pair of hash functions may need to be implemented in the lookup circuit to handle the set of valid key-value pairs. In other words, there may be a trade-off to be made in that if there are not too many collisions, the loading process described herein (one that includes the application of multiple hash functions to each input key) may allow a lookup circuit to succeed where another (e.g., a lookup circuit that implements only use one hash function) would not.

Figure 6:
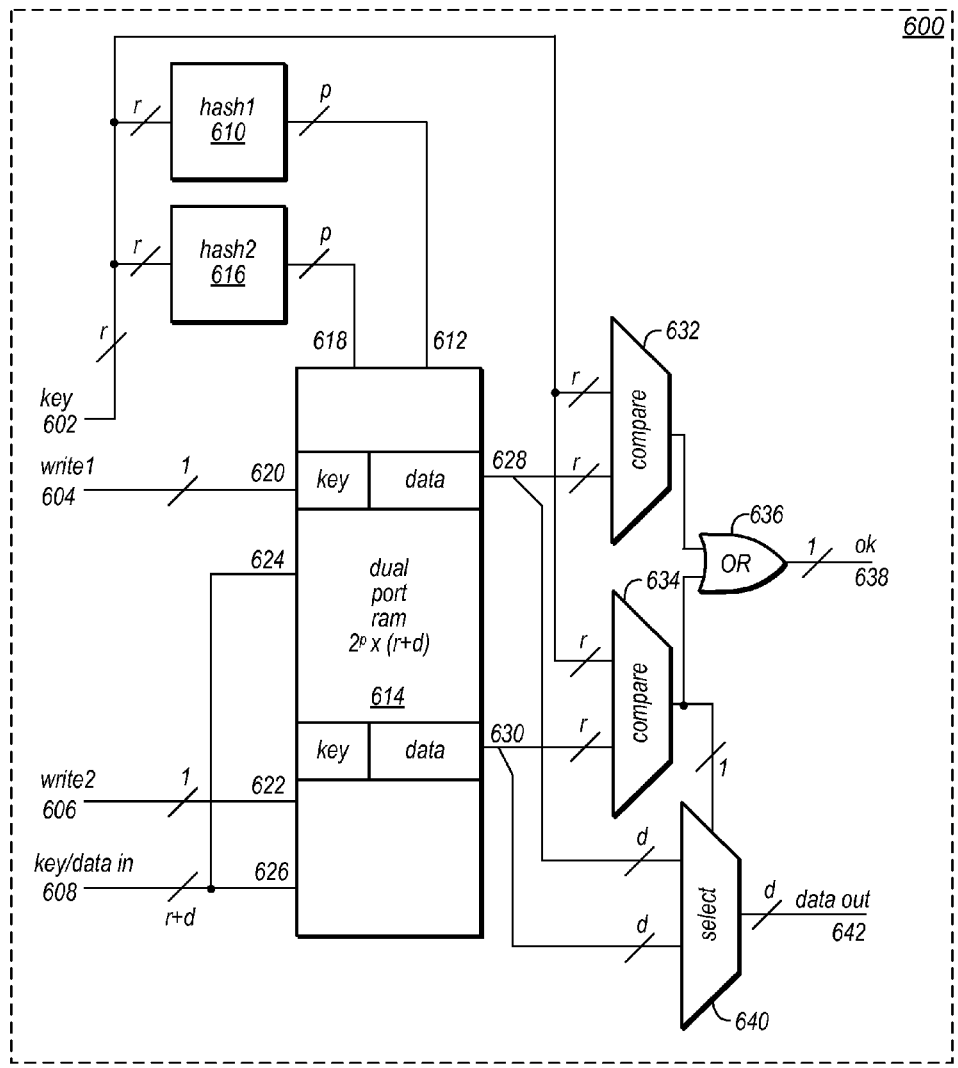
FIG. 6 is a block diagram illustrating a lookup circuit that accepts inputs and produces outputs similar to those accepted and produced by the abstract lookup circuit illustrated in FIG. 4, according to another embodiment.

FIG. 6 is a block diagram illustrating a lookup circuit that is configured to accept inputs and to produce outputs that are similar to those accepted and produced by the abstract circuit 402 shown in FIG. 4, according to another embodiment. In this example, lookup circuit 600 is configured to accept as an input a key 602 (a bit string of length r), corresponding to the input key 404 of FIG. 4. The lookup circuit 600 is also configured to accept a first single-bit write signal 604 and a second single-bit write signal 606, which together correspond to the write signals 410 of FIG. 4 (with w=2). In this example, lookup circuit 600 is also configured to accept r+d bits of key/data input information 608, corresponding to the key/data inputs 412 of FIG. 4.

The lookup circuit 600 includes a first hash function sub-circuit 610 that is configured to accept the key 602 and to produce ap-bit output that is connected to a first address input 612 of a dual-ported RAM 614. In this example, the first address input 612 of the dual-ported RAM 614 is at least p bits wide. In some embodiments, the first hash function sub-circuit 610 may be implemented as p copies of the circuit shown in FIG. 3, using a bit matrix A1 and a bit vector y1. In this example, the lookup circuit 600 also includes a second hash function sub-circuit 616 that is configured to accept the key 602 and to produce ap-bit output that is connected to a second address input 618 of the dual-ported RAM 614. In this example, the second address input 618 of the dual-ported RAM 614 is at least p bits wide. In some embodiments, the second hash function sub-circuit 616 may be implemented asp copies of the circuit shown in FIG. 3, using a bit matrix A2 and a bit vector y2, where A2 may be the same as A1 or may be different from A1, and y2 may be the same as y1 or may be different from y1. As described in more detail herein, in some embodiments, one or both of the p×r bit matrices A1 and A2 may be generated and/or chosen such that they are sparse bit matrices, which may allow the hash functions they represent to be implemented using circuitry with low latency. For example, in each of these matrices, each row of the matrix may include at least twice as many 0-bits as 1-bits, or may be limited to a pre-defined upper bound on the number of 1-bits, in different embodiments.

In lookup circuit 600, the first write signal 604 is connected to a first write-enable input 620 of the dual-ported RAM 614, and the second write signal 606 is connected to a second write-enable input 622 of the dual-ported RAM 614. In this example, the r+d bits of key/data input information 608 are connected to each of a first write-data input port 624 of the dual-ported RAM 614 and a second write-data input port 626 of the dual-ported RAM 614. In this example, dual-ported RAM 614 contains at least $2^p$ words of memory, where each word holds at least r+d bits. In some embodiments, a dual-ported RAM such as 614 dual-ported RAM may be configured to operate, at a clock transition or other specific time, to accept data from the first write-data input port 624 and to write that data into a memory word at an address selected by the p-bit bit string presented at the first address input 612, provided that the first write-enable input 620 is true. However, if the first write-enable input 620 is false, then the data from the first write-data input port 624 will not be written to the memory. Similarly, the dual-ported RAM 614 may be configured to operate, at a clock transition or other specific time, to accept data from the second write-data input port 626 and to write that data into a memory word at an address selected by the p-bit bit string presented at the second address input 618, provided that the second write-enable input 622 is true. However, if the second write-enable input 622 is false, then the data from the second write-data input port 626 will not be written to the memory. In some embodiments, the lookup circuit 600 may be operated in a manner such that the first write signal 604 and the second write signal 606 are never both true at the same time.

In lookup circuit 600, the dual-ported RAM 614 includes a first read-data output port 628, and the dual-ported RAM 614 may be configured to operate, at a clock transition or other specific time, to read a memory word from an address selected by the p-bit bit string presented at the first address input 612, and to present r+d bits of data from that memory word to the first read-data output port 628 (where the leftmost r bits represent the key of a key-value pair and the remaining d bits represent the corresponding data for the key-value pair). In this example, the dual-ported RAM 614 also has a second read-data output port 630, and the dual-ported RAM 614 may be configured to operate, at a clock transition or other specific time, to read a memory word from an address selected by the p-bit bit string presented at the second address input 618 and to present r bits of data from that memory word to the second read-data output port 630 (wherein, again, the leftmost r bits represent the key of a key-value pair and the remaining d bits represent the corresponding data for the key-value pair).

In this example, the lookup circuit 600 includes two comparators that are configured to determine whether a key-value pair corresponding to the input key is stored in the dual-ported RAM 614. For example, lookup circuit 600 includes a first r-bit comparator 632 that has a first input port connected to the key input 602 and a second input port connected to the leftmost r bits of the first read-data output port 628 of the dual-ported RAM 614. In this example, comparator 632 may be configured to produce a single-bit signal indicating whether its two input ports have matching data. In this example, lookup circuit 600 includes a second r-bit comparator 634 that has a first input port connected to the key input 602 and a second input port connected to the leftmost r bits of the second read-data output port 630 of the dual-ported RAM 614. In this example, comparator 634 may be configured to produce a single-bit signal indicating whether its two input ports have matching data. As illustrated in FIG. 6, the lookup circuit 600 also includes a two-input OR gate 636 whose inputs are connected to the respective output signals of comparator 632 and comparator 634. In this example, the output of the OR gate 636 is the validity signal 638 of the lookup circuit 600, which may correspond to the validity signal 406 in FIG. 4. In this example, the comparator 632, the comparator 634, and the OR gate 636 may be configured to produce a value of true for the validity signal 638 if and only if either of the read-data output port 628 and the read-data output port 630 is presenting r+d bits of data of which the leftmost r bits match the input key 602.

In the example, illustrated in FIG. 6, if either of the locations within dual-ported RAM 614 identified by address inputs 612 and 618 contains a key that matches the input key 602, then that location must contain the correct data for the input key 602. In some embodiments, the key-value information may be loaded into the memory in a manner such that the correct data associated with every valid key will be stored in dual-ported RAM 614. In such embodiments, if the input key 602 does not match any valid key in the dual-ported RAM 614 (i.e., if the input key 602 does not match the key in either of the locations identified by the results of the two hash functions), the validity signal 638 will be false, indicating that there is no entry in the lookup circuit for that key. This may mean that an invalid key was presented, since all valid keys should be represented in the memory. In some embodiments, if the validity signal 638 is true, then at least one of the comparators (i.e., 632 and/or 634) found a match. Note that in some embodiments, comparators 632 and 634 might both find a match in the rare case that the two hash functions map to the same location in the memory. However, this may still result in outputting the correct output data (shown as 642), assuming that the key stored in that location matches the input key 602.

In some embodiments, the comparator 632 may be configured to compare two keys by delivering a true signal if and only if the bit strings presented to its two input ports match exactly. In an alternate embodiment, the comparator 632 may be configured to compare two keys by delivering a true signal if and only if the bit strings presented to its two input ports match according to some other criterion, such as whether the bit strings represent character sequences that match if distinctions of alphabetic case (such as uppercase versus lowercase) are ignored. It will be appreciated that the use of other comparators that employ other matching criteria is also possible and falls within the spirit and scope of this disclosure. It will also be appreciated that similar alternatives may be used for the comparator 634.

As illustrated in FIG. 6, the lookup circuit 600 includes a selector 640. In this example, selector 640 has a first d-bit input port connected to the rightmost d bits of the first read-data output port 628 of the dual-ported RAM 614, a second d-bit input port connected to the rightmost d bits of the second read-data output port 630 of the dual-ported RAM 614, and a single-bit control signal connected to the output signal of the second comparator 634. In this example, the output of the selector 640 is the d-bit associated data output 642 of the lookup circuit 600, corresponding to the associated data output 408 in FIG. 4. In some embodiments, selector 640 and comparator 634 may be configured to deliver the rightmost d bits of the second read-data output port 630 of the dual-ported RAM 614 to the associated data output 642 whenever the key 602 matches the leftmost r bits of the second read-data output port 630 of the dual-ported RAM 614, and to deliver the rightmost d bits of the first read-data output port 628 of the dual-ported RAM 614 to the associated data output 642 whenever the key 602 does not match the leftmost r bits of the second read-data output port 630 of the dual-ported RAM 614.

In some embodiments, external circuitry, which may be under software control, may be configured to write a specific key-value pair to a memory location in the dual-ported RAM 614 by presenting the key to key input 602, presenting the key and value together to key/data input 608, and presenting a true signal to the first write-enable input 604. In such embodiments, in response to receiving these inputs, the lookup circuit 600 may be configured to operate, at a clock transition or other specific time, to write the key-value pair presented to the key-data input 608 to a memory location determined by the first hashing function sub-circuit 610 from the key 602. Similarly, external circuitry, which may be under software control, may also be configured to write a specific key-value pair to another (possibly different) memory location in the dual-ported RAM 614 by presenting the key to key input 602, presenting the key and value together to key/data input 608, and presenting a true signal to the second write-enable input 606. In response to receiving these inputs, the lookup circuit 600 may be configured to operate, at a clock transition or other specific time, to write the key-value pair presented to the key-data input 608 to a memory location determined by the second hashing function sub-circuit 616 from the key 602.

In some embodiments, external circuitry, which may be under software control, may be configured to effectively delete a key-value pair from the memory in the dual-ported RAM 614 by presenting the key to key input 602, presenting a different key (from the set of valid keys) and an arbitrary value together to key/data input 608, and presenting a true signal to the first write-enable input 604. In this case, the lookup circuit 600 may be configured to operate, at a clock transition or other specific time, to write the different key and the arbitrary value presented to the key-data input 608 to a memory location determined by the first hashing function sub-circuit 610 from the key 602. External circuitry, which may be under software control, may also be configured to effectively delete a key-value pair from the memory in the dual-ported RAM 614 by presenting the key to key input 602, presenting a different key and an arbitrary value together to key/data input 608, and presenting a true signal to the second write-enable input 606. In this case, the lookup circuit 600 may be configured to operate, at a clock transition or other specific time, to write the different key and the arbitrary value presented to the key-data input 608 to a memory location determined by the second hashing function sub-circuit 616 from the key 602. In each case, if the different key is chosen to be a specific bit pattern that will not match any key intended to be presented as key input 602, then the contents of the memory word after it is written will not match the input key 602 on any future lookup request.

In some embodiments, external circuitry, which may be under software control, may be configured to effectively query the lookup circuit 600 to find out whether it contains associated data for a specific key k by presenting the key k to key input 602. In this case, the lookup circuit 600 may be configured to operate, at a clock transition or other specific time, to examine a first memory location within the dual-ported RAM 614 determined by the first hashing function sub-circuit 610 from the key 602, and also to examine a second memory location within the dual-ported RAM 614 determined by the second hashing function sub-circuit 616 from the key 602. The lookup circuit 600 may then operate to assert true for validity signal 638 if and only if either the first examined memory location or the second examined memory location contains a key (e.g., in the leftmost r bits) that matches key input 602. The lookup circuit 600 may also operate to deliver to associated data output 642 the rightmost d bits of the second examined memory location if and only if the second examined memory location contains a key (e.g., in the leftmost r bits) that matches key input 602. The lookup circuit 600 may also operate to deliver to associated data output 642 the rightmost d bits of the first examined memory location if and only if the second examined memory location contains a key (e.g., in the leftmost r bits) that does not match key input 602. In other words, if validity signal 638 is true, then the associated data output 642 will present a d-bit value that is part of a key-value pair in the memory of the dual-ported RAM 614 whose key matches the key presented to key input 602.

In some embodiments, lookup circuit 600 (and/or other ones of the lookup circuits described herein) may be intended for use within a larger system that makes appropriate decisions, for each key-value pair, as to whether to assert the first write-enable signal 604 or the second write-enable signal 606 when storing a key-value pair into the lookup circuit 600. For example, external circuitry, which may be under software control, may be configured to implement a loading process such as that described herein to load a collection of key-value pairs into a memory in the lookup circuit. Because each key-value pair can be stored into only one of two memory locations, not every set of key-value pairs can be successfully stored in its entirety into the lookup circuit 600. However, in embodiments in which a collection of valid key-value pairs can be successfully stored into the lookup circuit 600, then the lookup circuit 600 can be used to perform queries directed to those key-value pairs rapidly, e.g., in constant time.

Note that in some embodiments, the hash function sub-circuits 610 and 616 may be "hard-wired," that is, fixed and unchanging. For example, each of them may be implemented as a hardware circuit such as the one illustrated in FIG. 3. In an alternate embodiment, the hash function sub-circuits 610 and 616 may be implemented according to Equation 1 shown above, but using a circuit that includes a writable memory that contains information specifying the bit matrix A and the bit vector y. In another alternate embodiment, the hash function sub-circuits 610 and 616 may be implemented in a manner other than that specified in Equation 1 shown above, using a circuit that includes a writable memory that allows the precise behavior of the hash function sub-circuits to be altered under external control. In various alternate embodiments, external software may be configured to examine a set of key-value pairs, choose a pair of hash functions suitable for use in evaluating those key-value pairs, update the writable memory associated with each of the hash function sub-circuits 610 and 616 so that they will operate in a manner consistent with the chosen hash functions, and then proceed to write the key-value pairs into the memory of the dual-ported RAM 614. In some embodiments, this approach may allow a greater number of sets of key-value pairs to be successfully handled by the lookup circuit 600 than in existing lookup circuits because the behavior of the hash functions may be customized for any particular set of key-value pairs.

Note that, in some embodiments, the first primary hash function sub-circuit 504 and the second primary hash function sub-circuit 514 of lookup circuit 500 may both lie on the "critical path" for fetching associated data from lookup circuit 500, because access to that data requires completion of the computation of both primary hash functions. Similarly, the first hash function sub-circuit 610 and the second hash function sub-circuit 616 of lookup table 600 may both lie on the "critical path" for fetching associated data from lookup circuit 600, because access to that data requires completion of the computation of both hash functions. For either of these lookup circuits, it may be desirable to use hash function sub-circuits that have very low latency in an attempt to lower the overall latency of the lookup circuit.

In some embodiments, at least one of the first primary hash function circuit 504 or the second primary hash function circuit 514 (illustrated in FIG. 5) is a circuit that computes a hash function by performing a bit matrix multiplication, or performing a bit matrix multiplication and then a bit vector addition, where the bit matrix is chosen to be sparse, that is, having a small number or proportion of 1-bits in each row, for example, having at least twice as many 0-bits as 1-bits in each row.

In some embodiments, at least one of the first primary hash function circuit 610 or the second hash function circuit 616 (illustrated in FIG. 6) is a circuit that computes a hash function by performing a bit matrix multiplication, or performing a bit matrix multiplication and then a bit vector addition, where the bit matrix is chosen to be sparse, that is, having a small number or proportion of 1-bits in each row, for example, having at least twice as many 0-bits as 1-bits in each row.

In some embodiments, a lookup circuit such as the lookup circuit 500 or the lookup circuit 600 may be implemented as part of (or using) an FPGA device. Such an FPGA device may support the implementation of various forms of combinatorial circuitry by providing multiple instances of a general-purpose LUT (LookUp Table) circuit.

While several examples of low latency lookup circuits are described herein that are configured to apply hash functions by performing a bit matrix multiplication, or by performing a bit matrix multiplication followed by a bit vector addition, using a bit matrix that is chosen or generated such that the bit matrix is sparse, many other variations of such lookup circuits are possible within the spirit and scope of this disclosure.

In some embodiments, the lookup circuits described herein may be loaded, programmed or otherwise supported through the use of various programmed procedures, such as programmed methods for generating a suitable pair of hash functions (based on sparse random bit matrices) for a given set of keys, for constructing the appropriate contents for various hash table memories, and/or for downloading these contents into the circuits prior to using the circuits for performing key lookup operations. In some embodiments, the programmed methods for constructing of a pair of sparse random bit matrices and corresponding hash functions may include multiple components, which may include: a procedure for randomly choosing a matrix of appropriate size; a procedure for testing whether a pair of generated hash functions will effectively hash the given set of keys; and/or an overall procedure that successively generates pairs of candidate matrices and applies the testing procedure until a suitable pair of hash functions is found. Examples of some of these methods are described in detail herein.

One embodiment of a programmed method that may be used to generate a uniformly random bit matrix is illustrated by the example pseudocode below.

```
01    static long[ ] makeRandomMatrix(int nrows,
02        int ncols,
03        Random rng) {
04    assert 0 < nrows;
05    assert 0 < ncols && ncols <= 64;
06    final long[ ] result = new long[nrows];
07    for (int j = 0; j < nrows; j++) {
08        result[j] = rng.nextLong( ) >> (64 – ncols);
09    }
10    return result;
11    }
```

In this example, a programmed method "makeRandomMatrix" (which may be coded in the Java™ programming language) may be used to generate a uniformly random bit matrix, represented as an array of long values, in which each long value represents one row of up to 64 bits. In this example, the programmed method accepts three arguments: the desired number of rows in the matrix "nrows" (declared in line 01), the desired number of columns in the matrix "ncols" (declared in line 02), and a generator of random (or pseudorandom) numbers "rng" (declared in line 03). In this example, the assertion in line 04 requires that the number of rows "nrows" be strictly positive, and the assertion in line 05 requires that the number of columns "ncols" be strictly positive and not greater than 64. Line 06 allocates a new array with the desired number of rows "nrows" and gives it the name "result". In this example, the body of the loop on lines 07 through 09 generates one random word of bits for each row in the matrix, then shifts it right by "64-ncols", so that the rightmost "ncols" bits of the long value are uniformly generated random bits (that is, each bit has a 50% probability of being a 1-bit, independent of all the other bits in the matrix). In this example, line 10 returns the constructed matrix as the output of the programmed method.

In some embodiments, in order to generate a random bit matrix for use in any of the lookup circuits described herein, the programmed method "makeRandomMatrix" shown above may be called with three arguments: a random number generator, an integer value p, and an integer value r. Given these inputs, this programmed method may construct a representation of a matrix having p rows and r columns, whose entries are uniformly generated random bits.

As previously noted, selecting hash functions that implement bit matrix multiplication using sparse random bit matrices, may allow the hash functions to be implemented using circuitry with low latency. In some embodiments, random bit matrices may be generated in a manner that applies a sparseness constraint, and the hash functions generated from these matrices may be implemented in a lookup circuit using the low latency hash function sub-circuits described herein. In various embodiments, such a sparseness constraint may specify a pre-defined upper or lower bound on the number of 1-bits, a pre-defined upper or lower bound on the number of 0-bits, a pre-defined number of 1-bits or 0-bits desired in each row, a constraint on the ratio between the number of 0-bits and the number of 1-bits in each row (e.g., a requirement that there be at least twice as many 0-bits as 1-bits in each row), a constraint on the ratio between the number of 1-bits and the number of 0-bits in each row (e.g., a requirement that there be at least twice as many 1-bits as 0-bits in each row) or another type of constraint on the number of 1-bits and/or the number of 0-bits in each row.

Figure 7:
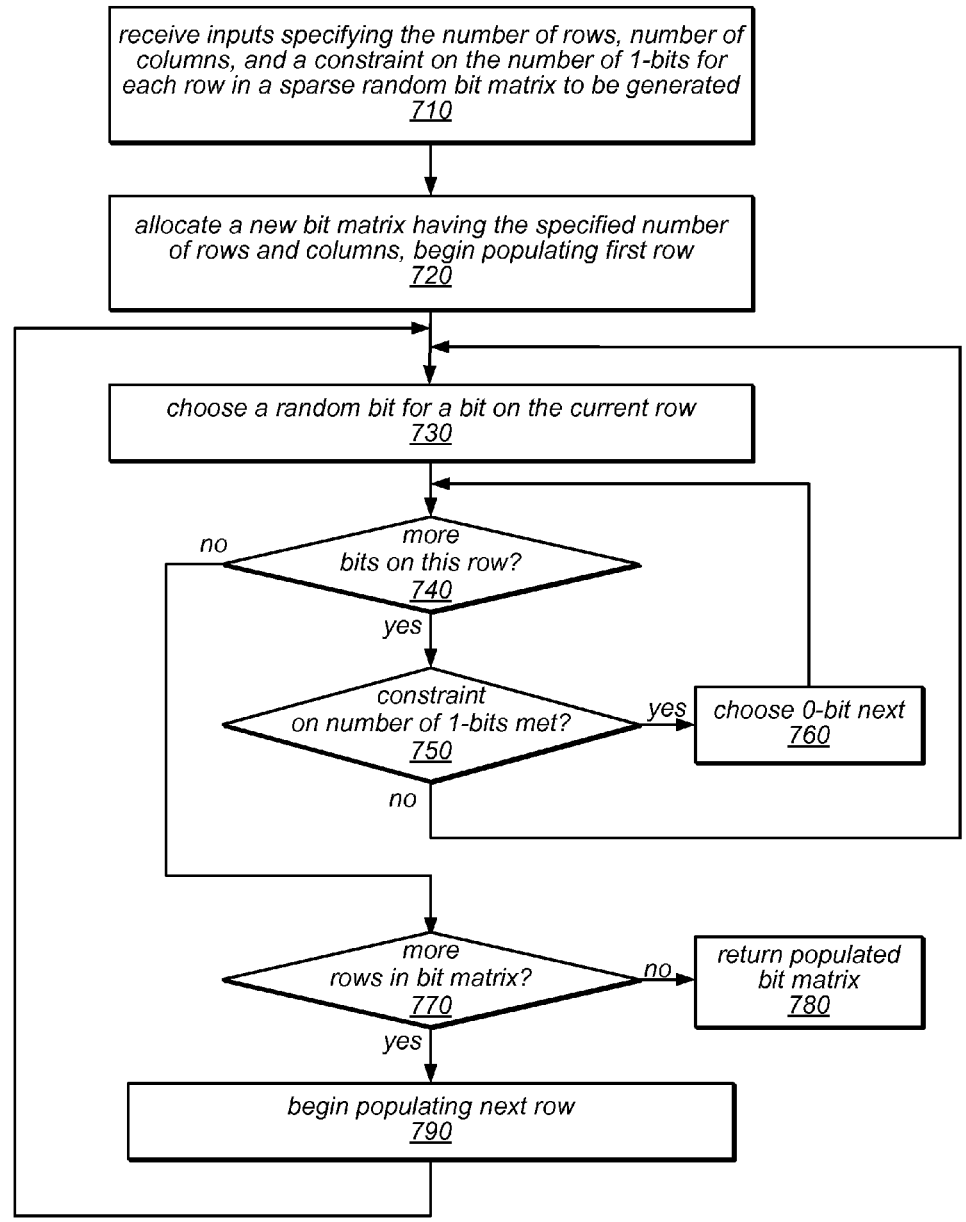
FIG. 7 is a flow diagram illustrating one embodiment of a method for generating a sparse random bit matrix for use in a lookup circuit.

One embodiment of a method for generating a sparse random bit matrix for use in the lookup circuits described herein is illustrated by the flow diagram in FIG. 7. As illustrated at 710, in this example, the method may include receiving inputs specifying the number of rows, the number of columns, and a constraint on the number of 1-bits for each row of a sparse random bit matrix to be generated. In this example, the input may specify a number of 1-bits desired in each row, an upper bound on the number of 1-bits in each row, or a constraint on the ratio between the number of 0-bits and the number of 1-bits in each row. Note that in other embodiments, the method may include receiving one or more other inputs (e.g., the values of various configuration parameters or flags, identifiers of various random or pseudorandom number generators, or other inputs). As illustrated in this example, the method may include allocating a new bit matrix (which may be represented by an array or another data structure) having the specified number of rows and columns, and beginning to populate the first row of the bit matrix, as in 720.

In order to populate the first row of the bit matrix, the method may include choosing a random bit value (i.e., 0 or 1) for a bit in a particular column on the row (as in 730). If there are more bits to be populated on this row (shown as the positive exit from 740), and the specified constraint on the number of 1-bits has not been met for the row (shown as the negative exit from 750), the method may include repeating the operation illustrated at 730 (e.g., choosing a random bit value for the next bit in the row). This is illustrated in FIG. 7 by the feedback from the negative exit of 750 to 740. However, if there are more bits to be populated in this row (shown as the positive exit from 740), but the constraint on the number of 1-bits has been met (shown positive exit of 750) the method may include choosing a 0-bit for the next bit in the row (as in 760).

As illustrated in this example, the operations illustrated in 730-760 may be repeated until the first row of the bit matrix has been populated. Once the first row has been populated, if there are more rows in the bit matrix to be populated (shown as the positive exit from 770), the method may include beginning to populate the next row in the bit matrix (as in 790), and repeating the operations illustrated in 730-760, as needed, in order to populate each additional row. This is illustrated in FIG. 7 by the feedback from the 790 to 730. If there are no more rows to be populated in the bit matrix (or once all of the rows of the bit matrix have been populated), the method may include returning the populated bit matrix. This is illustrated in FIG. 7 by the path from the negative exit of 770 to 780.

One embodiment of a programmed method for generating a random, but sparse, bit matrix (such as those implemented in the lookup circuits described herein) is illustrated by the example pseudocode below.

```
01      static long[ ] makeSparseRandomMatrix(int nrows,
02                         int ncols,
03                         int maxOnes,
04                         boolean exact,
05                         boolean oneLessForSomeRows,
06                         Random rng) {
07          assert 0 < nrows;
08          assert 0 < ncols && ncols <= 64;
09          assert 1 < maxOnes && maxOnes <= ncols;
10          final long[ ] result = new long[nrows];
11          for (int j = 0; j < nrows; j++) {
12              int nbits = maxOnes;
13              if (oneLessForSomeRows && ((j & 1) == 0)) {
14                  nbits = nbits - 1;
15              }
16              result[j] = 1L << rng.nextInt(ncols);
17              for (int k = 1; k < nbits; k++) {
18                  int newBit;
19                  do {
20                      new Bit = 1L << rng.nextInt(ncols);
21                  } while(exact&&((result[j]&newBit)!=0));
22                  result[j] |= newBit;
23              }
24          }
25          return result;
26      }
```

In this example, a programmed method "makeSparseRandomMatrix" (which may be coded in the Java™ programming language) may be used to generate a sparse bit matrix, represented as an array of long values, in which each long value represents one row of up to 64 bits. In this example, the programmed method accepts six arguments: the desired number of rows in the matrix "nrows" (declared in line 01), the desired number of columns in the matrix "ncols" (declared in line 02), an upper bound on the number of 1-bits in each row of the generated matrix "maxOnes" (declared in line 03), a flag "exact" (declared in line 04) that, if true, indicates that "maxOnes" should be treated as an exact requirement on the number of 1-bits per row rather than an upper bound, a flag "oneLessForSomeRows" (declared in line 05) that, if true, indicates that a value one smaller than "maxOnes" should be used as the exact or maximum number of 1-bits for even-numbered rows of the matrix, and a generator of random (or pseudorandom) numbers "rng" (declared in line 05). In this example, the assertion in line 07 requires that the number of rows "nrows" be strictly positive; the assertion in line 08 requires that the number of columns "ncols" be strictly positive and not greater than 64; and the assertion in line 09 requires that the "maxOnes" be strictly positive and not greater than "ncols". Line 10 allocates a new array with the desired number of rows "nrows" and gives it the name "result".

In this example, the body of the loop on lines 11 through 24 generates one word of bits for each row in the matrix, chosen in a specific non-uniform manner. In this example, line 12 sets a local variable "nbits" equal to "maxOnes"; lines 13 through 15 then reduce the value in "nbits" by 1 if (and only if) the flag "oneLessForSomeRows" is true and the row being generated is even-numbered. Line 16 chooses just one bit to set in the current row being generated, by using the "nextInt" method of "rng" to generate a random integer chosen uniformly from the range 0 (inclusive) to "ncols" (exclusive) and then shifting the value "1L" (the value 1 represented as a long integer) to the left by that amount. The inner loop on lines 17 through 23 then executes its body "nbits−1" times.

In this example, line 18 declares a local variable "newbit", which line 20 sets to a word with exactly one 1-bit, chosen in the same manner as on line 16. If the "exact" flag is false, then line 20 is executed just once per iteration of the inner loop on lines 17 through 23. However, if the "exact" flag is true, then the "do" loop on lines 19 through 21 repeats line 20 until "newbit" contains a 1-bit in a position not yet chosen for this row. In either case, the chosen "newbit" value is then logically OR'd into the matrix row being generated. The net effect is that if the "exact" flag is true, then the generated row will include exactly "nbits" 1-bits, but if the "exact" flag is false, then the generated row will include at most "nbits" 1-bits (but at least one 1-bit). Line 25 returns the constructed matrix as the output of the programmed method.

In an alternate embodiment, the programmed method "makeSparseRandomMatrix" may use values of type "BigInteger" rather than "long" values to represent the rows of the generated matrix. In another embodiment, the programmed method "makeSparseRandomMatrix" may use a two-dimensional array of Boolean values to represent the generated matrix. Note that either of these embodiments may be used to generate a matrix that includes rows longer than 64 bits.

In one embodiment, in order to generate a sparse random bit matrix for use in any of the lookup circuits described herein, the programmed method "makeSparseRandomMatrix" shown above may be called with six arguments, e.g., a random number generator, a first integer value p (corresponding to "nrows" in the pseudocode above) a second integer value r (corresponding to "ncols"), a third integer value m (corresponding to "maxOnes"), a first Boolean value false (corresponding to "exact"), and a second Boolean value false (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each row of the generated matrix includes at least one 1-bit, but no more than m 1-bits.

In another embodiment, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value true (corresponding to "exact"), and a second Boolean value false (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each row of the generated matrix includes exactly m 1-bits.

In another embodiment, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value true (corresponding to "exact"), and a second Boolean value true (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each odd-numbered row of the generated matrix includes exactly m 1-bits, and each even-numbered row of the generated matrix includes exactly (m−1) 1-bits.

In some embodiments, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value false (corresponding to "exact"), and a second Boolean value true (corresponding to "oneLessForSomeRows"), such that the assertions on lines 07 through 09 are satisfied. Given these inputs, the programmed method may construct a representation of a matrix having p rows and r columns, whose entries are chosen randomly but non-uniformly, such that each odd-numbered row of the generated matrix includes at least one 1-bit, but no more than m 1-bits, and each even-numbered row of the generated matrix includes at least one 1-bit, but no more than (m−1) 1-bits.

In some embodiments, the programmed method "makeSparseRandomMatrix" shown above may be called with an argument m (corresponding to "maxOnes") such that m=6. In some embodiments of the lookup circuits described herein, multiplication of an input key (one represented by a bit vector) with the sparse bit matrix produced by the method in this case may be implemented in a hash function sub-circuit that includes odd-parity-of-6 circuits. In other embodiments, the programmed method "makeSparseRandomMatrix" shown above may be called with an argument m such that m=11 or m=12. In some embodiments, multiplication of an input key (one represented by a bit vector) with the sparse bit matrix produced by the method in this case may be implemented in a hash function sub-circuit that includes odd-parity-of-11 circuits or odd-parity-of-12 circuits, such as those described herein.

As illustrated in the examples described herein, in some embodiments, the programmed method "makeSparseRandomMatrix" shown above may be called with an argument corresponding to "exact" that is false. In other embodiments, the programmed method "makeSparseRandomMatrix" shown above may be called with an argument corresponding to "exact" that is true. The use of an argument corresponding to "exact" may allow an application that calls the programmed method "makeSparseRandomMatrix" to control the number of 1-bits per row exactly or to allow flexibility in the number of 1-bits per row up to an upper bound, which may allow more options for the resulting bit matrices and the hash function circuits that employ them. Similarly, in some embodiments, the programmed method "makeSparseRandomMatrix" shown above may be called with an argument corresponding to "oneLessForSomeRows" that is false, while in other embodiments, the programmed method "makeSparseRandomMatrix" shown above may be called with an argument corresponding to "oneLessForSomeRows" that is true. The use of an argument corresponding to "oneLessForSomeRows" may allow an application that calls the programmed method "makeSparseRandomMatrix" to control whether the same constraint is applied to all rows of the resulting matrix or two different constraints are applied to all rows of the resulting matrix, which may in turn affect the available options for implementing the hash function circuits that employ these matrices.

In some embodiments, in order to generate a sparse random bit matrix for use in any of the lookup circuits described herein, the programmed method "makeSparseRandomMatrix" shown above may be called with the following six arguments: a random number generator, a first integer value p (corresponding to "nrows") a second integer value r (corresponding to "ncols"), a third integer value m (corresponding to "maxOnes"), a first Boolean value corresponding to "exact" (either true or false), and a second Boolean value corresponding to "oneLessForSomeRows" (either true or false), such that the assertions on lines 07 through 09 are satisfied, and moreover such that m is not greater than ⅓ the mathematical value of r. Given these inputs, the programmed method may construct a representation of a matrix having p rows and r columns, whose entries are chosen randomly but non-uniformly, such that each row of the generated matrix has at least twice as many 0-bits as 1-bits. For example, the programmed method "makeSparseRandomMatrix" shown above may called with an argument m (corresponding to "maxOnes") such that $$m = \text{floor}\left(\frac{r}{3}\right),$$

where "floor(x)" denotes the largest integer that is not larger than x. This computation of m results in a value that is not greater than ⅓ the mathematical value of r.

For example, in one embodiment, the programmed method "makeSparseRandomMatrix" shown above may be called with an argument r (corresponding to "ncols") such that r is not less than 18 and an argument m (corresponding to "max-Ones") such that m=6. In this example, the computation of $$m = \text{floor}\left(\frac{r}{3}\right)$$

results in a value of m that is not greater than $$\frac{1}{3}$$

the mathematical value of r. In another example, the programmed method "makeSparseRandomMatrix" shown above may be called with an argument r (corresponding to "ncols") such that r is not less than 36 and an argument m (corresponding to "maxOnes") such that m=12. In this example, the computation of $$m = \text{floor}\left(\frac{r}{3}\right)$$

results in a value of m that is not greater than ⅓ the mathematical value of r. In both of these cases, the bit matrix resulting from the execution of the programmed method "makeSparseRandomMatrix" shown above will be a bit matrix in which each row of the generated matrix has at least twice as many 0-bits as 1-bits.

As described herein, in some embodiments, a lookup circuit (e.g., the lookup circuit 500 or the lookup circuit 600) may be used to access data associated with a key presented to key input signals. The lookup circuit may include one or more hash function sub-circuits, each of which computes a p-bit hash value from an r-bit key by multiplying the key by a p×r bit-matrix, or by multiplying the key by a p×r bit-matrix and then adding a p-bit bit vector.

In some embodiments, the p×r bit-matrix may be chosen (or generated) so as to be sparse. For example, the p×r bit-matrix may be chosen (or generated) so that each row has at least twice as many 0-bits as 1-bits. In some embodiments, the p×r bit-matrix may be generated by calling the programmed method "makeSparseRandomMatrix" shown above. For example, in addition to the combinations of arguments described above, the programmed method "makeSparseRandomMatrix" shown above may be called with the following sets of arguments, each of which may result in the generation of a sparse bit matrix suitable for implementation within one of the hash function sub-circuits described herein: (p=18, r=96, and m=2), (p=18, r=72, and m=6), or (p=13, r=48, and m=6).

As illustrated in FIG. 2, in some embodiments, the lookup circuits described above may be used in conjunction with methods for generating sparse random bit matrices and corresponding hash functions, for determining the suitability of various sets (e.g., pairs) of hash functions for implementation in the lookup circuits, and for loading a set of hash functions into the lookup circuits.

For example, in some embodiments, a bit matrix (or set of bit matrices) generated by a programmed method "makeSparseRandomMatrix" (such as that described herein) may be tested against a specific set of keys to determine whether the bit matrix (or set of bit matrices) is suitable for hashing that specific set of keys for use with the lookup circuit. In some embodiments, if testing determines that the bit matrix (or set of bit matrices) generated by the programmed method "makeSparseRandomMatrix" is not suitable for hashing a specific set of keys for use with the lookup circuit, the programmed method "makeSparseRandomMatrix" may be called again, repeatedly, until either a suitable bit matrix (or set of bit matrices) is generated or a resource limit (e.g., a time limit or a fixed number of iterations) has been exhausted. Once a suitable bit matrix (or set of bit matrices) has been identified, the corresponding hash functions may be programmed or otherwise loaded into the lookup circuit. In some embodiments, a hash function may be represented as a bit matrix plus a bit vector in a data structure that includes both a bit matrix and a bit vector.

One embodiment of a programmed method for initializing memories in lookup circuit 500 is illustrated by the example pseudocode below. In this example, the programmed method employs a BMZ insertion algorithm, although other insertion algorithms may be employed in other embodiments.

```
01  initializeXorCircuitTables(keyMatrix, dataMatrix, p, n, rng)
02      result := generateTwoHashFunctions(keyMatrix, p, rng)
03      if (result = FAILURE) ERROR
04      (Ap, Aq, yq) := result
05      h1 := the function (v => Ap v)
06      h2 := the function (v => (Aq v) XOR yq)
07      specialKeyFound := false
08      for j := 0 through ((number of columns in keyMatrix) - 1)
09          if (h1(column j of keyMatrix) ≠ h2(column j of keyMatrix)) then
10              specialKeyFound := true
11              specialKey := column j of keyMatrix
12          end if
13      end for
14      if (not specialKeyFound) ERROR
15      table := matrix of size (2^p) x n
16      (use BMZ insertion algorithm with hash functions
17          h1 and h2 to insert indices into the table)
18      (reprogram the FPGA implementing circuit 500 using
19          the bit matrices Ap and Aq and the bit vector yq so that
20          the first hash function circuit 504 computes h1
21          and the second hash function circuit 514 computes h2)
22      for one clock cycle of circuit 500
23          present specialKey as KEY input 502
24          present 0 as INDEX IN signal 540
25          assert WRITE1 signal 532
26          do not assert WRITE2 signal 536
27          do not assert WRITE3 signal 546
28      end clock cycle
29      for j := 0 through (2^n - 1)
30          for one clock cycle of circuit 500
31              present specialKey as KEY input 502
32              present j as INDEX IN signal 540
33              do not assert WRITE1 signal 532
34              assert WRITE2 signal 536
35              do not assert WRITE3 signal 546
36          end clock cycle
37          for one clock cycle of circuit 500
38              present specialKey as KEY input 502
39              present (specialKey, 0) as KEY/DATA IN signal 550
40              do not assert WRITE1 signal 532
41              do not assert WRITE2 signal 536
42              assert WRITE3 signal 546
43          end clock cycle
44      end for
45      for every key K that is a column of keyMatrix do
```

```
46        D := corresponding column of dataMatrix
47        v1 := h1(K)
48        v2 := h2(K)
49        i1 := element v1 of table
50        i2 := element v2 of table
51        for one clock cycle of circuit 500
52            present K as KEY input 502
53            present i1 as INDEX IN signal 540
54            assert WRITE1 signal 532
55            do not assert WRITE2 signal 536
56            do not assert WRITE3 signal 546
57        end clock cycle
58        for one clock cycle of circuit 500
59            present K as KEY input 502
60            present i2 as INDEX IN signal 540
61            do not assert WRITE1 signal 532
62            assert WRITE2 signal 536
63            do not assert WRITE3 signal 546
64        end clock cycle
65        for one clock cycle of circuit 500
66            present K as KEY input 502
67            present (K, D) as KEY/DATA IN input 550
68            do not assert WRITE1 signal 532
69            do not assert WRITE2 signal 536
70            assert WRITE3 signal 546
71        end clock cycle
72    end for
```

In this example, a programmed method "initializeXorCircuitTables" may be used to load appropriate data into the dual-ported RAM 512 and the single-ported RAM 530 of the lookup circuit 500. In this example, the programmed method accepts five arguments: a first bit matrix "keyMatrix" of size $(r \times k)$, where $k < 2^r$, whose r-bit columns represent keys and whose columns are all different, thus representing a set of keys; a second bit matrix "dataMatrix" of size $(d \times k)$ containing data associated with the keys; a first positive integer "p" indicating the desired number of bits in each hash value; a second positive integer "n" indicating the desired number of bits in each index used to address the single-ported RAM 530; and a source "rng" of random or pseudorandom numbers. In this example, line 02 includes a call to a programmed procedure "generateTwoHashFunctions", which will produce either the value "FAILURE" or a triplet that contains two bit matrices of size $(p \times r)$ and a bit vector of size p. Line 03 detects whether the returned value is "FAILURE", and if it is, an error is signaled. Otherwise, line 04 gives the name Ap to the first bit matrix, the name Aq to the second bit matrix, and the name yq to the bit vector. Line 05 gives the name h1 to a function that will multiply a key v by the matrix Ap. Similarly, line 06 gives the name h2 to a function that will multiply a key v by the matrix Aq and then XOR the result with the bit vector yq. In some embodiments, each of the functions h1 and h2 may be configured to accept an r-bit key and to produce a p-bit hash value In the example pseudocode above, line 07 assigns the value "false" to a Boolean flag variable named "specialKeyFound". In this example, the loop in lines 08 through 13 performs a search for some column in "keyMatrix" such that the hash functions h1 and h2 give different results when applied to the key in that column. If such a key is found by the test in line 09, line 10 will assign the value "true" to the Boolean flag variable "specialKeyFound", and line 11 will give the identified key the name "specialKey". In this example, line 14 will signal an error if the Boolean flag variable "specialKeyFound" still contains the value "false" on completion of the loop in lines 08 through 13. Note that, in some embodiments, if line 14 does not signal an error, then the value of "specialKey" is a key for which the hash functions h1 and h2 produce distinct results.

In the example pseudocode above, lines 15 through 17 create a table and use the BMZ algorithm to fill it with index data. Note that in other embodiments, any of a variety of suitable algorithms may be used to fill the table with index data. Lines 18 through 21 indicate that an FPGA reprogramming process is used to configure the circuitry so that the first hash function sub-circuit 504 computes the hash function h1 and the second hash function sub-circuit 514 computes the hash function h2.

In this example, lines 22 through 28 perform an operation during a first clock cycle that writes the index value 0 into the dual-ported RAM 512 at an address that is computed from the key "specialKey" by the first hash function sub-circuit 504.

In this example, the body of the loop on lines 29 through 44 performs operations during two clock cycles of the lookup circuit 500 for every possible value j from 0 through $2n-1$. Lines 30 through 36 perform an operation during a first clock cycle for the value j that writes the index value j into the dual-ported RAM 512 at an address that is computed from the key "specialKey" by the second hash function circuit 514. In some embodiments, the address computed from the key "specialKey" by the second hash function sub-circuit 514 may be different from the address computed from the key "specialKey" by the first hash function sub-circuit 504. In this example, lines 37 through 43 perform an operation during a second clock cycle for the value j that writes the key-value pair ("specialKey", 0) into the single-ported RAM 530 at the address j (which is computed from the index values 0 and j by the XOR gates 522). Note that, in some embodiments, on completion of the loop in lines 29 through 44, every location in the single-ported RAM 530 may contain a key-value pair whose key portion is equal to "specialKey".

In this example, the body of the loop on lines 45 through 72 performs operations during three clock cycles of the lookup circuit 500 for every key "K" in "keyMatrix". Line 46 gives the name "D" to the column in "dataMatrix" that corresponds to the key K. Line 47 gives the name "v1" to the hash value produced by applying the hash function h1 to K. Similarly, line 48 gives the name "v2" to the hash value produced by applying the hash function h2 to K. In this example, line 49 gives the name "i1" to the index value obtained by using v1 to index the table, while line 50 gives the name "i2" to the index value obtained by using v2 to index the table.

In this example, lines 51 through 27 perform an operation during a first clock cycle for the key K that writes the index value i1 into the dual-ported RAM 512 at the address v1 (which is computed from the key K by the first hash function sub-circuit 504). Lines 58 through 64 perform an operation during a second clock cycle for the key K that writes the index value i2 into the dual-ported RAM 512 at the address v2 (which is computed from the key K by the second hash function sub-circuit 514). Lines 65 through 71 perform an operation during a third clock cycle for the key K that writes the key-value pair (K, D) into the single-ported RAM 530 at the address "i1 XOR i2" (which is computed from the index values i1 and i2 by the XOR gates 522). Note that in this example, the loop on lines 45 through 72 may, for some of the index values, redundantly write that index value multiple times into the same location in the dual-ported RAM 512. Note also that, in this example, whenever a key-value pair is to be written into the single-ported RAM 530, the necessary index values for addressing the single-ported RAM 530 for that key-value pair will already have been stored into the dual-ported RAM 512.

One embodiment of a programmed method for initializing memories in lookup circuit 600 is illustrated by the example pseudocode below. In this example, the programmed method employs a Cuckoo hashing insertion algorithm, rather than a BMZ insertion algorithm. Note, however, that other insertion algorithms may be employed in other embodiments.

```
01  initializeCuckooCircuitTables(keyMatrix, dataMatrix, p, rng)
02    result := generateTwoHashFunctions(keyMatrix, p, rng)
03    if (result = FAILURE) ERROR
04    (Ap, Aq, yq) := result
05    h0 := the function (v => (p low-order bits of v))
06    h1 := the function (v => Ap v)
07    h2 := the function (v => (Aq v) XOR yq)
08    specialKey := first column of keyMatrix
09    specialData := first column of dataMatrix
10    (reprogram the FPGA implementing circuit 600 using
11       a matrix that is a p x p identity matrix padded with 0-columns
12       so that the first hash function circuit 610 computes h0)
13    for i := 0 through (2^p – 1)
14       for one clock cycle of circuit 600
15          present i, padded on the left with (r-p) 0-bits, as KEY input 602
16          present (specialKey, specialData) as KEY/DATA IN input 608
17          assert WRITE1 signal 604
18          do not assert WRITE2 signal 606
19       end clock cycle
20    end for
21    unusedKey := some key different from every column of keyMatrix
22    table := (a matrix of size (2^p)x(k+d)
23             with every row equal to (unusedKey, 0) )
24    (use cuckoohash insertion algorithm with hash functions
25     h1 and h2 to insert (key, data) pairs into table)
26    (reprogram the FPGA implementing circuit 600 using
27       the bit matrices Ap and Aq and the bit vector yq so that
28       the first hash function circuit 610 computes h1
29       and the second hash function circuit 616 computes h2)
30    for i := 0 through (2^p – 1)
31       (K, D) := entry i of table
32       if (K ≠ unusedKey) then
33          for one clock cycle of circuit 600
34             present K as KEY input 602
35             present (K, D) as KEY/DATA IN input 608
36             if (h1(k) = i) then
37                assert WRITE1 signal 604
38                do not assert WRITE2 signal 606
39             else
40                do not assert WRITE1 signal 604
41                assert WRITE2 signal 606
42             end if
43          end clock cycle
44       end if
45    end for
```

In this example, a programmed method "initializeCuckooCircuitTables" may be used to load appropriate data into the dual-ported RAM 614 of the lookup circuit 600. In this example, the programmed method accepts four arguments: a first bit matrix "keyMatrix" of size (r×k), where k<$2^r$, whose r-bit columns are keys and whose columns are all different, thus representing a set of keys; a second bit matrix "dataMatrix" of size (d×k) containing data associated with the keys; a positive integer "p" indicating the desired number of bits in each hash value; and a source "rng" of random or pseudorandom numbers. In this example, line 02 includes a call to a programmed procedure "generateTwoHashFunctions", which will produce either the value "FAILURE" or a triplet containing two bit matrices of size (p×r) and a bit vector of size p. In this example, line 03 detects whether the returned value is "FAILURE", and if it is, an error is signaled. Otherwise, line 04 gives the name Ap to the first bit matrix, the name Aq to the second bit matrix, and the name yq to the bit vector.

In this example, line 05 gives the name h0 to a function that will return the p low-order bits of a key v; note that this is mathematically equivalent to multiplying the key v by an appropriately chosen matrix of size (p×r) that has exactly one 1-bit in each of its p rows. In this example, line 06 gives the name h1 to a function that will multiply a key v by the matrix Ap, and line 07 gives the name h2 to a function that will multiply a key v by the matrix Aq and then XOR the result with the bit vector yq. In some embodiments, each of the functions h1 and h2 may be configured to accept an r-bit key and to produce ap-bit hash value. In this example, line 08 gives the name "specialKey" to the key that is in the first column of "keyMatrix", and line 09 gives the name "specialData" to the data that is in the first column of "dataMatrix". In other embodiments, a column number j other than 1 may be chosen. In such embodiments, the name "specialKey" may be given to the key that is in column j of "keyMatrix", and the name "specialData" may be given to the data that is in column j of "dataMatrix".

In the example pseudocode above, lines 10 through 12 indicate that an FPGA reprogramming process is used to configure the circuitry so that the first hash function sub-circuit 610 computes the hash function h0. In this example, the operations in the body of the loop on lines 13 through 20 are performed during one (respective) clock cycle of the lookup circuit 600 for each of the $2^p$ indexes into table. Lines 14 through 19 perform operations during a single clock cycle that write the key-value pair (specialKey, specialData) into the dual-ported RAM 614 at an address computed by the first hash function sub-circuit 610. Note that, in some embodiments, the address computed by the first hash function sub-circuit 610 may be equal to the loop index i.

In this example, line 21 gives the name "unusedKey" to any arbitrarily chosen bit pattern that does not appear as a column in "keyMatrix". In some embodiments, the lexicographically smallest such pattern may be chosen. Note that, in some embodiments, there must be such a pattern because of the constraint k<$2^r$.

In the example pseudocode above, lines 22 through 25 create a table (called "table") and use a Cuckoo hashing algorithm to fill it with key-value pairs. Lines 26 through 29 indicate that an FPGA reprogramming process is used to configure the circuitry so that the first hash function sub-circuit 610 computes the hash function h1 and the second hash function sub-circuit 616 computes the hash function h2. In this example, the operations in the body of the loop on lines 30 through 44 (more specifically, lines 33 through 43) are performed during one (respective) clock cycle of the lookup circuit 600 for each of the $2^p$ indexes into table. Line 31 gives the names "K" and "D" to the key and data information from entry i the table, respectively.

Lines 33 through 43 perform operations during a single clock cycle that write the key-value pair into the dual-ported RAM 614 at an address computed by either the first hash function circuit 610 or the second hash function circuit 616 from the key K. In this example, the determination of which of the two addresses is used is performed in lines 36 through 42 in such a way that the address chosen will be i.

Figure 8:
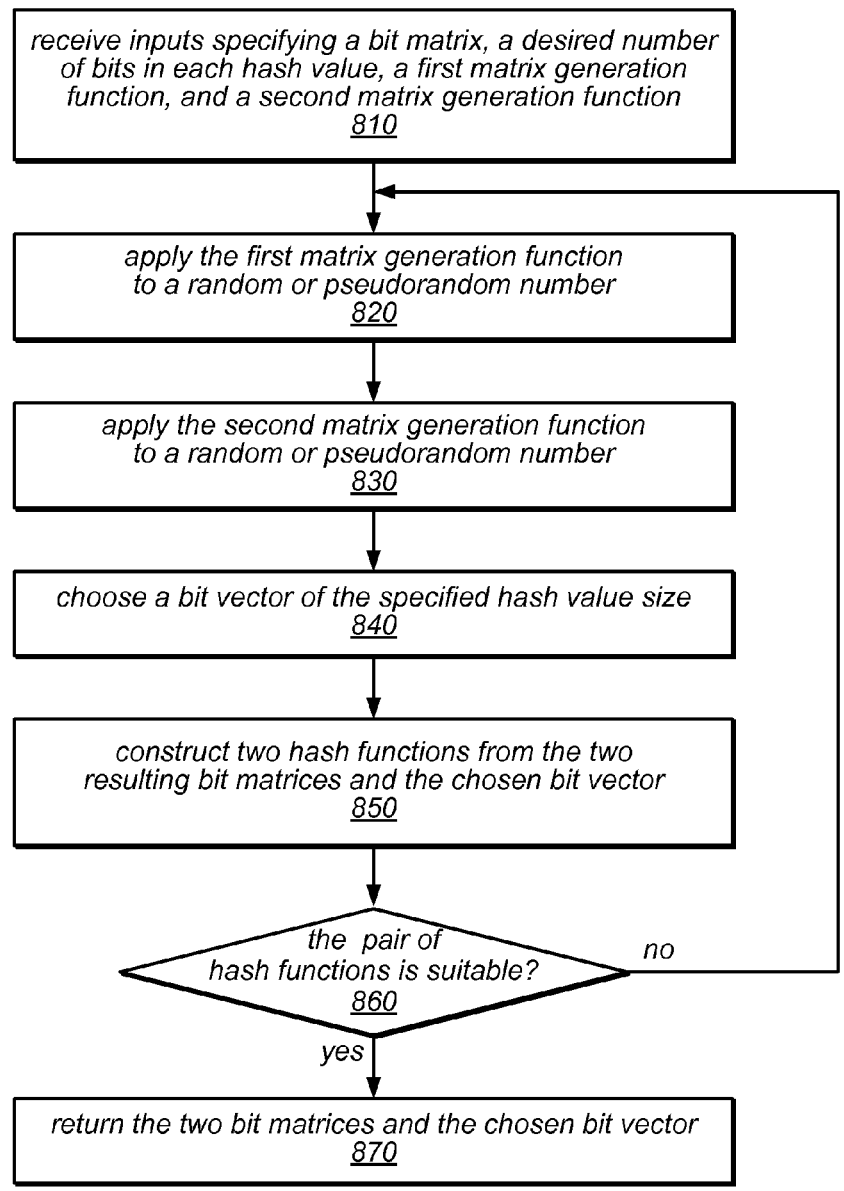
FIG. 8 is a flow diagram illustrating one embodiment of a method for computing a pair of hash functions for use in the lookup circuits described herein.

One embodiment of a method for computing a pair of hash functions for use in the lookup circuits described herein is illustrated by the flow diagram in FIG. 8. As illustrated at 810, in this example, the method may include receiving inputs specifying an input bit matrix (e.g., a key matrix), a desired number of bits in each hash value, a first matrix generation function, and a second matrix generation function. Note that in other embodiments, the method may include receiving one or more other inputs (e.g., the values of various configuration parameters or flags, identifiers of various random or pseudo-random number generators, or other inputs). As illustrated in this example, the method may include applying the first matrix generation function to a random or pseudorandom number (as in 820), applying the second matrix generation function to a random or pseudorandom number (as in 830), and choosing a bit vector of the specified hash value size (as in 840).

The method may include constructing two hash functions from the two resulting bit matrices (i.e., those generated by the application of the first and second matrix generation functions to respective random or pseudorandom numbers) and the chosen bit vector, as in 850. If the pair of hash functions is determined not to be suitable for use hashing the input key matrix in the lookup circuit (shown as the negative exit from 860), the method may include repeating the operations illustrated in 820-850 until a suitable pair is found. However, if the pair of hash functions is determined to be suitable for used in the lookup circuit (or once a suitable pair of hash functions has been identified), the method may include returning the two corresponding bit matrices and the chosen bit vector. This is illustrated in FIG. 8 by the path from the positive exit of 860 to 870.

In some embodiments, the methods described herein for computing two matrices and a bit vector for use in hash functions (such as those implemented in the lookup circuits described herein) may be implemented using program instructions that when executed on one or more computers cause the computer to perform these methods. One embodiment of a programmed method for computing two matrices and a bit vector for use in hash functions, given two matrix generation functions, is illustrated by the example pseudocode below.

```
01    searchTwoMatrices(keyMatrix, p, gen1, gen2, rng)
02      while (resources are not exhausted)
03        Ap := gen1(rng)
04        Aq := gen2(rng)
05        yq := (bit vector of size p, chosen either
06               randomly using rng or arbitrarily)
07        hp := the function (k => Ap k)
08        hq := the function (k => (Aq k) XOR yq)
09        if (functions hp and hq are suitable for hashing
10            the set of columns in keyMatrix) then
11          return (Ap, Aq, yq)
12        end if
13      end while
14      return FAILURE
```

In this example, the programmed method "searchTwoMatrices" may be used to compute a pair of hash functions suitable for hashing a given set of keys. In various embodiments, a pair of hash functions generated by this programmed method may be implemented in any of the lookup circuits described herein. For example, each of the hash functions in the pair may be implemented in a respective hash function sub-circuit within the lookup circuit, as described herein. In this example, the programmed method accepts five arguments: a bit matrix "keyMatrix" of size (r×k), where $k<2^r$, whose r-bit columns are keys and whose columns are all different, thus representing a set of keys; a positive integer "p" indicating the desired number of bits in each hash value; a first matrix generation function "gen1" that, when given a source of random or pseudorandom numbers, will return a bit matrix of size (p×r); a second matrix generation function "gen2" that, when given a source of random or pseudorandom numbers, will return a bit matrix of size (p×r); and a source "rng" of random or pseudorandom numbers.

In this example, each of the first matrix generation function gen1 and the second matrix generation function gen2 is applied to the source "rng", to generate bit matrices Ap and Aq, respectively. In addition, a bit vector of size p is also chosen, either arbitrarily or randomly using "rng". In lines 07 and 08, two hash functions "hp" and "hq" are constructed from the two matrices and the bit vector. In lines 09 and 10, the hash functions are tested for suitability, for example by testing whether the graph they induce on the given set of keys in "keyMatrix" is acyclic. In this example, these steps may be carried out repeatedly until a suitable pair of hash functions is found, in which case a triplet of the two bit matrices and the bit vector are returned (at line 11), or until computational resources are exhausted, in which case a "FAILURE" indication is returned (at line 14).

In some embodiments, the methods described herein for creating a matrix generation function may be implemented using program instructions that when executed on one or more computers cause the computer to perform these methods. For example, three alternate embodiments of a programmed method for creating a matrix generation function are illustrated in the example pseudocode below.

```
01    makeMatrixGenerator(keyMatrix, p, rng)
02      r := number of rows in keyMatrix
03      return (the function (rng2 => makeRandomMatrix(p, r, rng2)))
11    makeMatrixGenerator(keyMatrix, p, rng)
12      r := number of rows in keyMatrix
13      return (the function (rng2 =>
14            makeSparseRandomMatrix(p, r, maxOnes, exact,
15            oneLessForSomeRows, rng2))
16        for suitable values of maxOnes,
17        exact, and oneLessForSomeRows)
20    makeMatrixGenerator(keyMatrix, p, rng)
21      return (precompute(keyMatrix, p, c, rc, cc, cr, rng)
22        for suitable values of c, rc, cc, and cr)
```

The pseudocode in lines 01 to 03 illustrates an embodiment of the programmed method "makeMatrixGenerator" that may be used to compute a function that, when given a source of random or pseudorandom numbers, will return a bit matrix of size (p×r). In this example, the programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers (which are not used by this specific implementation of the "makeMatrixGenerator" method). In this example, line 02 determines the value "r". Line 03 returns a function that accepts an argument rng2 and calls the programmed method "makeRandomMatrix" (as described above) to generate a bit matrix of size (p×r).

The pseudocode in lines 11 to 17 illustrates an alternate implementation of the programmed method "makeMatrixGenerator" that may be used to compute a function that, when given a source of random or pseudorandom numbers, will return a bit matrix of size (p×r). As in the previous example, this programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, line 12 determines the value "r". Lines 13 through 17 return a function that accepts an argument rng2 and calls the programmed method "makeSparseRandomMatrix" (as described above) to generate a bit matrix of size (P r). In some embodiments, fixed values of "maxOnes", "exact" and/or "oneLessForSomeRows" may be used when calling the programmed method "makeSparseRandomMatrix". In other embodiments, at least one of the values for "maxOnes", "exact" and/or "oneLessForSomeRows" may be chosen randomly (e.g., using "rng").

The pseudocode in lines 20 to 22 illustrates yet another alternate implementation of the programmed method "makeMatrixGenerator" that may be used to compute a function that, when given a source of random or pseudorandom numbers, will return a bit matrix of size (p×r). As in the previous examples, this programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, lines 21 through 22 return a function that accepts an argument "rng" and calls a programmed method "makeSparseRandomMatrix" (as described herein) to generate a bit matrix of size (p×r). In this example, the function is constructed by calling a programmed method "precompute", whose arguments are the inputs "keyMatrix" and "p", and four other values "c", "rc", "cc" and "cr", which is described below.

In some embodiments, the methods described herein for computing two matrices and a bit vector for use in hash functions (such as those implemented in the lookup circuits described herein) may be implemented using program instructions that when executed on one or more computers cause the computer to perform these methods. Several alternate embodiments of a programmed method for computing two matrices and a bit vector for use in hash functions are illustrated in the example pseudocode below.

```
01    generateTwoHashFunctions(keyMatrix, p, rng)
02        gen1 := makeMatrixGenerator(keyMatrix, p, rng)
03        gen2 := makeMatrixGenerator(keyMatrix, p, rng)
04        return searchTwoMatrices(keyMatrix, p, gen1, gen2, rng)
11    generateTwoHashFunctions(keyMatrix, p, rng)
12        gen := makeMatrixGenerator(keyMatrix, p, rng)
13        return searchTwoMatrices(keyMatrix, p, gen, gen, rng)
21    generateTwoHashFunctions(keyMatrix, p, rng)
22        gen := makeMatrixGenerator(keyMatrix, p, rng)
23        return searchTwoMatrices1(keyMatrix, p, gen, rng)
31    generateTwoHashFunctions(keyMatrix, p, rng)
32        gen1 := makeMatrixGenerator(keyMatrix, p, rng)
33        gen2 := makeMatrixGenerator(keyMatrix, p, rng)
34        return searchTwoMatrices2(keyMatrix, p, gen1, gen2, rng)
41    generateTwoHashFunctions(keyMatrix, p, rng)
42        gen1 := makeMatrixGenerator(keyMatrix, p, rng)
43        gen2 := makeMatrixGenerator(keyMatrix, p, rng)
44        gen3 := makeMatrixGenerator(keyMatrix, p, rng)
45        return searchTwoMatrices3(keyMatrix, p, gen1, gen2, gen3, rng)
```

The pseudocode in lines 01 to 03 illustrates an embodiment of the programmed method "generateTwoHashFunctions" that may be used to compute a pair of hash functions suitable for hashing a given set of keys. In this example, the programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, line 02 includes a call to a programmed method "makeMatrixGenerator" (e.g., one of the variations of this programmed method described above) to create a first matrix generation function gen1, and line 03 includes a call to a programmed method "makeMatrixGenerator" (e.g., one of the variations of this programmed method described above) to create a second matrix generation function gent. In this example, line 04 then calls a programmed method "searchTwoMatrices" (such as that described above) to generate a triplet of two bit matrices and a bit vector. In some embodiments, the two calls to "makeMatrixGenerator" on lines 02 and 03 invoke the same implementation of "makeMatrixGenerator". In other embodiments, the two calls to "makeMatrixGenerator" on lines 02 and 03 invoke different implementations of "makeMatrixGenerator".

The pseudocode in lines 11 to 13 illustrates an alternate embodiment of the programmed method "generateTwoHashFunctions" that may be used to compute a pair of hash functions suitable for hashing a given set of keys. As in the previous example, this programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, line 12 includes a call to a programmed method "makeMatrixGenerator" (e.g., one of the variations of this programmed method described above) to create a matrix generation function "gen". Line 13 then calls a programmed method "searchTwoMatrices" (such as that described above) to generate a triplet of two bit matrices and a bit vector, using the matrix generation function "gen" for two of the arguments. In this example, the programmed method "searchTwoMatrices" will use the same matrix generation function for generating both matrices in each candidate pair of hash functions, rather than using two different matrix generation functions, one to generate each of the two matrices in a candidate pair.

The pseudocode in lines 21 to 23 illustrates another alternate embodiment of the programmed method "generateTwoHashFunctions" that may be used to compute a pair of hash functions suitable for hashing a given set of keys. As in the previous examples, this programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, line 22 calls a programmed method "makeMatrixGenerator" (e.g., one of the "makeMatrixGenerator" methods described above) to create a matrix generation function "gen". Line 23 then calls the programmed method "searchTwoMatrices1" (which is described below) to generate a triplet of two bit matrices and a bit vector, using the matrix generation function "gen" for one of the arguments. In this example, the programmed method "searchTwoMatrices1" will use the same matrix generation function for generating both matrices in each candidate pair of hash functions, rather than using two different matrix generation functions, one to generate each of the two matrices in a candidate pair.

The pseudocode in lines 31 to 34 illustrates another alternate implementation of the programmed method "generateTwoHashFunctions" that may be used to compute a pair of hash functions suitable for hashing a given set of keys. As in the previous examples, this programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, line 32 calls a programmed method "makeMatrixGenerator" (e.g., one of the "makeMatrixGenerator" methods described above) to create a matrix generation function "gen1". Line 33 calls a programmed method "makeMatrixGenerator" (e.g., one of the "makeMatrixGenerator" methods described above) to create another matrix generation function "gen2". Line 34 then calls the programmed method "searchTwoMatrices2" (which is described below) to generate a triplet of two bit matrices and a bit vector, using the matrix generation functions "gen1" and "gen2" for two of the arguments. Note that in some embodiments the particular "makeMatrixGenerator" method called by lines 32 and 33 may be the same "makeMatrixGenerator" method, while in other embodiments they may be different "makeMatrixGenerator" methods. In this example, the programmed method "searchTwoMatrices2" will use each of the two matrix generation functions to generate a respective matrix for a hash function in each of two pools of candidate hash functions.

The pseudocode in lines 41 to 45 illustrates yet another alternate implementation of the programmed method "generateTwoHashFunctions" that may be used to compute a pair of hash functions suitable for hashing a given set of keys. As in the previous examples, this programmed method accepts three arguments: a bit matrix "keyMatrix" of size (r×k), where $k<2^r$, whose r-bit columns are keys and whose columns are all different, thus representing a set of keys; a positive integer "p" indicating the desired number of bits in each hash value; and a source "rng" of random or pseudorandom numbers. In this example, line 42 calls the programmed method "makeMatrixGenerator" (e.g., one of the "makeMatrixGenerator" methods described above) to create a matrix generation function "gen1". Line 43 calls the programmed method "makeMatrixGenerator" (e.g., one of the "makeMatrixGenerator" methods described above) to create another matrix generation function "gen2". Line 44 calls the programmed method "makeMatrixGenerator" (e.g., one of the "makeMatrixGenerator" methods described above) to create yet another matrix generation function "gen3". Line 45 then calls the programmed method "searchTwoMatrices3" (which is described below) to generate a triplet of two bit matrices and a bit vector, using the matrix generation functions "gen1", "gen1", and "gen3" for three of the arguments. Note that in some embodiments the particular "makeMatrixGenerator" method called by lines 42, 43, and 44 may be the same "makeMatrixGenerator" method, while in other embodiments they may be different "makeMatrixGenerator" methods. In this example, the programmed method "searchTwoMatrices3" will use each of the three matrix generation functions to generate a respective matrix for a hash function in each of three pools of candidate hash functions.

Note that, just as the pseudocode illustrated in lines 11-13 is a variation on the pseudocode illustrated in lines 01-04 that creates just one matrix generation function and then uses it as an argument more than once, similar variations on the pseudocode illustrated in lines 31-34 and 41-45 may be used to generate two hash functions, in other embodiments. In still other embodiments, variations on the "makeMatrixGenerator" methods illustrated above may create two matrix generation functions and then use one of them once and the other one twice as an argument to the programmed method "searchTwoMatrices3".

As previously noted, in some embodiments, the systems and methods described herein may apply various heuristics to the generation of individual hash function bit matrices that make it more likely that a suitable pair of such matrices can be identified. For example, the systems may heuristically exploit non-uniformities in the bit patterns of a set of keys to bias the random generation of bit matrices toward matrices that are more likely to succeed as members of a candidate pair (or triplet) of hash functions for hashing a given set of keys. In various embodiments, applying heuristics to the generation of individual hash function bit matrices may include one or more of the techniques described below. For example, in some embodiments, a pre-processing operation may be used to eliminate non-contributing rows of the key matrix by using Boolean Gaussian elimination that has been extended to also eliminate rows that are complement-linearly-dependent. This may have the effect of determining that some bit positions of the keys may be ignored for hashing purposes.

In some embodiments, generating a hash function bit matrix that is likely to succeed as a member of a candidate pair (or triplet) of hash function bit matrices may include ensuring that the generated matrix has full rank. For example, if a hash matrix is not full rank, it cannot generate all possible hash values, and may therefore be a poor candidate for use in the lookup circuits described herein. In some embodiments, a hash function bit matrix may be generated and then another Boolean Gaussian elimination may be applied to the result to determine whether it is of full rank. In other embodiments, candidate matrices may be generated in such a manner that they are full-rank by construction. For example, in some embodiments, the bit positions of the key matrix (that is, the columns of the hash matrix) may be ordered according to heuristics such as the diversity or criticality of the bit positions.

In some embodiments, the heuristics may be directed toward ensuring that the rows in the hash function bit matrix are diverse. For example, if two different rows are very similar, then the two hash value bits that they generate are likely to be correlated. Therefore, the hash function may not do a good job of covering all possible locations in the memory (over some range of inputs).

In some embodiments, a criticality metric may be used to avoid collisions in the lookup circuit. For example, if one row of the matrix generates a bit of the hash result, it may do a very good job of dividing the collection of inputs into two halves. However, if that bit is not considered in the hash function, the hash function may be more likely to result in collisions. A criticality metric may indicate the relative importance of a particular bit position in distinguishing between different input keys. For example, if a set of binary keys includes the keys 101 and 100, but the least significant bit is not considered by a particular hash function, then the hash function cannot distinguish the two keys. Therefore, the least significant bit may be considered to have high criticality. On the other hand, if there are multiple (or many) keys in a collection of keys that have the same values for some of the bits, these may not be critical for distinguishing between the keys and may be eliminated from consideration by at least some of the hash functions. For example, if the input keys represent ASCII characters, the high order bits of the ASCII characters are always the same. Therefore, they would not be considered critical, for hashing purposes.

Note that the techniques described herein for applying heuristics to the generation of individual hash function bit matrices, when used in combination with those described herein for identifying suitable pairs of hash functions through combinatorial testing of pre-tabulated hash functions, may provide an order of magnitude speedup in the search for suitable hash function pairs.

Note that in some embodiments, identifying a suitable pair (or triplet) of hash function bit matrices where the candidate hash function bit matrices in the pair (or triplet) are generated using different combinations of heuristics (e.g., one generated using a diversity heuristic and the other generated using a criticality heuristic, one generated such that a criticality metric is maximized and the other generated such that a diversity metric is maximized while avoiding criticality, one generated using a combination of heuristics and the other generated using a different combination of heuristics, or one generated using heuristics and the other generated without the application of such heuristics) in a pair (or triplet) may be more successful than attempting to identify suitable sets of hash function bit matrices that were generated using the same heuristics (including none).

As described in more detail herein, in some embodiments, the generation of sets of one or more hash functions may use heuristics to guide what would otherwise be a random, brute-force search. As previously noted, this may include customizing the set of hash functions to a specific set of keys, such as eliminating from consideration all bit positions in the keys that are constant across all keys (which may be especially useful when generating sparse matrices in that they need not waste the effort in testing bit positions of the key that are not useful for distinguishing keys). In some embodiments, some bit position within the keys (e.g., perhaps the leftmost, the rightmost, or a randomly chosen bit position) may be chosen and then, before performing the Boolean Gaussian elimination described below, a copy of the key matrix may be made in which each key that has a 1-bit in the chosen position may be replaced with the bitwise complement of that key. This may have the same effect as adjoining an all-1s row to the key matrix and then choosing it for the first elimination step. The effect of this approach may be to eliminate all bit positions that are constant, and furthermore to eliminate keys that are complement-linearly-dependent on one or more other keys. For example, if one key is the complement of another, one of the two will be eliminated, and if one key is equal to the bitwise XOR of two other keys, then one of the three will be eliminated.

In some embodiments, Boolean Gaussian elimination may be used to identify bit positions in the keys that are linearly dependent on other bit positions in the keys (and that therefore contribute only redundant information to the keys). As noted above, this may be especially useful when generating sparse matrices, because the 1-bits of the sparse matrix would not be wasted testing bit positions of the key that are less useful for distinguishing keys. In some embodiments, the "most diverse bit position" may be chosen at each step of the Boolean Gaussian elimination, in hopes of eliminating as many other bit positions as possible, rather than processing the bit positions in a fixed order. In other embodiments, an arbitrary processing order, such as left-to-right, that does not depend on the content of the keys may be used.

As previously noted, in some embodiments, a pre-processing operation may include choosing a permutation for the rows of the generated bit matrix. For example, in some embodiments, a fixed order may be chosen. In other embodiments, a random permutation may be chosen. The choice of permutation may make little difference when generating a single matrix, but may improve the success rate for generating suitable sets of two or more matrices. In some embodiments, a pre-processing operation may include choosing a permutation for the columns of the generated bit matrix. For example, in some embodiments, a fixed order or a random permutation may be chosen. In other embodiments, a permutation may be chosen that corresponds to sorting (or partially sorting) the bit positions of the keys according to a diversity metric (such as that described herein). In other embodiments, a permutation may be chosen that corresponds to sorting (or partially sorting) the bit positions of the keys according to a criticality metric (such as that described herein). In still other embodiments, a permutation may be chosen that corresponds to sorting (or partially sorting) the bit positions of the keys according to a criticality metric and then partially sorting bit positions of the keys according to a diversity metric. Again note that when generating sets of two or more hash function bit matrices, choosing a different permutation option for each matrix in the set may be more successful than attempting to identify a suitable set of hash function bit matrices for which the permutation options were the same.

In some embodiments, the elimination operations and permutations described above may be pre-computed prior to beginning a (possibly iterative) operation to generate a hash function bit matrix. In some embodiments, generating a hash function bit matrix may involve the use of a "filtered generation technique" that first generates a bit matrix randomly, e.g., using the "makeRandomMatrix" programmed method or the "makeSparseRandomMatrix" programmed method described herein, and then tests the bit matrix to determine whether its rows are linearly independent (e.g., using Boolean Gaussian elimination). In other embodiments, the hash function bit matrix may be generated in such a manner that its rows are guaranteed to be linearly independent (i.e., so that row i of the matrix (for i=1, 2, . . . , n) is made to have (i−1) leading 0-bits and then a 1-bit). For example, in some embodiments, the 1-bit in column i of row i may always followed by (n−i) 0-bits, and then any bits of row i to the right of column n may be chosen randomly. In other embodiments, any bits of row i to the right of column i may be chosen randomly. In still other embodiments, the bits to be chosen randomly may be randomized uniformly, or the bits to be chosen randomly may be chosen so as to guarantee that the entire row will be sparse.

As noted above, in some embodiments, at least some of the candidate hash function bit matrices may be generated according to heuristics that are chosen to improve the likelihood that they will be suitable for use in pairs (e.g., to generate bit matrices that, when considered in pairs, are likely to induce a graph that is acyclic). For example, generating a candidate hash function bit matrix may include performing one or more pre-processing operations for reducing the input key matrix to eliminate columns in the hash function matrices (corresponding to bit positions in the keys) that are constant across all keys and/or columns in the hash function matrices (corresponding to bit positions in the keys) that are linearly dependent on other columns (bit positions), for ensuring that the generated bit matrix has full rank, and/or for choosing row or column permutations to be applied to the generated bit matrix (some of which may be dependent on a diversity metric or a criticality metric computed for the input key matrix).

In some embodiments, the methods described herein for pre-computing certain quantities and then producing a matrix generation function may be implemented using program instructions that when executed on one or more computers cause the computer to perform these methods. One embodiment of a programmed method that may be used to pre-compute certain quantities and then produce a matrix generation function is illustrated by the example pseudocode below.

```
01    precompute(keyMatrix, p, c, rowChoose, colChoose, creator, rng)
02        (reducedKeyMatrix, eliminatedBits) := eliminate(keyMatrix, c)
03        P := rowChoose(p, rng)
04        Q := colChoose(reducedKeyMatrix, p, rng)
05        return (the function
06            (rng2 => generateMatrix(reducedKeyMatrix,
07                eliminatedBits,
08                p, P, Q, creator, rng2)))
```

In this example, the programmed method "precompute" may be used to compute a function that, when given a source of random or pseudorandom numbers, will return a bit matrix of size (r×k), where k<$2^r$, whose r-bit columns are keys and whose columns are all different, thus representing a set of keys; a positive integer "p" indicating the desired number of bits in each hash value; a nonnegative integer "c" such that c<k; a function "rowChoose" that takes an integer "p" and a source "rng" of random or pseudorandom numbers, and produces a permutation of size p (that is, a vector of length p whose elements are the integers from 0 to (p−1)); a function "colChoose" that takes a reduced bit matrix of size (R×k) where R≤r, an integer p, and a source "rng" of random or pseudorandom numbers, and produces a permutation of size "R" (that is, a vector of length "R" whose elements are the integers from 0 to (R−1)); a function "creator" that takes a reduced bit matrix of size (R×k) where R≤r, an integer "p", a permutation of size p, a permutation of size "R", and a source "rng" of random or pseudorandom numbers, and produces either a hash function bit matrix of size (p×R) or the special value "FAILURE"; and a source "rng" of random or pseudorandom numbers.

In this example, the programmed method pre-computes certain quantities and then returns a function that, when given a source of random or pseudorandom numbers, will return a bit matrix of size (p×r). Line 02 calls the programmed method "eliminate" with the arguments "keyMatrix" and "c", which will produce two results. The first result is a reduced bit matrix of size (R×k), and this reduced bit matrix is given the name "reducedKeyMatrix". The second result is a set of nonnegative integers less than "r" indicating which rows of "keyMatrix" were eliminated to produce the "reducedKeyMatrix" result, and this set is given the name "eliminatedBits". Line 03 calls the "rowChoose" function with the arguments "p" and "rng" to produce a permutation of size p. This permutation is given the name "P". Line 04 calls the "colChoose" function with the arguments "reducedKeyMatrix" and "p" and "rng" to produce a permutation of size "R". This permutation is given the name "Q". Lines 05 through 08 return a function that, when given a source "rng2" of random or pseudorandom numbers, will return a bit matrix of size (p×r). It does so by calling the programmed method "generateMatrix" with the arguments "reducedKeyMatrix", "eliminatedBits", "p", "P", "Q", "creator", and "rng". Note that the quantities "reducedKeyMatrix", "eliminatedBits", "P", "Q", may be computed once and then may be used many times, without re-computation, by multiple invocations of the function returned by the programmed method "precompute".

In some embodiments, the methods described herein for generating a bit matrix may be implemented using program instructions that when executed on one or more computers cause the computer to perform these methods. One embodiment of a programmed method that may be used to generate a bit matrix is illustrated by the example pseudocode below.

```
01  generateMatrix(reducedKeyMatrix, eliminatedBits,
02      p, P, Q, creator, rng)
03  do
04      candidate := creator(reducedKeyMatrix, p, P, Q, rng)
05  while candidate == FAILURE
06  return expandHashMatrix(candidate, eliminatedBits)
```

In this example, the programmed method "generateMatrix" may be used to compute a bit matrix of size (p×r). The programmed method accepts seven arguments: a bit matrix "reducedKeyMatrix" of size (R×k), where R≤r and k<$2^r$; a set of nonnegative integers "eliminatedBits"; a positive integer "p" indicating the desired number of bits in each hash value; a permutation "P" of size p; a permutation "Q" of size "R"; a function "creator" that takes a reduced bit matrix of size of size (R×k) where, R≤r, an integer "p", a permutation "P" of size p, and a permutation "Q" of size "R", and produces either a hash function bit matrix of size (p×R) or the special value "FAILURE"; and a source "rng" of random or pseudorandom numbers. Lines 03 through 05 call the function "creator" with arguments "reducedKeyMatrix", "p", "P", "Q", and "rng", repeatedly if necessary, giving the resulting value the name "candidate", until the function "creator" returns a value other than "FAILURE". This value will be a bit matrix of size (p×R). Line 06 calls the programmed method "expandHashMatrix" with arguments "candidate" and "eliminatedBits" and returns its result, which will be a bit matrix of size (p×r). Note that the "creator" function may be given a reduced bit matrix as one argument rather than the full bit matrix "keyMatrix" originally given to the programmed method "precompute", allowing it to work with a smaller bit matrix. Note also that the hash function bit matrix of size (p×R) produced by the "creator" function may then expanded to size (p×r) in order to satisfy the interface requirements of the programmed method "makeMatrixGenerator".

In some embodiments, multiple ones of the programmed methods described herein may be used in various combinations to generate hash function bit matrices that are likely to be successful in hashing a collection of keys as part of a pair of hash functions implemented in a lookup circuit. One embodiment of a method for generating a hash function bit matrix using a combination of the techniques described herein is illustrated by the flow diagram in FIG. 9. As illustrated at 910, in this example, the method may include receiving inputs specifying a matrix of r-bit keys, a desired number of bits in each hash value (p), and a source of random or pseudorandom numbers (e.g., a random number generator). The method may include initiating the execution of a pre-processing operation that produces a reduced key matrix, a row permutation, and a column permutation, based on the inputs and on other selected parameter values (as in 920). For example, in some embodiments, this pre-processing may be performed (at least in part) by invoking the programmed method "eliminate" described herein. Note that in various embodiments, the "rc" and/or "cc" arguments of the programmed method "precompute" may reference any of a variety of programmed methods for computing row or column permutations, including, but not limited to, those described herein. In some embodiments, at least some of the operations performed as part of the pre-processing may be dependent on a diversity or criticality metric computed for the key matrix (e.g., the column permutation may be dependent on one or both of these metrics).

Figure 9:
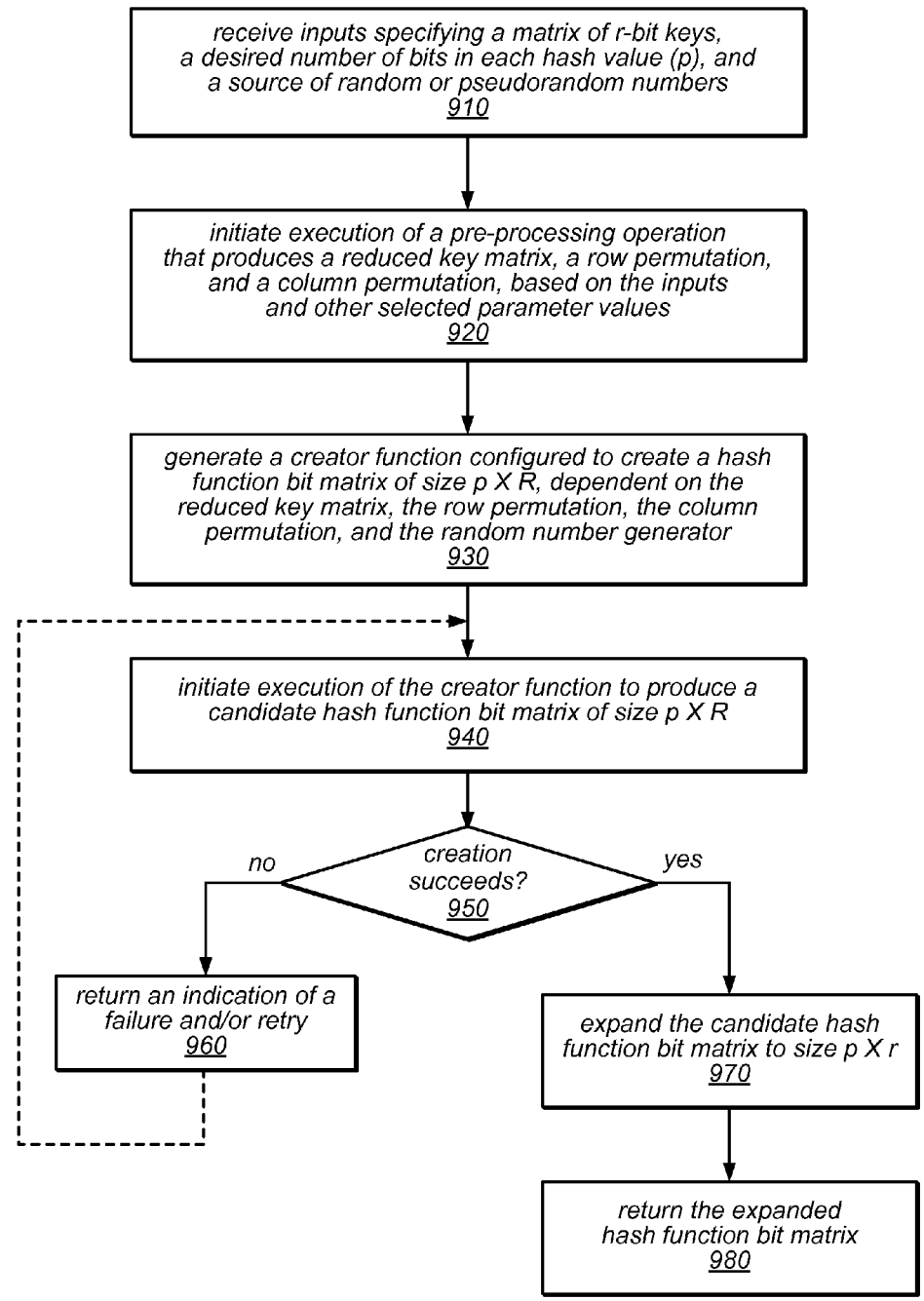
FIG. 9 is a flow diagram illustrating one embodiment of a method for generating a hash function bit matrix using a combination of the techniques described herein.

As illustrated in this example, the method may include generating a creator function that is configured to create a hash function bit matrix of size p×R, dependent on the reduced key matrix, the row permutation, the column permutation, and the random number generator (as in 930), and initiating the execution of the creator function to produce a candidate hash function bit matrix of size p×R (as in 940). If the creation does not succeed (shown as the negative exit from 950), the method may include returning an indication of a failure and/or retrying the creation operation (as in 960). The option to retry the creation operation is illustrated in FIG. 9 by the dashed line from 960 to 940. However, if (or once) the creation operation succeeds (shown as the positive exit from 950), the method may include expanding the candidate hash function bit matrix that was created (e.g., a bit matrix of size p×R) to size p×r (as in 970), and returning the expanded hash function bit matrix (as in 980). Note that the expanding operation may be dependent on the previously eliminated bits of the key matrix.

Figure 10:
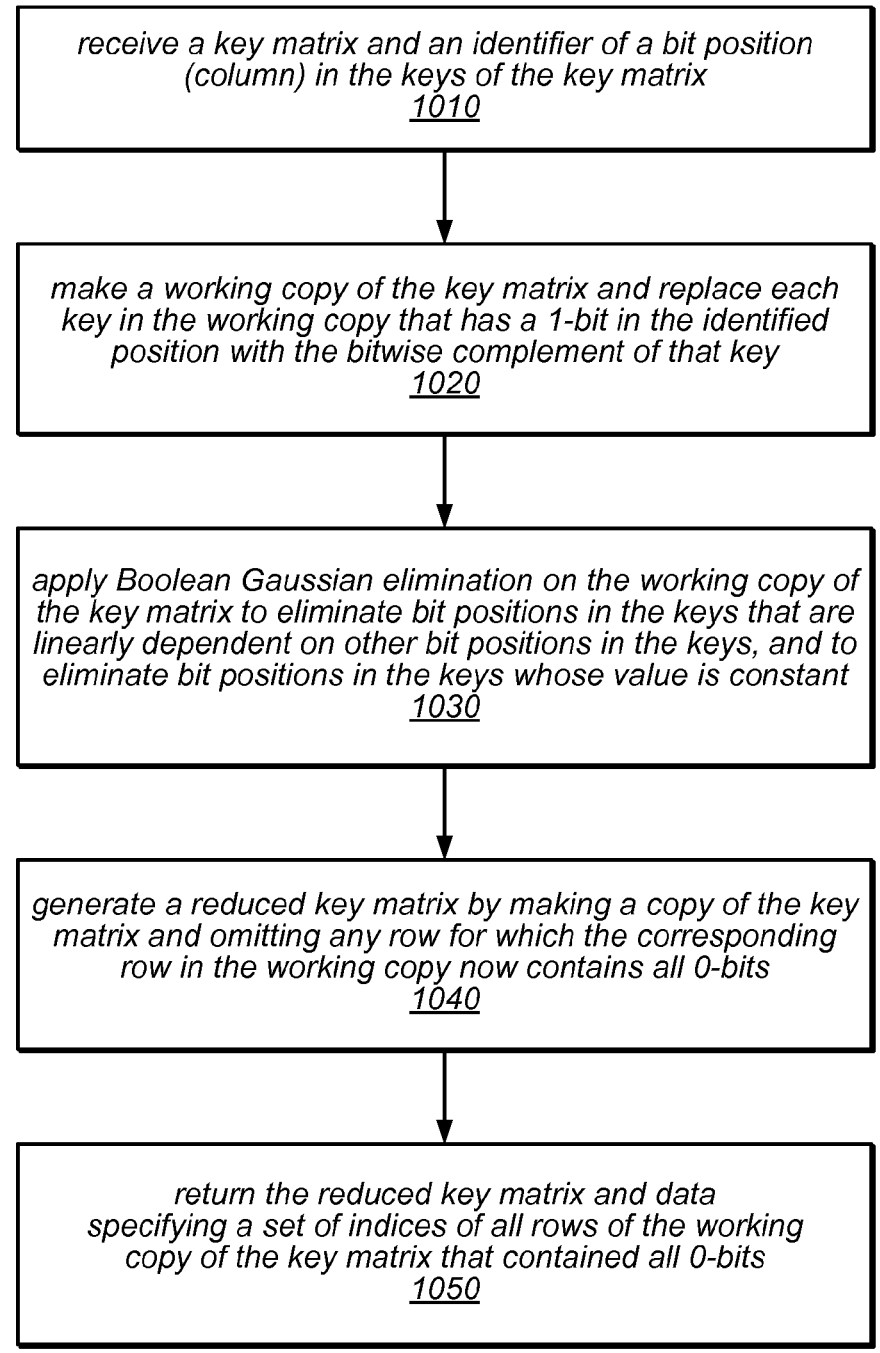
FIG. 10 is a flow diagram illustrating one embodiment of a method for reducing a key matrix.

One embodiment of a method for reducing a key matrix (e.g., prior to generating a hash function bit matrix for the collection of keys represented in the key matrix) is illustrated by the flow diagram in FIG. 10. As illustrated at 1010, in this example, the method may include receiving a key matrix and an identifier of a bit position (e.g., a column) in the keys of the key matrix. The method may also include making a working copy of the key matrix and replacing each key in the working copy that has a 1-bit in the identified position with the bitwise complement of that key, as in 1020. Note that when performed prior to applying Boolean Gaussian elimination on the working copy of the key matrix, this transformation may (due to the application of Boolean Gaussian elimination) have the effect of eliminating bit positions in the keys that are linearly dependent on other bit positions in the keys. As illustrated at 1030, applying Boolean Gaussian elimination on the working copy of the key matrix may also serve to eliminate bit positions in the keys whose value is constant. Note that, in some embodiments, the Boolean Gaussian elimination operation may be dependent on a diversity metric that was computed over the key matrix.

In this example, the method may include generating a reduced key matrix by making a copy of the key matrix and omitting any row for which the corresponding row in the working copy now contains all 0-bits (as in 1040), and returning the reduced key matrix and data specifying a set of indices of all of the rows of the working copy of the key matrix that contained all 0-bits (as in 1050). In some embodiments, this set of indices may be used in a subsequent operation to expand a hash function bit matrix to its desired size (e.g., if it was generated from a reduced key matrix).

In some embodiments, the methods described herein for eliminating linearly redundant rows from a bit matrix may be implemented using program instructions that when executed on one or more computers cause the computer to perform these methods. One embodiment of a programmed method that may be used to eliminate linearly redundant rows from a bit matrix is illustrated by the example pseudocode below.

```
01  eliminate(keyMatrix, c)
02    workMatrix := (copy of keyMatrix, with every column whose bit
03        in row c is 1 replaced by the bitwise
04        complement of that column)
05    workMatrix := keyGaussianElimination(workMatrix)
06    reducedKeyMatrix := (copy of keyMatrix, but omitting any row
07        for which the corresponding row in the
08        matrix workMatrix is now all-0s)
09    eliminatedBits := (set containing the indices of all rows of
10        the matrix workMatrix that are now all-0s)
11    return (reducedKeyMatrix, eliminatedKeyBits)
```

In this example, the programmed method "eliminate" may be used to compute a reduced bit matrix and an indication of which rows were eliminated. The programmed method accepts two arguments: a bit matrix "keyMatrix" of size (r×k), where $k < 2^r$; and a nonnegative integer "c" such that c<k. Lines 02 through 04 create a modified copy of the given "keyMatrix" and give it the name "workMatrix". In this example, "workMatrix" differs from "keyMatrix" in that every row that has a 0-bit in column "c" is copied "as is" to "workMatrix", but every row that has a 1-bit in column "c" is replaced in "workMatrix" with the bitwise complement of that row. Note that, in this example, column "c" of "workMatrix" will necessarily be all 0-bits. Line 05 calls the programmed method "keyGaussianElimination" to perform a standard Boolean Gaussian elimination algorithm on "workMatrix", producing an updated "workMatrix" in which some rows may now be all 0-bits. Lines 06 through 08 construct a reduced bit matrix by making a copy of "keyMatrix" that omits any and every row for which the corresponding row in "workMatrix" is all 0-bits. This reduced bit matrix is given the name "reducedKeyMatrix". Lines 09 through 10 construct a set of integers containing the indices (nonnegative integers less than r) of all rows of "workMatrix" that are all 0-bits. This set of integers is given the name "eliminatedBits". Line 11 returns the pair of values "reducedKeyMatrix" and "eliminatedBits".

In an alternate embodiment of the programmed method "eliminate", lines 02 through 04 of the programmed method "eliminate" may be replaced by code that simply causes "workMatrix" to be a copy of "keyMatrix", without any bitwise complementation of rows. In this alternate embodiment, the argument "c" is not used.

In some embodiments, the methods described herein for performing Boolean Gaussian elimination on a bit matrix may be implemented using program instructions that when executed on one or more computers cause the computer to perform these methods. One embodiment of a programmed method that may be used to perform Boolean Gaussian elimination on a bit matrix is illustrated by the example pseudocode below.

```
01  keyGaussianElimination(workMatrix)
02    r := number of rows in workMatrix
03    for i := 0, 1, . . . , r-2 do
04      if row i of workMatrix is not all-0s then
05        j := (the column number of some arbitrarily
06            chosen 1-bit in row i of workMatrix)
07        for m := i+1, i+2, . . . , r-1
08          if column j of row m of workMatrix has a 1-bit then
09            (replace row m of workMatrix with the bitwise XOR
10                of row m of workMatrix and row i of workMatrix)
11          end if
12        end for
13      end if
14    end for
15    return workMatrix
```

In this example, the programmed method "keyGaussianElimination" may be used to perform a standard Boolean Gaussian elimination algorithm. The programmed method accepts one argument: a bit matrix "workMatrix" of size (r×k), where $k < 2^r$. Note that, in this example, no explicit multiplication or division operations are needed because the pivot value is always 1. Note also that the addition and subtraction operations used in a standard numerical Gaussian elimination algorithm are replaced in a Boolean Gaussian elimination algorithm by XOR (exclusive or) operations. In this example, the method processes rows in order from lowest-numbered to highest-numbered, under the control of the "for" loop beginning on line 03. However, rows may instead be processed in any desired order while still accomplishing the purpose of a standard Boolean Gaussian elimination algorithm, in other embodiments. In this example, for each row, any non-zero value in that row may be chosen as the "pivot element" for that step, and this choice may be made arbitrarily (for example, always choosing the leftmost such element, or, as another example, always choosing the rightmost such element), in various embodiments. Note that the pseudocode for the programmed method "keyGaussianElimination" illustrated above is coded and used in such a way that it does not matter whether matrix arguments to such methods are passed by reference or by copying. In either case, the argument matrix "workMatrix" is modified and then returned explicitly as a value, and the caller (at line 05 of programmed method "eliminate") then replaces the original argument bit matrix with this returned value.

In some embodiments, the methods described herein for performing Boolean Gaussian elimination on a bit matrix using a diversity heuristic may be implemented using program instructions that when executed on one or more computers cause the computer to perform these methods. One embodiment of a programmed method that may be used to perform Boolean Gaussian elimination on a bit matrix using a diversity heuristic to select pivot rows is illustrated by the example pseudocode below.

```
01  keyGaussianElimination(workMatrix)
02    r := number of rows in workMatrix
03    unusedRows := (a vector of length r such that element j is j,
04                   for all 0 <= j < r)
05    for i := 0, 1, . . . , r-2 do
06       bestIndex := i
07       bestRow := element i of unusedRows
08       bestDiversity := diversity(row bestRow of workMatrix)
09       for m := i+1, i+2, . . . , r-1 do
10          thisRow := element m of unusedRows
11          thisDiversity := diversity(row thisRow of workMatrix)
12          if bestDiversity < thisDiversity then
13             bestIndex := m
14             bestRow := thisRow
15             bestDiversity := thisDiversity
16          end if
17       end for
18       if bestIndex is not equal to i
19          (swap element i of unusedRows
20             with element bestIndex of unusedRows)
21       end if
22       if row bestRow of workMatrix is not all-0s then
23          j := (the column number of some arbitrarily
24                chosen 1-bit in row bestRow of workMatrix)
25          for m := i+1, i+2, . . . , r-1
26             thisRow := element m of unusedRows
27             if (column j of row thisRow of workMatrix
28                 has a 1-bit) then
29                (replace row thisRow of workMatrix with
30                   the bitwise XOR of row thisRow of workMatrix
31                   and row bestRow of workMatrix)
32             end if
33          end for
34       end if
35    end for
36    return workMatrix
```

In this example, the programmed method "keyGaussianElimination" may be used to perform a variation of the standard Boolean Gaussian elimination algorithm. The programmed method accepts one argument: a bit matrix "workMatrix" of size (r×k), where k<$2^r$. Note that, in this example, no explicit multiplication or division operations are needed because the pivot value is always 1. Note also that the addition and subtraction operations used in a standard numerical Gaussian elimination algorithm are replaced in a Boolean Gaussian elimination algorithm by XOR (exclusive or) operations. In this example, the method processes rows in an order guided by a "row diversity" heuristic. The vector "unusedRows" initialized in line 03 is used to keep track of which rows have not yet been used to supply a pivot value. The loop on lines 09 through 17 determines which row of those not already used has maximal diversity as computed by a programmed method "diversity". That row is then used in lines 22 through 34 as the next row in which to find a pivot.

In some embodiments, the methods described herein for computing or estimating the diversity of a bit vector may be implemented using program instructions that when executed on one or more computers cause the computer to perform these methods. Two different embodiments of a programmed method that may be used to compute or estimate the diversity of a bit vector are illustrated in the example pseudocode below.

```
01  diversity(row)
02    nz := number of 0-bits in the row
03    no := number of 1-bits in the row
04    return min(nz, no)
11  diversity(row)
12    (choose an arbitrary or random sample of k bits from the row,
13     for some fixed k)
14    nz := number of 0-bits in the sample
15    no := number of 1-bits in the sample
16    return min(nz, no)
```

The pseudocode in lines 1 to 4 illustrates one implementation of a programmed method "diversity" that may be used to compute a "diversity" metric on a bit vector. In this example, the programmed method accepts one argument: a bit vector. The method returns whichever number is smaller: the number of 0-bits in the bit vector, or the number of 1-bits in the bit vector. Note that, in this example, for a bit vector of fixed size, the computed diversity value is minimized when all the bits of the vector are the same, and maximized when half the bits are 0 and half the bits are 1. Note that such a diversity metric may provide a heuristic measure of how evenly the bits of a row will divide the set of columns of the bit matrix into two sets.

The pseudocode in lines 11 to 13 illustrates an alternate implementation of the programmed method "diversity" that may be used to compute a "diversity" metric on a bit vector. In this example, the method computes an approximation to the true diversity of a bit vector by examining only a sample of bits from the bit vector rather than all of the bits. Note that either the method illustrated in lines 1 to 4 or the method illustrated in lines 11 to 13 may be called by other ones of the programmed methods described herein (including the programmed method "keyGaussianElimination" shown above) to compute a diversity metric, in different embodiments.

In some embodiments, the methods described herein for computing or estimating the criticality of a bit vector may be implemented using program instructions that when executed on one or more computers cause the computer to perform these methods. Two different embodiments of a programmed method that may be used to compute or estimate the criticality of a bit vector are illustrated in the example pseudocode below.

```
01  criticality(keyMatrix, j)
02    k := number of columns in keyMatrix
03    newMatrix := copy of keyMatrix with row j set to all-0s
04    d := number of distinct columns in newMatrix
05    return (k − d)
11  criticality(keyMatrix, j)
12    newMatrix := (new matrix containing an arbitrary or random
13       sample of k columns from keyMatrix, but with
14       row j set to all-0s, for some fixed k)
15    d := number of distinct columns in newMatrix
16    return (k − d)
```

The pseudocode in lines 1 to 5 illustrates one implementation of a programmed method "criticality" that may be used to compute a "criticality" metric on a bit vector. In this example, the programmed method accepts two arguments: a bit matrix "keyMatrix", and an integer "j" that indicates a row of "keyMatrix". The method returns the number of columns in the given "keyMatrix" minus the number of distinct columns in a copy of "keyMatrix" in which row "j" has been changed to all 0-bits. Note that in this example, for a bit matrix of fixed size, the computed criticality value for a row is minimized when there is no pair of columns in the bit matrix that are identical except for the bits in that row, and is maximized when, for every column in the bit matrix (except one, if the number of columns is odd), there is another column in the bit matrix that is identical except for the bits in that row. Note that such a criticality metric may provide a heuristic measure of how well a row distinguishes the columns of the bit matrix.

The pseudocode in lines 11 to 16 illustrates an alternate implementation of the programmed method "criticality" that may be used to compute a "criticality" metric on a bit vector. In this example, the programmed method computes an approximation to the true criticality of a row of a bit matrix by examining only a sample of columns from a modified copy of the bit matrix rather than all the columns. Note that either the method illustrated in lines 1 to 5 or the method illustrated in lines 11 to 16 may be called by other ones of the programmed methods described herein to compute a criticality metric, in different embodiments.

In some embodiments, the methods described herein for restoring a reduced bit matrix to an original size may be implemented using program instructions that when executed on one or more computers cause the computer to perform these methods. One embodiment of a programmed method that may be used to restore a reduced bit matrix to an original size is illustrated by the example pseudocode below.

```
01  expandHashMatrix(hashMatrix, eliminatedKeyBits)
02    for j := (each member of the set eliminatedKeyBits,
03              in order from smallest to largest) do
04      if (number of columns in hashMatrix) = j−1 then
05        add an all-0s column to hashMatrix just after column j−1
06      else
07        add an all-0s column to hashMatrix just before column j
08      end if
09    end for
10    return hashMatrix
```

In this example, the programmed method "expandHashMatrix" may be used to expand a hash function bit matrix of size (p×R) to size (p×r). In this example, the programmed method accepts two arguments: a bit matrix "hashMatrix" of size (p×R), and a set of nonnegative integers "eliminatedKeyBits" of size (r−R), where each integer is less than r. The programmed method returns a copy of "hashMatrix" into which extra columns of all 0-bits have been inserted, such that the inserted columns in the result are at the column indices indicated by the set of integers "eliminatedKeyBits".

In some embodiments, the methods described herein for generating a random bit matrix of full rank may be implemented using program instructions that when executed on one or more computers cause the computer to perform these methods. One embodiment of a programmed method that may be used to generate a random bit matrix of full rank is illustrated by the example pseudocode below.

```
01  createMatrixFilter(delta)(reducedKeyMatrix, p, P, Q, rng)
02    R := number of rows in reducedKeyMatrix
03    z := p + delta
04    hashMatrix := makeRandomMatrix(z, R, rng)
05    testMatrix := copy of hashMatrix
06    for i := 0, 1, . . . , p−1 do
07      if (column Q(i) of testMatrix contains
08            no 1-bit at or below row i) then
09          return FAILURE
10      end if
11      (choose an integer j, either randomly using rng
12          or arbitrarily, such that 0 <= j < z and
13          row j of reducedKeyMatrix has a 1-bit in column Q(i) )
14      swap row j of testMatrix with row i of testMatrix
15      swap row j of hashMatrix with row i of hashMatrix
16      for m := i+1, i+2, . . . , p−1
17        if column Q(i) of row m of testMatrix is 1 then
18            (replace row m of testMatrix with the bitwise XOR
19                of row m of testMatrix and row i of testMatrix)
20        end if
21      end for
22    end for
23    return (the (p x R) matrix whose row P(i) equals row i
24              of hashMatrix, for all 0 <= i < p)
```

In this example, the programmed method "createMatrixFilter" may be used to create a function suitable for use as the "creator" argument to the programmed method "precompute" shown above. In this example, the syntax on line 01 indicates that the programmed method "createMatrixFilter" takes one argument "delta", which is a nonnegative integer, and immediately returns a function that takes five arguments (a reduced bit matrix "reducedKeyMatrix" of size (R×k), a positive integer "p", a permutation "P" of size p, a permutation "Q" of size "R", and a source "rng" of random or pseudorandom numbers), which then executes the code body on lines 02 through 24, producing either a hash function bit matrix of size of size (p×R) or the special value "FAILURE". Line 03 computes an integer "z" that is larger than p by the amount "delta". In this example, the programmed method constructs a candidate hash matrix by first constructing a random matrix that has more rows than necessary (e.g., z rather than p rows), and then performs a modified Boolean Gaussian elimination algorithm, at each iteration indexed by "i", choosing a row that is able to supply a non-zero pivot value in column Q(i). Note that this process may fail if no remaining unused row has a 1-bit in column Q(i). However, if the process succeeds, then the sub-matrix consisting of the first p rows will be full rank (that is, no row is linearly dependent on the others). The permutation Q controls the order in which columns are used to choose pivot elements. The permutation P controls the final order within the resulting hash matrix of the rows chosen by the Gaussian elimination process.

In an alternate embodiment of the programmed method "createMatrixFilter", the call to the programmed method "makeRandomMatrix" on line 04 may be replaced with a call to the programmed method "makeSparseRandomMatrix" (shown above) with suitably chosen arguments. In some embodiments, the value of the argument "creator" for at least one invocation of the programmed method "precompute" (e.g., the value of the argument "cr" for the invocation of the programmed method "precompute" on line 21 of the programmed method "makeMatrixGenerator" shown above) may be computed by calling the programmed method "createMatrixFilter" shown above with an arbitrarily chosen nonnegative integer value "delta". In some embodiments, "delta" may be equal to p. In one embodiment, "delta" may be equal to 6.

Another embodiment of a programmed method that may be used to generate a random bit matrix of full rank is illustrated by the example pseudocode below.

```
01  createMatrixConstruct(reducedKeyMatrix, p, P, Q, rng)
02    R := number of rows in reducedKeyMatrix
03    assert R >= p
04    hashMatrix := all-0s matrix with p rows and R columns
05    for i := 0, 1, . . . , p–1 do
06      hashMatrix(i, i) := 1
07      for j := i+1, i+2, . . . , R–1 do    ;alternatively,
           for j := p, p+1, . . . , R–1 do
08        hashMatrix(i, j) := a bit randomly chosen using the rng
09      end for
10    end for
11    return (the (p x R) matrix whose entry (P(i), Q(j)) equals
12            entry (i, j) of hashMatrix,
13            for all 0 <= i < p and 0 <= j < R)
```

In this example, the programmed method "createMatrixConstruct" may be used to create a function suitable for use as the "creator" argument to the programmed method "precompute" described above. In this example, the programmed method "createMatrixConstruct" takes five arguments, a reduced bit matrix "reducedKeyMatrix" of size (R×k), a positive integer "p" such that p≤R, a permutation "P" of size p, a permutation "Q" of size "R", and a source "rng" of random or pseudorandom numbers, and produces a hash function bit matrix of size (p×R). In this example, lines 04 through 10 construct a partially random bit matrix "hashMatrix" of size (p×r) such that the sub-matrix consisting of the leftmost p columns of the matrix is an upper-triangular matrix; that is, all bits on the main diagonal are 1-bits; all bits below the main diagonal are 0-bits; and all bits above or to the right of the diagonal are chosen randomly. Note that this mathematically guarantees that the bit matrix is of full rank. Lines 11 through 13 return a copy of "hashMatrix" whose rows have been permuted according to the permutation "P" and whose columns have been permuted according to the permutation "Q", thus allowing the 1-bits on the diagonal of the upper-triangular sub-matrix to be distributed to specific rows or columns either randomly or in accordance with a heuristic, depending on how P and Q are computed.

In some embodiments, the programmed method "createMatrixConstruct" may be used as the "creator" argument for at least one invocation of the programmed method "precompute". For example, the value of the argument "cr" for at least one invocation of the programmed method "precompute" on line 21 of the programmed method "makeMatrixGenerator" shown above may be a reference to the programmed method "createMatrixConstruct". In other embodiments, line 07 of the programmed method "createMatrixConstruct" may be altered so that the index "j" takes on the values p, (p+1), . . . , (r–1) rather than (i+1), (i+2), . . . , (r–1). In such embodiments, the method constructs a partially random bit matrix "hashMatrix" such that the sub-matrix consisting of the leftmost p columns of the matrix is an identity matrix, i.e., all bits on the main diagonal are 1-bits; all bits directly above or below the main diagonal are 0-bits, and all bits to the right of the identity sub-matrix are chosen randomly. Note that this also mathematically guarantees that the bit matrix is of full rank. In some embodiments, this alternate implementation performs less work to construct the bit matrix than the implementation shown above.

Yet another embodiment of a programmed method that may be used to generate a random bit matrix of full rank is illustrated by the example pseudocode below.

```
01  createMatrixSparse(maxOnes)(reducedKeyMatrix, p, P, Q, rng)
02    R := number of rows in reducedKeyMatrix
```

-continued

```
03    assert R >= p
04    hashMatrix := all-0s matrix with p rows and R columns
05    for i := 0, 1, . . . , p–1 do
06      hashMatrix(i, i) := 1
07      (using the rng, randomly choose some subset S of
08        the set of integers { i+1, i+2, . . . , R–1 }
09        such that |S| = (maxOnesPerRow – 1) )
10      for each j in S do
11        hashMatrix(i, j) := 1
12      end for
13    end for
14    return (the (p x R) matrix whose entry (P(i), Q(j)) equals
15            entry (i, j) of hashMatrix,
16            for all 0 <= i < p and 0 <= j < R)
```

In this example, the programmed method "createMatrixSparse" may be used to create a function suitable for use as the "creator" argument to the programmed method "precompute" described above. In this example, the syntax on line 01 indicates that the programmed method "createMatrixSparse" takes one argument "maxOnes", which is a positive integer, and immediately returns a function that takes five arguments, namely a reduced bit matrix "reducedKeyMatrix" of size (R×k), a positive integer "p", a permutation "P" of size p, a permutation "Q" of size "R", and a source "rng" of random or pseudorandom numbers, which then executes the code body on lines 02 through 16, producing a hash function bit matrix of size (p×R). Lines 04 through 13 use a novel variant of a standard technique, familiar to one of ordinary skill in the art, to construct a partially random bit matrix "hashMatrix" of size (p×R) such that the sub-matrix consisting of the leftmost p columns of the matrix is an upper-triangular matrix; that is, all bits on the main diagonal are 1-bits; all bits below the main diagonal are 0-bits, and all bits above or to the right of the diagonal are chosen randomly. Note that this mathematically guarantees that the bit matrix is of full rank.

As shown above, a variation from the previously described programmed method "createMatrixSparse" appears in lines 07 through 12. Here, instead of choosing the bits to be randomized independently, the code chooses values for the bits in each row so that each row will have exactly "maxOnes" 1-bits, with all other bits in the row being 0-bits. Note that if "maxOnes" is chosen to be no larger than one-third the number of columns in "reducedKeyMatrix", then the constructed "hashMatrix" will be sparse, having at least twice as many 0-bits as 1-bits in each row. In this example, lines 11 through 13 return a copy of "hashMatrix" whose rows have been permuted according to the permutation "P" and whose columns have been permuted according to the permutation "Q", thus allowing the 1-bits on the diagonal of the upper-triangular sub-matrix to be distributed to specific rows or columns either randomly or in accordance with a heuristic, depending on how P and Q are computed.

In some embodiments, the value of the argument "creator" for at least one invocation of the programmed method "precompute" (e.g., the value of the argument "cr" for the invocation of the programmed method "precompute" on line 21 of the programmed method "makeMatrixGenerator" shown above) may be computed by calling the programmed method "createMatrixSparse" shown above with an arbitrarily chosen positive integer value "maxOnes". In other embodiments, "maxOnes" may be equal to one-third the number of columns in the given "reducedKeyMatrix" (rounded down). In one embodiment, "maxOnes" may be equal to 6.

In some embodiments, line 08 of the programmed method "createMatrixConstruct" may be altered so that the subset "S" is randomly chosen from the set of integers {p, (p+1), . . . , (r–1)} rather than {(i+1), (i+2), . . . , (r–1)}. Note that in such embodiments, the method constructs a partially random bit matrix "hashMatrix" such that the sub-matrix consisting of the leftmost p columns of the matrix is an identity matrix; that is, all bits on the main diagonal are 1-bits; all bits directly above or below the main diagonal are 0-bits, and all bits to the right of the identity sub-matrix are chosen randomly in such a way that every row will have "maxOnes" 1-bits. Note that this also mathematically guarantees that the bit matrix is of full rank. In other embodiments, line 09 of the programmed method "createMatrixConstruct" may be altered so that the condition on the size of the randomly chosen subset "S" is |S|≤(maxOnes−1) (that is, the size of S is at most one less than maxOnes) rather than |S|≤(maxOnes−1) (that is, that the size of S is equal to one less than maxOnes).

In some embodiments, the methods described herein for generating an identity permutation may be implemented using program instructions that when executed on one or more computers cause the computer to perform these methods. One embodiment of a programmed method that may be used to generate an identity permutation of size p is illustrated by the example pseudocode below.

```
01  chooseRowPermTrivial(p, rng)
02      return (a vector of length p such that element i is i,
03          for all 0 <= i < p)
```

In some embodiments, the programmed method "chooseRowPermTrivial" may be used as the "rowChoose" argument for at least one invocation of the programmed method "precompute" described herein. For example, the value of the argument "rc" for the invocation of the programmed method "precompute" on line 21 of the programmed method "makeMatrixGenerator" shown above may be a reference to the programmed method "chooseRowPermTrivial". In the example pseudocode above, the programmed method "chooseRowPermTrivial" takes a positive integer "p" and a source "rng" of random or pseudorandom numbers, and produces a permutation of size p. Lines 02 through 03 construct and return an identity permutation of size p, that is, a vector such that element "i" of the vector is "i" for all nonnegative indices "i" less than p. Note that the argument "rng" is not used by this programmed method. In some embodiments, the programmed method "chooseRowPermTrivial" may be used as the "rowChoose" argument for at least one invocation of the programmed method "precompute". For example, the value of the argument "rc" for at least one invocation of the programmed method "precompute" on line 21 of the programmed method "makeMatrixGenerator" shown above may be a reference to the programmed method "chooseRowPermTrivial".

In some embodiments, the methods described herein for generating a random permutation may be implemented using program instructions that when executed on one or more computers cause the computer to perform these methods. One embodiment of a programmed method that may be used to generate a random permutation of size p is illustrated by the example pseudocode below.

```
01  chooseRowPermRandom(p, rng)
02      return (a vector of length p containing a permutation of the
03          integers { 0, 1, ..., p-1 } randomly chosen using rng)
```

In some embodiments, the programmed method "chooseRowPermRandom" may be used as the "rowChoose" argument for at least one invocation of the programmed method "precompute" described herein. For example, the value of the argument "rc" for the invocation of the programmed method "precompute" on line 21 of the programmed method "makeMatrixGenerator" shown above may be a reference to the programmed method "chooseRowPermRandom". In the example pseudocode above, the programmed method "chooseRowPermRandom" takes a positive integer "p" and a source "rng" of random or pseudorandom numbers, and produces a permutation of size p. Lines 02 through 03 construct and return a randomly chosen permutation of size p. In some embodiments, the programmed method "chooseRowPermRandom" may be used as the "rowChoose" argument for at least one invocation of the programmed method "precompute". For example, the value of the argument "rc" for at least one invocation of the programmed method "precompute" on line 21 of the programmed method "makeMatrixGenerator" shown above may be a reference to the programmed method "chooseRowPermRandom".

One embodiment of a programmed method that may be used to generating an identity permutation of size R is illustrated by the example pseudocode below.

```
01  chooseColumnPermTrivial(reducedKeyMatrix, p, rng)
02      R := number of rows in reducedKeyMatrix
03      return (a vector of length R such that element j is j,
04          for all 0 <= j < R)
```

In some embodiments, the programmed method "chooseColumnPermTrivial" may be used as the "colChoose" argument for at least one invocation of the programmed method "precompute" described herein. For example, the value of the argument "cc" for the invocation of the programmed method "precompute" on line 21 of the programmed method "makeMatrixGenerator" shown above may be a reference to the programmed method "chooseColumnPermTrivial". In the example pseudocode above, the programmed method "chooseColumnPermTrivial" takes a reduced bit matrix "reducedKeyMatrix" of size (R×k), a positive integer "p", and a source "rng" of random or pseudorandom numbers, and produces a permutation of size "R". Lines 02 through 03 construct and return an identity permutation of size "R", that is, a vector such that element "i" of the vector is "j" for all nonnegative indices "j" less than "R". Note that the arguments "p" and "rng" are not used by this programmed method. In some embodiments, the programmed method "chooseColumnPermTrivial may be used as the "colChoose" argument for at least one invocation of the programmed method "precompute". For example, the value of the argument "cc" for at least one invocation of the programmed method "precompute" on line 21 of the programmed method "makeMatrixGenerator" shown above may be a reference to the programmed method "chooseColumnPermTrivial".

One embodiment of a programmed method that may be used to generate a random permutation of size R is illustrated by the example pseudocode below.

```
01  chooseColumnPermRandom(reducedKeyMatrix, p, rng)
02      R := number of rows in reducedKeyMatrix
03      return (a vector of length R containing a permutation of the
04          integers { 0, 1, ..., R-1 } randomly chosen using rng)
```

In some embodiments, the programmed method "chooseColumnPermRandom" may be used as the "colChoose" argument for at least one invocation of the programmed method "precompute" described herein. For example, the value of the argument "cc" for the invocation of the programmed method "precompute" on line 21 of the programmed method "makeMatrixGenerator" shown above may be a reference to the programmed method "chooseColumnPermRandom". In the example pseudocode above, the programmed method "chooseColumnPermRandom" takes a reduced bit matrix "reducedKeyMatrix" of size of size (R×k), a positive integer "p", and a source "rng" of random or pseudorandom numbers, and produces a permutation of size "R". Lines 02 through 03 construct and return a randomly chosen permutation of size "R". Note that the argument "p" is not used by this programmed method. In some embodiments, the programmed method "chooseColumnPermRandom" may be used as the "rowChoose" argument for at least one invocation of the programmed method "precompute". For example, the value of the argument "rc" for at least one invocation of the programmed method "precompute" on line 21 of the programmed method "makeMatrixGenerator" shown above may be a reference to the programmed method "chooseColumnPermRandom".

In some embodiments, the methods described herein for generating a random permutation of size R using a diversity-maximizing heuristic may be implemented using program instructions that when executed on one or more computers cause the computer to perform these methods. One embodiment of a programmed method that may be used to generate a random permutation of size R using a diversity-maximizing heuristic is illustrated by the example pseudocode below.

```
01  chooseColumnPermDiversity(reducedKeyMatrix, p, rng)
02    R := number of rows in reducedKeyMatrix
03    workMatrix := copy of reducedKeyMatrix
04    result := (a vector of length R such that element j is j,
05              for all 0 <= j < R)
06    for i := 0, 1, 2, ..., (p-1) do
07      bestDiversity := diversity(row i of workMatrix)
08      bestRow := i
09      for m := i+1, i+2, ..., R-1 do
10        thisDiversity := diversity(row m of workMatrix)
11        if bestDiversity < thisDiversity then
12          bestDiversity := thisDiversity
13          bestRow := m
14        end if
15      end for
16      if bestRow is not equal to i
17        swap row i of workMatrix with row bestRow of workMatrix
18        swap element i of result with element bestRow of result
19      end if
20      if row i of workMatrix is not all-0s then
21        j := (the column number of a 1-bit
22             in row i of workMatrix chosen
23             either randomly using rng or arbitrarily)
24        for m := i+1, i+2, ..., R-1 do
25          if column j of row m of workMatrix has a 1-bit then
26            (replace row m of workMatrix with the bitwise XOR
27             of row m of workMatrix and row i of workMatrix)
28          end if
29        end for
30      end if
31    end for
32    return result
```

In some embodiments, the programmed method "chooseColumnPermDiversity" may be used as the "colChoose" argument for at least one invocation of the programmed method "precompute" described herein. For example, the value of the argument "cc" for the invocation of the programmed method "precompute" on line 21 of the programmed method "makeMatrixGenerator" shown above may be a reference to the programmed method "chooseColumnPermDiversity". In the example pseudocode above, the programmed method "chooseColumnPermDiversity" takes a reduced bit matrix "reducedKeyMatrix" of size (R×k), a positive integer "p", and a source "rng" of random or pseudorandom numbers, and produces a permutation of size "R". Line 03 makes a copy of "reducedKeyMatrix" and gives it the name "workMatrix". For each of p iterative steps carried out by the loop in lines 06 through 31, the code on lines 07 through 15 selects some row of the "workMatrix" that has not already been selected and that has maximal diversity. Lines 16 through 19 swap two rows of the "workMatrix", if necessary, so that the selected row will be in row "i" of the "workMatrix". Lines 20 through 30 then use the selected row to carry out one step of Boolean Gaussian elimination, using some 1-bit in the selected row as a pivot value. In this example, the vector with the name "result" maintains a permutation that tracks the manner in which rows are swapped by the code in lines 16 through 19. When the "result" vector is returned, it is a permutation that, when applied to the columns of a matrix that is upper-triangular, will move the columns containing the main diagonal to positions corresponding to the original positions of the rows of "workMatrix" that were selected for having maximal diversity.

In some embodiments, the programmed method "chooseColumnPermDiversity" may be used as the "colChoose" argument for at least one invocation of the programmed method "precompute". For example, the value of the argument "cc" for at least one invocation of the programmed method "precompute" on line 21 of the programmed method "makeMatrixGenerator" shown above may be a reference to the programmed method "chooseColumnPermDiversity". Note that the code in lines 20 through 30 causes the implementation of the programmed method "chooseColumnPermDiversity" to use a "cascaded" diversity metric, in which the measured diversity of an original row depends on which other rows were selected before it is selected. In other embodiments, lines 20 through 30 may be omitted from the programmed method "chooseColumnPermDiversity", resulting in a programmed method that uses a "non-cascaded" diversity metric.

In some embodiments, the programmed method "chooseColumnPermRandom" and/or the programmed method chooseColumnPermDiversity may be used as the "colChoose" argument for various invocations of the programmed method "precompute". For example, the value of the argument "cc" for at least one invocation of the programmed method "precompute" on line 21 of the programmed method "makeMatrixGenerator" shown above may be a reference to the programmed method "chooseColumnPermRandom", and the value of the argument "cc" for at least one other invocation of the programmed method "precompute" on line 21 of the programmed method "makeMatrixGenerator" shown above may be a reference to the programmed method "chooseColumnPermDiversity".

One embodiment of a programmed method that may be used to generate a random permutation of size R using a criticality-maximizing heuristic is illustrated by the example pseudocode below.

```
01  chooseColumnPermCriticality(reducedKeyMatrix, p, rng)
02    R := number of rows in reducedKeyMatrix
03    workMatrix := copy of reducedKeyMatrix
04    result := (vector of length R such that element j is j,
05              for all 0 <= j < R)
06    for i := 0, 1, 2, ..., (p-1) do
07      bestCriticality := criticality(workMatrix, i)
08      bestRow := i
09      for m := i+1, i+2, ..., R-1 do
10        thisCriticality := criticality(workMatrix, m)
```

```
11      if bestCriticality < thisCriticality then
12          bestCriticality := thisCriticality
13          bestRow := m
14      end if
15    end for
16    if bestRow is not equal to i
17      swap row i of workMatrix with row bestRow of workMatrix
18      swap element i of result with element bestRow of result
19    end if
20    set row i of workMatrix to all-0s
21  end for
22  return result
```

In some embodiments, the programmed method "chooseColumnPermCriticality" may be used as the "colChoose" argument for at least one invocation of the programmed method "precompute" described herein. For example, the value of the argument "cc" for the invocation of the programmed method "precompute" on line 21 of the programmed method "makeMatrixGenerator" shown above may be a reference to the programmed method "chooseColumnPermCriticality". In the example pseudocode above, the programmed method "chooseColumnPermCriticality" takes a reduced bit matrix "reducedKeyMatrix" of size (R×k), a positive integer "p", and a source "rng" of random or pseudorandom numbers, and produces a permutation of size "R". Line 03 makes a copy of "reducedKeyMatrix" and gives it the name "workMatrix". For each of p iterative steps carried out by the loop in lines 06 through 21, the code on lines 07 through 15 selects some row of the "workMatrix" that has not already been selected and that has maximal criticality. Lines 16 through 19 swap two rows of the "workMatrix", if necessary, so that the selected row will be in row "i" of the "workMatrix". Lines 20 then sets the selected row to all 0-bits. In this example, the vector with the name "result" maintains a permutation that tracks the manner in which rows are swapped by the code in lines 16 through 19. When the "result" vector is returned, it is a permutation that, when applied to the columns of a matrix that is upper-triangular, will move the columns containing the main diagonal to positions corresponding to the original positions of the rows of "workMatrix" that were selected for having maximal criticality.

In some embodiments, the programmed method "chooseColumnPermCriticality" may be used as the "colChoose" argument for at least one invocation of the programmed method "precompute". For example, the value of the argument "cc" for at least one invocation of the programmed method "precompute" on line 21 of the programmed method "makeMatrixGenerator" shown above may be a reference to the programmed method "chooseColumnPermCriticality". Note that the code in line 20 causes the implementation of the programmed method "chooseColumnPermCriticality" to use a "cascaded" criticality metric, in which the measured criticality of an original row depends on which other rows were selected before it is selected. In other embodiments, line 20 may be omitted from the programmed method "chooseColumnPermCriticality", resulting in a programmed method that uses a "non-cascaded" diversity metric.

In various embodiments, the programmed method "chooseColumnPermRandom", the programmed method "chooseColumnPermCriticality", and/or the programmed method "chooseColumnPermDiversity" may be used as the "colChoose" argument for at least one invocation of the programmed method "precompute". For example, the value of the argument "cc" for at least one invocation of the programmed method "precompute" on line 21 of the programmed method "makeMatrixGenerator" shown above may be a reference to the programmed method "chooseColumnPermRandom", and the value of the argument "cc" for at least one other invocation of the programmed method "precompute" on line 21 of the programmed method "makeMatrixGenerator" shown above may be a reference to the programmed method "chooseColumnPermCriticality". In other embodiments, the value of the argument "cc" for at least one invocation of the programmed method "precompute" on line 21 of the programmed method "makeMatrixGenerator" shown above may be a reference to the programmed method "chooseColumnPermDiversity", and the value of the argument "cc" for at least one other invocation of the programmed method "precompute" on line 21 of the programmed method "makeMatrixGenerator" shown above may be a reference to the programmed method "chooseColumnPermCriticality".

One embodiment of a programmed method that may be used to generate a random permutation of size R using a heuristic that maximizes diversity while avoiding criticality is illustrated by the example pseudocode below.

```
01  chooseColumnPermDiversityNotCriticality(reducedKeyMatrix, p, rng)
02    R := number of rows in reducedKeyMatrix
03    workMatrix := copy of reducedKeyMatrix
04    result := (a vector of length R such that element j is j,
05                for all 0 <= j < R)
06    for i := (R-1), (R-2), ..., (R-p) do
07      bestCriticality := criticality(workMatrix, i)
08      bestRow := i
09      for m := i-1, i-2, ..., 0 do
10        thisCriticality := criticality(workMatrix, m)
11        if bestCriticality < thisCriticality then
12          bestCriticality := thisCriticality
13          bestRow := m
14        end if
15      end for
16      if bestRow is not equal to i
17        swap row i of workMatrix with row bestRow of workMatrix
18        swap element i of result with row bestRow of result
19      end if
20      set row i of workMatrix to all-0s
21    end for
22    for i := 0, 1, 2, ..., (p-1) do
23      bestDiversity := diversity(row i of workMatrix)
24      bestRow := i
25      for m := i+1, i+2, ..., (max(p, R-p)-1) do
26        thisDiversity := diversity(row m of workMatrix)
27        if bestDiversity < thisDiversity then
28          bestDiversity := thisDiversity
29          bestRow := m
30        end if
31      end for
32      if bestRow is not equal to i
33        swap row i of workMatrix with row bestRow of workMatrix
34        swap element i of result with element bestRow of result
35      end if
36      if row i is not all-0s then
37        j := (the column number of a 1-bit
38              in row i of workMatrix chosen
39              either randomly using rng or arbitrarily)
40        for m := i+1, i+2, ..., (R-1)
41          if column j of row m of workMatrix has a 1-bit then
42            (replace row m of workMatrix with the bitwise XOR
43             of row m of workMatrix and row i of workMatrix)
44          end if
45        end for
46      end if
47    end for
48    return result
```

In some embodiments, the programmed method "chooseColumnPermDiversityNotCriticality" may be used as the "colChoose" argument for at least one invocation of the programmed method "precompute" described herein. For example, the value of the argument "cc" for the invocation of the programmed method "precompute" on line 21 of the programmed method "makeMatrixGenerator" shown above may be a reference to the programmed method "chooseColumnPermDiversityNotCriticality". In the example pseudocode above, the programmed method "chooseColumnPermDiversityNotCriticality" takes a reduced bit matrix "reducedKeyMatrix" of size (R×k), a positive integer "p", and a source "rng" of random or pseudorandom numbers, and produces a permutation of size "R". Line 03 makes a copy of "reducedKeyMatrix" and gives it the name "workMatrix". For each of p iterative steps carried out by the loop in lines 06 through 21, the code on lines 07 through 15 selects some row of the "workMatrix" that has not already been selected and that has maximal criticality. Lines 16 through 19 swap two rows of the "workMatrix", if necessary, so that the selected row will be in row "i" of the "workMatrix". Lines 20 then sets the selected row to all 0-bits. Note that, because of the manner in which the for loops on lines 06 and 09 are indexed, upon completion of the loop on lines 06 through 21, the p rows of "workMatrix" selected for having maximal criticality have been moved to the last p rows of "workMatrix", that is, rows (R−p) through (R−1). Next, for each of p iterative steps carried out by the loop in lines 22 through 46, the code on lines 23 through 31 selects some row of the "workMatrix" that has not already been selected and that has maximal diversity.

Note that the use of the upper bound expression (max(p, R−p)−1) on the loop index "m" in line 25 causes the selection process on lines 25 through 31 to avoid using rows previously selected as having high criticality by lines 06 through 21. Note also that this avoidance is absolute if "R" is not less than twice the value of p. Lines 32 through 35 swap two rows of the "workMatrix", if necessary, so that the selected row will be in row "i" of the "workMatrix". Lines 36 through 46 then use the selected row to carry out one step of Boolean Gaussian elimination, using some 1-bit in the selected row as a pivot value. In this example, the vector with the name "result" maintains a permutation that tracks the manner in which rows are swapped by the code in lines 16 through 19 and lines 32 through 35. When the "result" vector is returned, it is a permutation that, when applied to the columns of a matrix that is upper-triangular, will move the columns containing the main diagonal to positions corresponding to the original positions of the rows of "workMatrix" that were selected for having maximal diversity while avoiding rows that have maximal criticality.

In some embodiments, the programmed method "chooseColumnPermDiversityNotCriticality" may be used as the "colChoose" argument for at least one invocation of the programmed method "precompute". For example, the value of the argument "cc" for at least one invocation of the programmed method "precompute" on line 21 of the programmed method "makeMatrixGenerator" shown above may be a reference to the programmed method "chooseColumnPermDiversityNotCriticality". Note that the code in line 20 causes the implementation of the programmed method "chooseColumnPermDiversityNotCriticality" to use a "cascaded" criticality metric, in which the measured criticality of an original row depends on which other rows were selected before it is selected. In other embodiments, line 20 may be omitted from the programmed method "chooseColumnPermDiversityNotCriticality", resulting in a programmed method that uses a "non-cascaded" criticality metric. Note that the code in lines 36 through 46 causes the implementation of the programmed method "chooseColumnPermDiversityNotCriticality" to use a "cascaded" diversity metric, in which the measured diversity of an original row depends on which other rows were selected before it is selected. In other embodiments, lines 36 through 46 may be omitted from the programmed method "chooseColumnPermDiversityNotCriticality", resulting in a programmed method that uses a "non-cascaded" criticality metric.

In some embodiments, the value of the argument "cc" for at least one invocation of the programmed method "precompute" on line 21 of the programmed method "makeMatrixGenerator" shown above may be a reference to the programmed method "chooseColumnPermRandom", and the value of the argument "cc" for at least one other invocation of the programmed method "precompute" on line 21 of the programmed method "makeMatrixGenerator" shown above may be a reference to the programmed method "chooseColumnPermDiversityNotCriticality. In other embodiments, the value of the argument "cc" for at least one invocation of the programmed method "precompute" on line 21 of the programmed method "makeMatrixGenerator" shown above may be a reference to the programmed method "chooseColumnPermCriticality", and the value of the argument "cc" for at least one other invocation of the programmed method "precompute" on line 21 of the programmed method "makeMatrixGenerator" shown above may be a reference to the programmed method "chooseColumnPermDiversityNotCriticality".

As previously noted, in some embodiments, the use of different makeMatrixGenerator methods and/or resulting matrix generators (e.g., makeMatrixGenerator methods and/or resulting matrix generators that apply different heuristics or different combinations of heuristics when generating a hash function bit matrix) may lead to a higher success rate in generating suitable pairs of hash function bit matrices than the use of the same makeMatrixGenerator method and/or resulting matrix generator to generate all of the candidate hash function bit matrices.

In some embodiments, the systems and methods described herein may amortize the cost of generating bit matrices for use as hash functions by testing each generated bit matrix against a large number of other previously-generated bit matrices (representations of which may be placed in one or more candidate pools), rather than successively generating a pair of matrices and then discarding them both if that pair of matrices is determined to be unsuitable for use in the lookup circuit. For example, in some embodiments, as soon as a hash function bit matrix is generated (or chosen), a tabulation operation may tabulate the results of multiplying all of the target keys by this bit matrix and may save them in a tabulated representation of the hash function bit matrix for (possibly repeated) subsequent suitability testing. In such embodiments, when the hash function bit matrix is to be tested as part of a set, the tabulated representation of the hash function bit matrix may be are used rather than having to re-computing the matrix multiplications.

In some embodiments, suitability testing may be performed to identify a pair of hash function matrices using a single pool. In such embodiments, after each matrix is generated and tabulated, it may be tested in combination with every other matrix already in the pool. If this does not produce a suitable pair of hash function bit matrices, then the newly generated hash function bit matrix (along with its tabulation) may be added to the pool and the process may be repeated.

Figure 11:
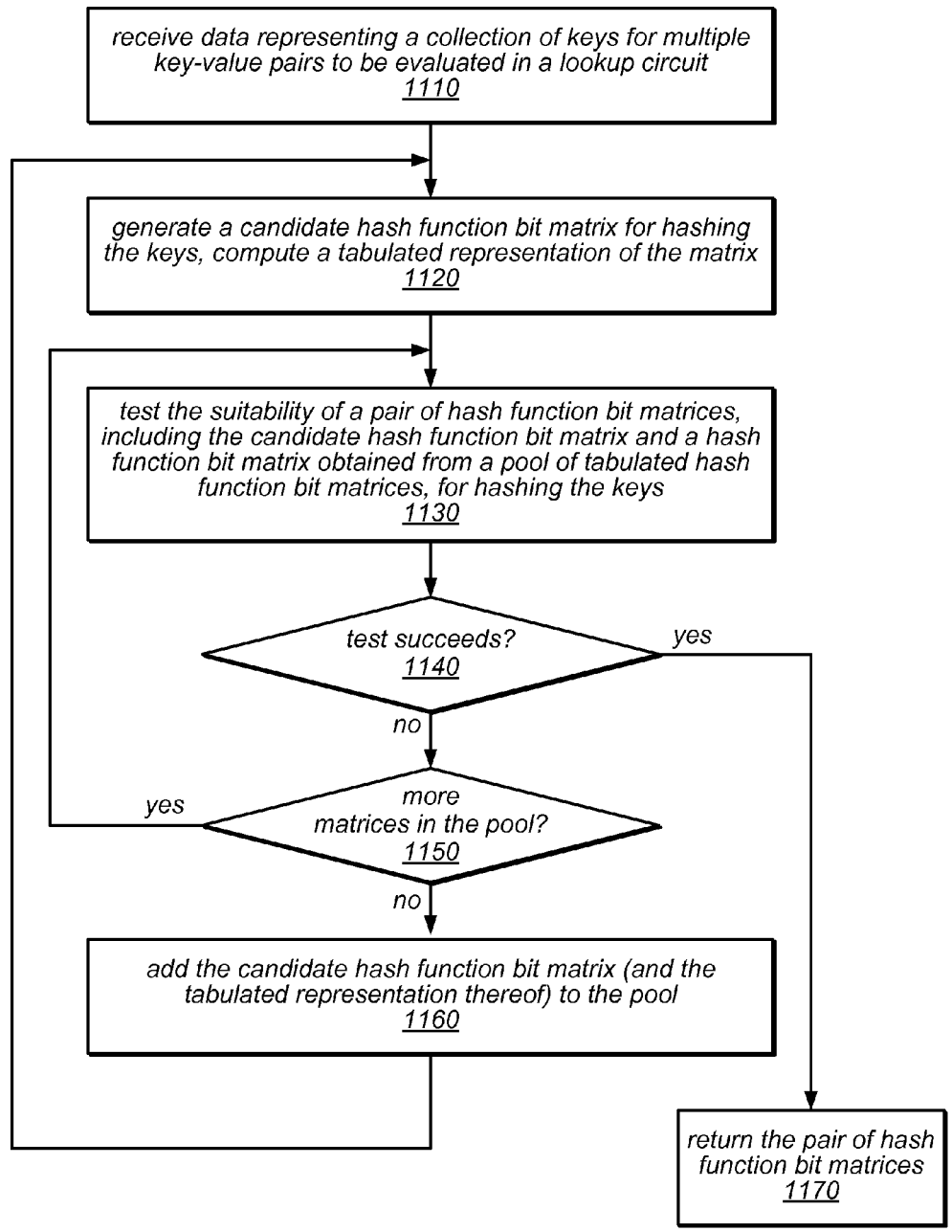
FIG. 11 is a flow diagram illustrating one embodiment of a method for identifying a pair of hash function bit matrices that are suitable for hashing a particular collection of keys using a single pool of tabulated representations of candidate bit matrices.

One embodiment of a method for identifying a pair of hash function bit matrices that are suitable for hashing a particular collection of keys using a single pool of tabulated representations of candidate bit matrices is illustrated by the flow diagram in FIG. 11. As illustrated at 1110, in this example, the method may include receiving data representing a collection of keys for multiple key-value pairs to be evaluated in a lookup circuit. The method may include generating a candidate hash function bit matrix for hashing the keys, and computing a tabulated representation of the bit matrix (as in 1120). As illustrated in this example the method may include testing the suitability of a pair of hash function bit matrices (which include the candidate hash function bit matrix and a hash function bit matrix for which a tabulated representation was obtained from a pool of tabulated hash function bit matrices) for hashing the collection of keys (as in 1130).

If the test does not succeed (shown as the negative exit from 1140), but there are more hash function bit matrices (and corresponding tabulated representations of those matrices) in the pool (shown as the positive exit from 1150), the method may include repeating the operations in 1130-1140 one or more times to test the candidate hash function bit matrix against all the tabulated hash function bit matrices in the pool until a suitable pair is identified or until the candidate hash function bit matrix has been tested against all of the tabulated hash function bit matrices in the pool. If and when the candidate hash function bit matrix has been tested against all of the tabulated hash function bit matrices in the pool without identifying a suitable pair of hash function bit matrices (shown as the negative exit from 1150), the method may include adding the candidate hash function bit matrix (and the tabulated representation thereof) to the pool (as in 1160), and repeating the operations illustrated in 1120-1150 until a suitable pair of hash function bit matrices is identified. Once a suitable pair of hash function bit matrices is identified (shown as the positive exit from 1140), the method may include returning the pair of hash function bit matrices (as in 1170).

In some embodiments, suitability testing may be performed to identify a pair of hash function matrices using two pools. In such embodiments, after each hash function bit matrix is generated and tabulated, it may be tested in combination with every other matrix already in one of the pools. If this does not produce a suitable pair, then the newly generated hash function bit matrix (along with its tabulation) may be added to the other pool and the process may be repeated with the roles of the pools exchanged.

Figure 12:
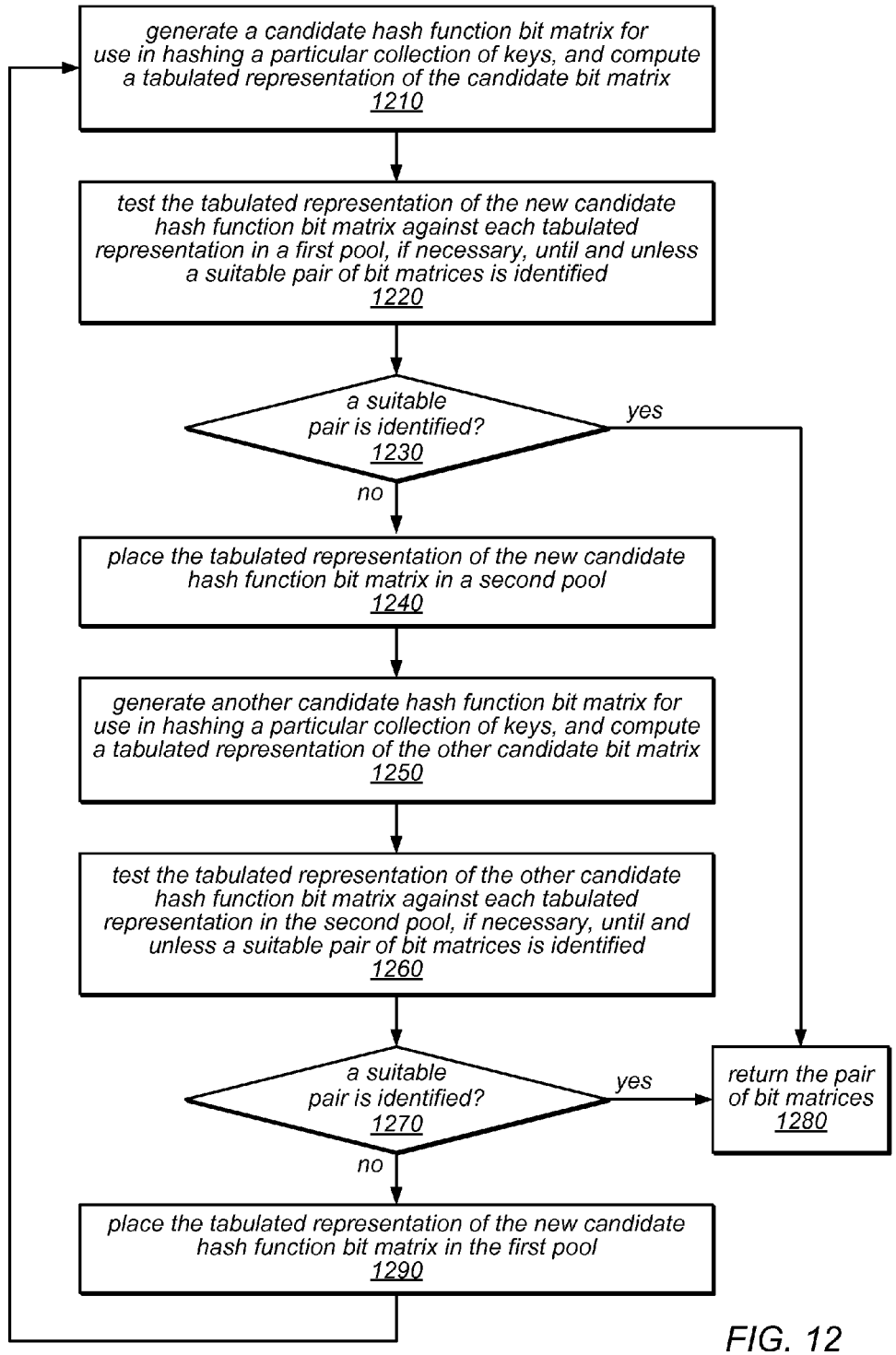
FIG. 12 is a flow diagram illustrating one embodiment of a method for identifying a pair of hash function bit matrices that are suitable for hashing a particular collection of keys using two pools of tabulated representations of candidate bit matrices.

One embodiment of a method for identifying a pair of hash function bit matrices that are suitable for hashing a particular collection of keys using two pools of tabulated representations of candidate bit matrices is illustrated by the flow diagram in FIG. 12. As illustrated at 1210, in this example, the method may include generating a candidate hash function bit matrix for use in hashing a particular collection of keys, and computing a tabulated representation of the candidate bit matrix. The method may also include testing the tabulated representation of the new candidate hash function bit matrix against each tabulated representation in a first pool of such representations, if necessary, until and unless a suitable pair of hash function bit matrices is identified, as in 1220.

As illustrated in this example, if a suitable pair of bit matrices is identified while testing the new candidate hash function bit matrix against those represented in the first pool (shown as the positive exit from 1230), the method may include returning the identified pair of bit matrices (as in 1280). However, if a suitable pair of bit matrices is not identified while testing the new candidate hash function bit matrix against those represented in the first pool (shown as the negative exit from 1230), the method may include placing the tabulated representation of the new candidate hash function bit matrix in a second pool of such representations (as in 1240). In this case, the method may include generating another candidate hash function bit matrix for use in hashing a particular collection of keys, and computing a tabulated representation of the other candidate bit matrix (as in 1250), and testing the tabulated representation of the other candidate hash function bit matrix against each tabulated representation in the second pool, if necessary, until and unless a suitable pair of hash function bit matrices is identified (as in 1260).

As illustrated in this example, if a suitable pair of bit matrices is identified while testing the other candidate hash function bit matrix against those represented in the second pool (shown as the positive exit from 1270), the method may include returning the identified pair of bit matrices (as in 1280). However, if a suitable pair of bit matrices is not identified while testing the other candidate hash function bit matrix against those represented in the second pool (shown as the negative exit from 1270), the method may include placing the tabulated representation of the other candidate hash function bit matrix in the first pool (as in 1290), and repeating the operations illustrated as 1210-1290, as needed, until a suitable pair of bit matrices is identified. This is illustrated in FIG. 12 by the feedback from 1290 to 1210.

In some embodiments, suitability testing may be performed to identify a pair of hash function matrices using three pools. In such embodiments, after each hash function bit matrix is generated and tabulated, it may be tested in combination with every other matrix already in two of the pools. If this does not produce a suitable pair, then the newly generated hash function bit matrix (along with its tabulation) may be added to the third pool and the process may be repeated with the roles of the pools rotated.

In some embodiments, suitability testing may be performed to identify a triplet of hash function matrices using three pools. In such embodiments, after each hash function bit matrix is generated and tabulated, it may be tested in combination with two other matrices, one being chosen from each of two of the pools. If this does not produce a suitable triplet, then the newly generated hash function bit matrix (along with its tabulation) may be added to the third pool and the process may be repeated with the roles of the pools rotated. Note that in other embodiments, many other variations on the number of pools that may be used in an operation to identify a suitable collection of hash function bit matrices, and the roles and/or order of testing against the hash function bit matrices in each of the pools may also vary.

As previously noted, in some embodiments all of the hash function bit matrices may be generated using the same pre-computed matrix generation function, while in other embodiments, different ones of the hash function bit matrices may be generated using different pre-computed matrix generation functions. For example, in some embodiments, there may be a different respective matrix generation function used to generate the hash function bit matrices (and tabulations thereof) to be placed in each pool, and the only matrices that may be inserted into a given pool are the matrices that were generated using the matrix generation function associated with that pool. For example, in some embodiments, when using two pools, a column-sorting-by-diversity heuristic may be applied when generating bit matrices for one pool, while a column-sorting-by-criticality heuristic may be applied when generating bit matrices for the other pool.

Figure 13:
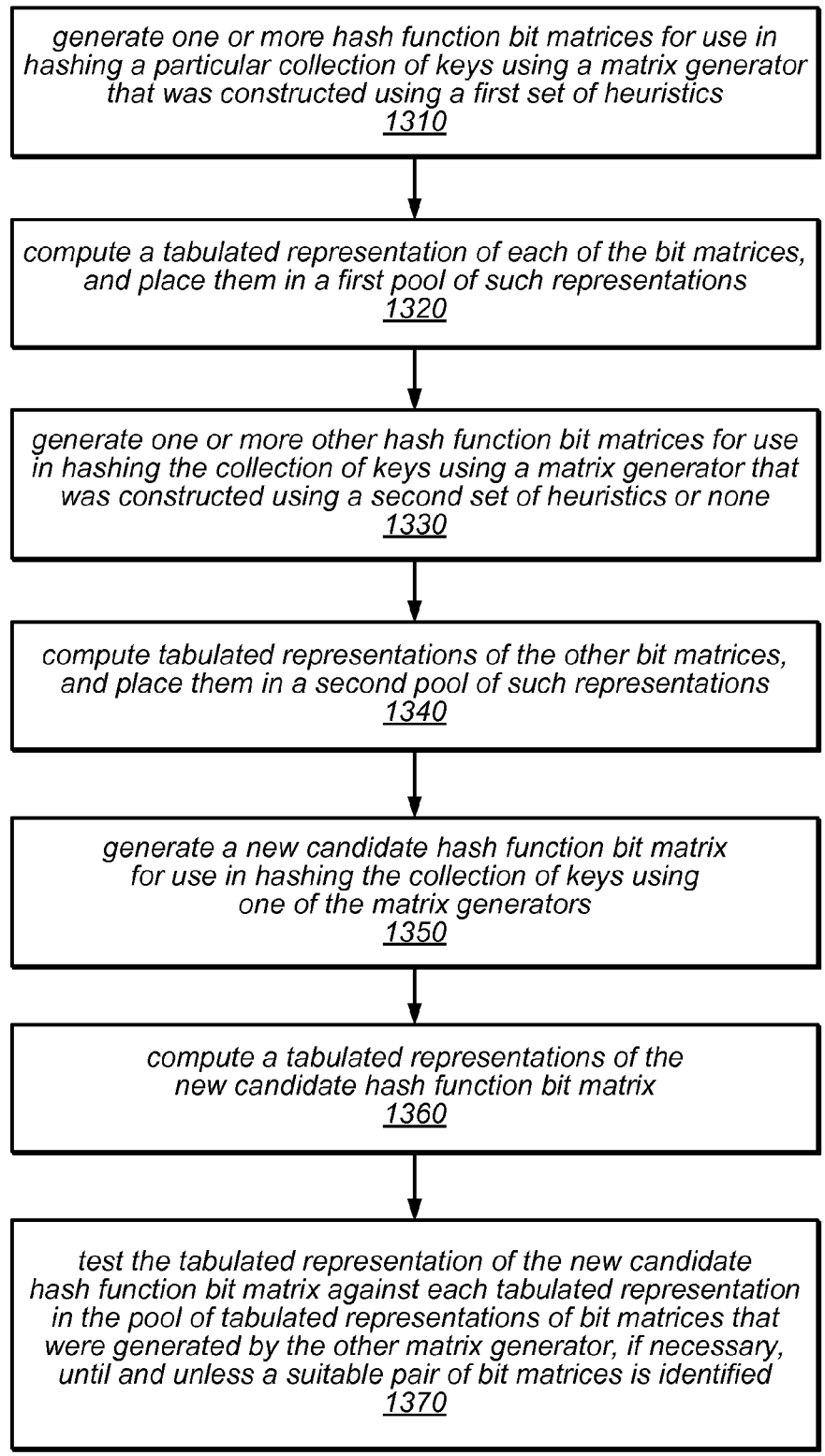
FIG. 13 is a flow diagram illustrating one embodiment of a method for identifying a pair of hash function bit matrices that are suitable for hashing a particular collection of keys using two pools of tabulated representations of candidate bit matrices that were generated according to different heuristics.

One embodiment of a method for identifying a pair of hash function bit matrices that are suitable for hashing a particular collection of keys using two pools of tabulated representations of candidate bit matrices that were generated according to different heuristics is illustrated by the flow diagram in FIG. 13. As illustrated at 1310, in this example, the method may include generating one or more hash function bit matrices for use in hashing a particular collection of keys using a matrix generator that was constructed using a first set of heuristics (such as those described herein and/or other heuristics). The method may include computing a tabulated representation of each of the bit matrices, and placing them in a first pool of such representations (e.g., a pool for the tabulated representations of similarly generated hash function bit matrices), as in 1320.

As illustrated in this example, the method may include generating one or more other hash function bit matrices for use in hashing the collection of keys using a matrix generator that was constructed using a second set of heuristics or without using any heuristics to guide the generation of the hash function bit matrix (as in 1330). The method may also include computing tabulated representations of the other bit matrices, and placing them in a second pool of such representations (e.g., a pool for the tabulated representations of matrices generated using the different set of heuristics or for those generated without the use of such heuristics), as in 1340.

As illustrated in FIG. 13, the method may include generating a new candidate hash function bit matrix for use in hashing the collection of keys using one of the matrix generators (as in 1350), and computing a tabulated representations of the new candidate hash function bit matrix (as in 1360). The method may also include testing the tabulated representation of the new candidate hash function bit matrix against each tabulated representation in the pool of tabulated representations of bit matrices that were generated by the other matrix generator, if necessary, until and unless a suitable pair of bit matrices is identified (as in 1370). In other words, the method may include performing suitability testing for a pair of bit matrices, each of which was generated using a different set of heuristics, or performing suitability testing for a pair of bit matrices, one of which was generated using a set of heuristics and one of which was not.

Note that in some embodiments, the operations illustrated at 1350-1370 in FIG. 13 may be repeated, with the roles of the two matrix generators and the two pools alternating, until a suitable pair of matrices is identified. Note that in other embodiments, multiple different matrix generators may be used to generate different hash function bit matrices to be placed in each pool, but the options for generating different hash function bit matrices to be placed in each pool may be different (e.g., different combinations of matrix generators may be associated with each pool, with or without some overlap).

Note that, in some embodiments, when a set of hash function bit matrices is tested for suitability, every hash function they represent may perform multiplication by a bit matrix, and the set of bit matrices may be tested for suitability just once. In other embodiments, at least one hash function in a candidate set of hash functions may perform multiplication by a bit matrix followed by an XOR with a randomly chosen bit vector. In such embodiments, each set of bit matrices may be tested some number of times (which may be greater than one), each time with differently randomly chosen bit vectors. In some embodiments, this approach may further amortize the cost of bit matrix generation over multiple tests.

In some embodiments, the methods described herein for testing two hash functions using tabulated values may be implemented using program instructions that when executed on one or more computers cause the computer to perform these methods. One embodiment of a programmed method that may be used to test two hash functions using tabulated values is illustrated by the example pseudocode below.

```
01  testTwo(keyMatrix, Tp, Tq, yq)
02    k := number of columns in keyMatrix
```

-continued

```
03    if (the two hash functions
04        (j => Tp[j]) and (j => Tq[j] XOR yq)
05        are suitable for hashing the columns 0... k-1 of keyMatrix
06        { 0, 1, ..., k - 1 } ) then
07      return true
08    else
09      return false
10    end if
```

In this example, the programmed method "testTwo" may be used to determine whether a pair of hash functions is suitable for hashing a target collection of keys, given the collection of keys in a key matrix, a tabulated hash function Tp, a tabulated hash function Tq, and a bit vector yq. In this example, line 05 represents the application of a suitability test to the two tabulated hash functions. Note that suitability may be dependent on the particular hash function circuitry being used (the type of lookup circuit in which the hash functions will be used), various characteristics of the set of valid keys or of the collection of key-value pairs, and/or the nature of the application in which the lookup circuit is used. For example, for some types of lookup circuits, there may be a requirement that a graph induced by the pair of hash functions is (or would be) acyclic. However, for other types of lookup circuits, an acyclic graph would always be suitable, but it may also be suitable to use a pair of hash functions for which the graph induced by the pair of hash functions has some cycles that could be worked around (e.g., using the BMZ algorithm).

In some embodiments, the methods described herein for tabulating the results of multiplying a collection of keys by a bit matrix may be implemented using program instructions that when executed on one or more computers cause the computer to perform these methods. One embodiment of a programmed method that may be used to tabulate such results is illustrated by the example pseudocode below.

```
01  tabulate(keyMatrix, A)
02    k := number of columns in keyMatrix
03    result := new 0-origin array of length k
04    for j := 0, ..., (k - 1) do
05      v := column j of keyMatrix
06      result[j] := A v
07    end for
08    return result
```

In this example, the programmed method "tabulate" may be used to tabulate a hash function, given two arguments: a hash function bit matrix "A", and "keyMatrix", which represents a collection of keys. In this example, the programmed method "tabulate" creates a new array "result". Then, for every key in "keyMatrix", the loop on lines 04 to 07 multiplies that key by the matrix A and stores the result in the array. Line 08 then returns the array "result" which is a tabulated representation of the hash function bit matrix A for the set of keys in "keyMatrix". Note that the programmed method "testTwo" described above, accepts two such arrays as arguments.

In some embodiments, the methods described herein for testing a new hash function against a pool of hash functions may be implemented using program instructions that when executed on one or more computers cause the computer to perform these methods. One embodiment of a programmed method that may be used to test a new hash function against a pool of hash functions is illustrated by the example pseudocode below.

```
01  testAgainstPool(keyMatrix, p, Ap, Tp, poolq, rng)
02      for all (Aq, Tq) in poolq do
03          do c times
04              yq := (bit vector of size p, chosen randomly using rng)
05              if (testTwo(keyMatrix, Tp, Tq, yq)) then
06                  return (Ap, Aq, yq)
07              end if
08          end do
09      end for
10      return NONEFOUND
```

In this example, the programmed method "testAgainstPool" may be used to test one matrix (as part of a candidate pair of hash functions) against a pool of other hash functions (in order to attempt to form a suitable pair of hash functions for hashing a given set of keys in a lookup circuit). In this example, hash functions are represented by bit matrices Ap and Tp, where Tp is a tabulated representation of Ap. In addition to these inputs, the programmed method "testAgainstPool" takes as arguments "keyMatrix", which represents a set of keys, "poolq" which represents a pool of hash function bit matrices, a positive integer "p", and a source "rng" of random or pseudorandom numbers. In some embodiments, the pool of hash functions may be a collection of other hash functions that have already been considered. In this example, the programmed method "testAgainstPool" repeatedly forms candidate pairs of hash functions (each of which is represented as a tabulated bit matrix) that include a new hash function bit matrix and one of the hash function bit matrices in the pool, and tests them for suitability. If a suitable pair of hash function bit matrices is identified, the method succeeds and returns the pair. In some embodiments, if, after testing the new hash function bit matrix in combination with each hash function bit matrix in the pool, no suitable pair of hash function bit matrices is identified, the new hash function bit matrix may be added to the pool (or to another pool) and the programmed method "testAgainstPool" may be invoked again, with another new candidate hash function bit matrix as an argument. In other embodiments, if, after testing the new hash function bit matrix in combination with each hash function bit matrix in the pool, no suitable pair of hash function bit matrices is identified, the new hash function bit matrix may be discarded. In some embodiments, c (in line 03) may be a positive integer that may be fixed or computed. In some embodiments, c (in line 03) may be the constant 1 (alternatively, lines 03 and 08 may be omitted) and yq (in line 04) may be set equal to a non-random bit vector of size p that may be fixed or deterministically computed, rather than being set to a randomly chosen bit vector.

In some embodiments, the methods described herein for searching a single pool of hash functions for a suitable pair of hash functions may be implemented using program instructions that when executed on one or more computers cause the computer to perform these methods. One embodiment of a programmed method that may be used to search for a suitable pair of hash functions in one pool of hash functions is illustrated by the example pseudocode below.

```
01  searchTwoMatrices1(keyMatrix, p, gen, rng)
02      pool := empty set
03      while (resources not exhausted) do
04          A1 := gen(rng)
05          T1 := tabulate(keyMatrix, A1)
06          result := testAgainstPool(keyMatrix, p, A1, T1, pool, rng)
07          if (result is not NONEFOUND) return result
```

-continued

```
08          pool := pool UNION { (A1, T1) }
09      end while
10      return FAILURE
```

In this example, the programmed method "searchTwoMatrices1" may be used to search for a pair of matrices in one pool of hash function matrices. In this example, the programmed method "searchTwoMatrices1" takes as arguments "keyMatrix", which represents a set of keys, a positive integer "p", a matrix generator "gen", and a source "rng" of random or pseudorandom numbers. In this example, line 02 creates a pool and initializes the pool to the empty set. Then, for each iterative step carried out by the loop in lines 03 through 09, the code on line 04 invokes the matrix generator "gen" to generate a new matrix called A1. Line 05 invokes the programmed method "tabulate" to produce a tabulated representation of A1 called T1. This new matrix T1 is then tested against the pool using the programmed method "testAgainstPool" described above. Note that in the first iteration, there are not any hash function bit matrices in the pool, so the programmed method "testAgainstPool" cannot succeed. When and if it succeeds, the pair of hash function bit matrices identified by the programmed method "testAgainstPool" are returned (as in line 07). Otherwise, line 08 adds the matrix A1 and its tabulation T1 to the pool and the loop is repeated. In some embodiments, new hash function bit matrices may be iteratively generated and tested to determine whether any of them can succeed when paired with a hash function bit matrix for which a tabulated representation already exists in the pool. If not, they may be added to the pool. In this example, every matrix generated may (potentially) be tested against every other matrix that has already been generated until a pair succeeds. In some embodiments, this approach may allow the cost of creating a new hash function bit matrix to be amortized across multiple candidate pair testing exercises.

In some embodiments, the methods described herein for searching two pools of hash functions for a suitable pair of hash functions may be implemented using program instructions that when executed on one or more computers cause the computer to perform these methods. One embodiment of a programmed method that may be used to search for a suitable pair of hash functions using two pools of hash functions is illustrated by the example pseudocode below.

```
01  searchTwoMatrices2(keyMatrix, p, gen1, gen2, rng)
02      pool1 := empty set
03      pool2 := empty set
04      while (resources not exhausted) do
05
06          A1 := gen1(rng)
07          T1 := tabulate(keyMatrix, A1)
08          result := testAgainstPool(keyMatrix, p, A1, T1, pool2, rng)
09          if (result is not NONEFOUND) return result
10          pool1 := pool1 UNION { (A1, T1) }
11
12          A2 := gen2(rng)
13          T2 := tabulate(keyMatrix, A2)
14          result := testAgainstPool(keyMatrix, p, A2, T2, pool1, rng)
15          if (result is not NONEFOUND) return result
16          pool2 := pool2 UNION { (A2, T2) }
17
18      end while
19      return FAILURE
```

In this example, the programmed method "searchTwoMatrices2" may be similar to the programmed method "searchTwoMatrices1" except that it uses two pools of hash function bit matrices rather than one. In this example, the programmed method "searchTwoMatrices2" uses two matrix generators, and these matrix generators may (in some embodiments) use different heuristics when generating hash function bit matrices. In this example, the programmed method "searchTwoMatrices1" takes as arguments "keyMatrix", which represents a set of keys, a positive integer "p", two matrix generators "gen1" and "gen2", and a source "rng" of random or pseudorandom numbers. In this example, the body of the loop on lines 04 to 18 has two sections. In the first section (lines 06 to 10), an attempt is made to identify a suitable pair of hash function bit matrices by testing a new hash function bit matrix against those in the second pool. Specifically, lines 06 to 09 generate a hash function bit matrix A1 (using matrix generator "gen1") that is intended to be added the first pool, tabulate it to produce T1, and then test T1 against every hash function bit matrix in the second pool. If a suitable pair of hash function bit matrices is identified, it is returned (as in line 09). If not, the matrix A1 and its tabulated representation T1 are added to the first pool (in line 10) and the code in lines 12-16 is executed.

In lines 12-16, an attempt is made to identify a suitable pair of hash function bit matrices by testing another new hash function bit matrix against those in the second pool. Specifically, lines 12 to 15 generate a hash function bit matrix A2 (using matrix generator "gen2") that is intended to be added the second pool, tabulate it to produce T2, and then test T2 against every hash function bit matrix in the first pool. If a suitable pair of hash function bit matrices is identified, it is returned (as in line 15). If not, the matrix A2 and its tabulated representation T2 are added to the second pool (in line 16), and the entire loop beginning with line 04 may be repeated until resources are exhausted. Note that in this example, each hash function bit matrix in the first pool may (eventually) be tested against all of the hash function bit matrices in the second pool and vice versa.

In some embodiments, the methods described herein for searching three pools of hash functions for a suitable pair of hash functions may be implemented using program instructions that when executed on one or more computers cause the computer to perform these methods. One embodiment of a programmed method that may be used to search for a suitable pair of hash functions using three pools of hash functions is illustrated by the example pseudocode below.

```
01  searchTwoMatrices3(keyMatrix, p, gen1, gen2, gen3, rng)
02    pool1 := empty set
03    pool2 := empty set
04    pool3 := empty set
05    while (resources not exhausted) do
06
07      A1 := gen1(rng)
08      T1 := tabulate(keyMatrix, A1)
09      result := testAgainstPool(keyMatrix, p, A1, T1, pool2, rng)
10      if (result is not NONEFOUND) return result
11      result := testAgainstPool(keyMatrix, p, A1, T1, pool3, rng)
12      if (result is not NONEFOUND) return result
13      pool1 := pool1 UNION { (A1, T1) }
14
15      A2 := gen2(rng)
16      T2 := tabulate(keyMatrix, A2)
17      result := testAgainstPool(keyMatrix, p, A2, T2, pool3, rng)
18      if (result is not NONEFOUND) return result
19      result := testAgainstPool(keyMatrix, p, A2, T2, pool1, rng)
20      if (result is not NONEFOUND) return result
21      pool2 := pool2 UNION { (A2, T2) }
22
23      A3 := gen3(rng)
24      T13 := tabulate(keyMatrix, A3)
25      result := testAgainstPool(keyMatrix, p, A3, T3, pool1, rng)
26      if (result is not NONEFOUND) return result
27      result := testAgainstPool(keyMatrix, p, A3, T3, pool2, rng)
```

-continued

```
28      if (result is not NONEFOUND) return result
29      pool3 := pool3 UNION { (A3, T3) }
30
31    end while
32    return FAILURE
```

In this example, the programmed method "searchTwoMatrices3" may be used to search for a pair of hash function bit matrices using three pools (each of which has its own matrix generator, and each of which may use different heuristics than the other two). In this example, the programmed method "searchTwoMatrices3" may be similar to the programmed methods "searchTwoMatrices1" and "searchTwoMatrices2", except that it uses three pools of hash function bit matrices rather than one or two. In this example, the programmed method "searchTwoMatrices3" uses three matrix generators, and these matrix generators may (in some embodiments) use different heuristics when generating hash function bit matrices. In this example, the programmed method "searchTwoMatrices3" takes as arguments "keyMatrix", which represents a set of keys, a positive integer "p", three matrix generators "gen1", "gen2", and "gen3", and a source "rng" of random or pseudorandom numbers.

In this example, the body of the loop on lines 05 to 31 has three sections, each of which is similar to one of the two sections in "searchTwoMatrices2". For example, in lines 07 to 13, an attempt is made to identify a suitable pair of hash function bit matrices by testing a new hash function bit matrix against those in the second and third pools. Specifically, lines 07 to 10 generate a hash function bit matrix A1 (using matrix generator "gen1") that is intended to be added the first pool, tabulate it to produce T1, and then test T1 against every hash function bit matrix in the second pool. If a suitable pair of hash function bit matrices is identified, it is returned (as in line 10). If not, T1 is tested against every hash function bit matrix in the third pool. If a suitable pair of hash function bit matrices is identified, it is returned (as in line 12). If not, A1 and its tabulated representation T1 are added to the first pool (in line 13) and the code beginning in line 15 is executed.

In lines 15 to 21, an attempt is made to identify a suitable pair of hash function bit matrices by testing another new hash function bit matrix against those in the third and first pools. Specifically, lines 15 to 18 generate a hash function bit matrix A2 (using matrix generator "gen2") that is intended to be added the second pool, tabulate it to produce T2, and then test T2 against every hash function bit matrix in the third pool. If a suitable pair of hash function bit matrices is identified, it is returned (as in line 18). If not, T2 is tested against every hash function bit matrix in the first pool. If a suitable pair of hash function bit matrices is identified, it is returned (as in line 20). If not, A2 and its tabulated representation T2 are added to the second pool (in line 21) and the code beginning in line 23 is executed.

Finally, in lines 23 to 29, an attempt is made to identify a suitable pair of hash function bit matrices by testing yet another new hash function bit matrix against those in the first and second pools. Specifically, lines 23 to 26 generate a hash function bit matrix A3 (using matrix generator "gen3") that is intended to be added the third pool, tabulate it to produce T3, and then test T3 against every hash function bit matrix in the first pool. If a suitable pair of hash function bit matrices is identified, it is returned (as in line 26). If not, T3 is tested against every hash function bit matrix in the second pool. If a suitable pair of hash function bit matrices is identified, it is returned (as in line 28). If not, A3 and its tabulated representation T3 are added to the third pool (in line 29), and the entire loop beginning with line 07 may be repeated until resources are exhausted. Note that in this example, each hash function bit matrix in the each pool may (eventually) be tested against all of the hash function bit matrices in the other pools. Note that in other embodiments, different numbers and/or combinations of matrix generators and pools may be used to identify a collection of hash function bit matrices that are suitable for hashing a collection of keys in a lookup circuit.

In some embodiments, the methods described herein for testing three hash functions using tabulated values may be implemented using program instructions that when executed on one or more computers cause the computer to perform these methods. One embodiment of a programmed method that may be used to test three hash functions using tabulated values is illustrated by the example pseudocode below.

```
01  testThree(keyMatrix, Tp, Tq, yq, Tr, yr)
02    k := number of columns in keyMatrix
03    if (the three hash functions
04        (j => Tp[j]), (j => Tq[j] XOR yq), and (j => Tr[j] XOR yr)
05        are suitable for hashing the set of values
06        { 0, 1, ..., k – 1 } ) then
07        return true
08    else
09        return false
10    end if
```

In this example, the programmed method "testThree" may be used an embodiment in which there are three hash function sub-circuits, rather than two, and may be used to identify a suitable set of three hash function bit matrices for hashing a collection of keys. In this example, the programmed method "testThree" takes as arguments "keyMatrix", which represents a set of keys, three pre-tabulated hash functions Tp, Tq, and Tr, and two bit vectors yq and yr, and tests them to determine if the three hash function bit matrices are suitable for hashing the set of keys in "keyMatrix". As previously noted, suitability may be dependent on the particular lookup circuit in which the corresponding hash functions will be implemented and/or on the application in which the lookup circuit is used.

In some embodiments, the methods described herein for testing a new hash function against two pools of hash functions may be implemented using program instructions that when executed on one or more computers cause the computer to perform these methods. One embodiment of a programmed method that may be used to test a new hash function against two pools of hash functions is illustrated by the example pseudocode below.

```
01  testAgainstTwoPools(keyMatrix, p, Ap, Tp, poolq, poolr, rng)
02    for all (Aq, Tq) in poolq do
03      for all (Ar, Tr) in poolr do
04        do c times
05          yq := (a bit vector of size p,
06              chosen randomly using rng)
07          yr := (a bit vector of size p,
08              chosen randomly using rng)
09          if (testThree(keyMatrix, Tp, Tq, yq, Tr, yr)) then
10            return (Ap, Aq, yq, Ar, yr)
11          end if
12        end do
13      end for
14    end for
15    return NONEFOUND
```

In this example, the programmed method "testAgainstTwoPools" may be used to test one new candidate hash function matrix against two pools of hash function matrices, in an attempt to identify a set of three hash functions that are suitable for hashing a set of keys in a lookup circuit that includes three hash function sub-circuits. In this example, the programmed method "testAgainstTwoPools" is similar to the programmed method "testAgainstPool" except that it includes two nested loops to test combinations of hash function bit matrices and calls the programmed method "testThree" (described above) in the interior loop to test each candidate collection of three hash function bit matrices, rather than the programmed method "testTwo" (which tests a candidate pair of hash function bit matrices). In some embodiments, c (in line 04) may be a positive integer that may be fixed or computed. In some embodiments, c (in line 04) may be the constant 1 (alternatively, lines 04 and 12 may be omitted) and yq (in lines 05-06) may be set equal to a non-random bit vector of size p that may be fixed or deterministically computed, rather than being set to a randomly chosen bit vector. In some embodiments, c (in line 04) may be the constant 1 (alternatively, lines 04 and 12 may be omitted) and yr (in lines 07-08) may be set equal to a non-random bit vector of size p that may be fixed or deterministically computed, rather than being set to a randomly chosen bit vector.

In some embodiments, the methods described herein for searching for a suitable triplet of hash functions using three pools of hash functions may be implemented using program instructions that when executed on one or more computers cause the computer to perform these methods. One embodiment of a programmed method that may be used to search for a suitable triplet of hash functions using three pools of hash functions is illustrated by the example pseudocode below.

```
01  searchThree(keyMatrix, p, gen1, gen2, gen3)
02    pool1 := empty set
03    pool2 := empty set
04    pool3 := empty set
05    while resources not exhausted do
06
07      A1 := gen1(rng)
08      T1 := tabulate(keyMatrix, A1)
09      result := testAgainstTwoPools(keyMatrix, p, A1, T1,
10          pool2, pool3, rng)
11      if (result is not NONEFOUND) return result
12      pool1 := pool1 UNION { (A1, T1) }
13
14      A2 := gen2(rng)
15      T2 := tabulate(keyMatrix, A2)
16      result := testAgainstTwoPools(keyMatrix, p, A2, T2,
17          pool3, pool1, rng)
18      if (result is not NONEFOUND) return result
19      pool2 := pool2 UNION { (A2, T2) }
20
21      A3 := gen3(rng)
22      T3 := tabulate(keyMatrix, A3)
23      result := testAgainstTwoPools(keyMatrix, p, A3, T3,
24          pool1, pool2, rng)
25      if (result is not NONEFOUND) return result
26      pool3 := pool3 UNION { (A3, T3) }
27
28    end while
29    return FAILURE
```

In this example, the programmed method "searchThree" may be used to search for a collection of three hash function bit matrices using three pools (each of which has its own matrix generator, and each of which may generate hash function bit matrices using different heuristics than the other two). In this example, the programmed method "searchThree" takes as arguments "keyMatrix", which represents a set of keys, a positive integer "p", three matrix generators "gen1", "gen2", and "gen3", and a source "rng" of random or pseudorandom numbers. In this example, the loop in lines 07 to 28 includes three sections that are similar to the sections in programmed method "searchTwoMatrices3" except that they are configured to identify suitable sets of three hash function bit matrices from the three pools (including one hash function bit matrix from each pool) rather than two hash function bit matrices.

In some embodiments, the methods described herein for computing three matrices and two bit vectors for use in hash functions may be implemented using program instructions that when executed on one or more computers cause the computer to perform these methods. One embodiment of a programmed method that may be used to compute three matrices and two bit vectors for use in hash functions is illustrated by the example pseudocode below.

```
01  generateThreeHashFunctions(keyMatrix, p, rng)
02    gen1 := makeMatrixGenerator(keyMatrix, p, rng)
03    gen2 := makeMatrixGenerator(keyMatrix, p, rng)
04    gen3 := makeMatrixGenerator(keyMatrix, p, rng)
05    return searchThree(keyMatrix, p, gen1, gen2, gen3, rng)
```

In this example, the programmed method "generateThreeHashFunctions" may be used to create three matrix generators, and to immediately invokes the programmed method "searchThree" (as described above) with the three newly created matrix generators "gen1", "gen2", and "gen3" as arguments to generate three hash function bit matrices (which are returned in line 05). In this example, the programmed method "generateThreeHashFunctions" accepts as arguments keyMatrix", which represents a set of keys, a positive integer "p", and a source "rng" of random or pseudorandom numbers. Note that in various embodiments, any of the programmed methods for creating matrix generators described herein (including those that do and do not employ any of the heuristics described herein) may be used to create the matrix generators "gen1", "gen2", and/or "gen3" in lines 02 to 04.

Note that it can be proven mathematically that a cycle-free undirected graph with V vertices can have at most V−1 edges. As described herein, all k keys of a set S of key-value pairs may be represented as edges between nodes of a graph constructed by two generated hash functions. Therefore, in at least some embodiments of the circuits and methods described herein, in order to generate hash functions that produce a cycle-free graph for given a set of keys, "p" (the positive integer that indicates the desired number of bits in each hash value) may be chosen such that $k < 2^p$. Note that larger values of p may be chosen to accelerate the generation of suitable hash functions. Note also that smaller values of p may be chosen if the graph does not have be cycle-free (for example, if the BMZ algorithm is used). Note, however, that "p" may be fixed for a particular hardware circuit, in which case the methods described herein may be used to determine whether a given set of keys can be handled by that hardware circuit.

In various embodiments, the programmed methods described herein may be used in a variety of combinations to support the implementation of the lookup circuits described herein (e.g., to generate, choose, and/or determine the suitability of matrix generators, random bit matrices, sparse random bit matrices, hash functions, and/or pairs of hash functions, and/or to initialize or otherwise load various elements of the lookup circuits or of the tables and/or hash function sub-circuits thereof).

In some embodiments, at least one hash function may be represented not as a data structure (such as that described above), but instead as a table (which may be an array or a hash table) that is indexed by key values and that stores corresponding hash values. In such embodiments, each invocation of the function "hash" described above, for example "hash (keys[k], hf1)", may be replaced by a table access, for example "hf1[keys[k]]" or "hf1.get(keys[k])". In other embodiments, at least one hash function may be represented not as a data structure, but instead as a function of the host language (which may represented in the program text by a so-called "lambda expression" or its equivalent) that accepts a key value as an argument and returns a corresponding hash value. In such embodiments, each invocation of the function "hash" described above, for example "hash(keys[k], hf1)", may be replaced by a function call, for example "hf1 (keys[k])". In still other embodiments, at least one hash function may be represented not as a data structure, but instead as an array that is indexed by integers that are suitable indices for the array "keys" and whose elements are hash values corresponding to the keys in array "keys" such that element j in this table is the hash value for element j of the array "keys". In such embodiments, each invocation of the function "hash" described above, for example "hash(keys[k], hf1)", may be replaced by an array access, for example "hf1[k]".

In various embodiments, the programmed methods described above may be used in a variety of combinations to support the implementation of the lookup circuits described herein (e.g., to generate, choose, and/or determine the suitability of matrix generators, random bit matrices, sparse random bit matrices, hash functions, and/or pairs of hash functions, and/or to initialize or otherwise load various elements of the lookup circuits or of the tables and/or hash function sub-circuits thereof).

Note that in some embodiments of the lookup circuits described herein, the write-enable signals and key-data/in signals may be omitted. In such embodiments, some other means may be used to specify (and/or load) the contents of the memories in the lookup circuits or to specify the contents of a memory in another technology that supports the reading and writing of information (including, but not limited to, flash memory technology). In other embodiments, the RAM circuits illustrated in the figures and described herein may be replaced with some form of read-only memory technology and the write-enable signals and key-data/in signals of these lookup circuits may be omitted.

It will be appreciated by one of ordinary skill in the art that the specific choice to store an r-bit key and d bits of associated data into a memory word by storing the key into the leftmost r bits and the associated data into the rightmost d bits is only one illustrative choice among many, that other ways of storing or encoding an r-bit key and d bits of associated data into a memory word holding at least r+d bits are possible, and that these and other such design variations fall within the spirit and scope of this disclosure. For example, in one embodiment, data representing the key may be stored in the rightmost r bits of a memory word and the associated data may be stored in the leftmost d bits of the memory word. In another example, the bits representing the key and the bits representing the associated data may be interleaved within a memory word, in some embodiments. Similar remarks apply to the storing of both data and index information within a single memory word.

While the lookup circuits 500 and 600 described herein illustrate a query process that performs computation and memory accesses in combinatorial logic, it will be appreciated by one of ordinary skill in the art that in other embodiments, the computation and memory accesses may be performed sequentially and may be divided into multiple pipeline stages, while still falling within the spirit and scope of the present disclosure.

Note also that in various embodiments of the lookup circuits 500 and 600, the hash function sub-circuits included in those lookup circuits may be implemented in FPGAs or using any other suitable implementations of the hash function circuitry described herein. In general, any or all of the hash functions described herein may be defined through memory content, may be implemented in fixed combinatorial logic (e.g., gates), may be implemented in programmable combinatorial logic, or may be implemented using any combination of these and other technologies suitable for implementing the functionality of a hash function sub-circuit. In some design environments (e.g., those that utilize FPGAs), high-density SRAMs may be readily available for use in implementing the techniques described herein, while the construction of CAMs could be costly in terms of resources.

Figure 14:
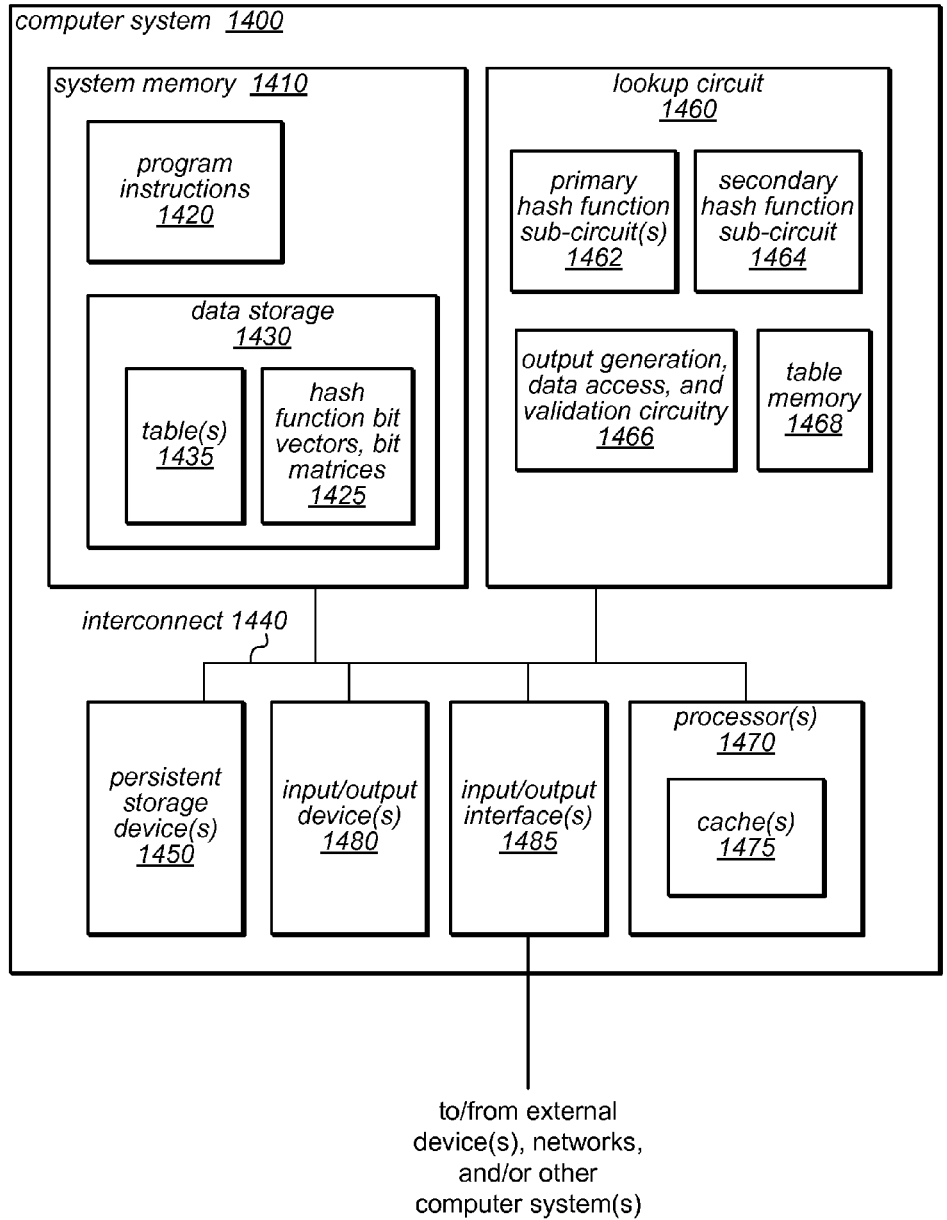
FIG. 14 is a block diagram illustrating one embodiment of a computing system that is configured to generate hash functions suitable for implementation within a hash function evaluation circuit or lookup circuit (and/or bit matrices thereof) and/or to perform lookup operations using such circuits.

The techniques described herein for implementing and configuring lookup circuits (which may include generating representations of various hash functions, testing them for suitability with the lookup circuits, and/or loading them into hash function sub-circuits), evaluating hash functions using such circuits, and/or accessing data in a lookup table using these techniques may be implemented on or by any of a variety of computing systems, in different embodiments. For example, the hash function evaluation circuits and lookup circuits described herein may be implemented in various circuit-level network processing devices including network interface cards, network processors, smart routers/switches, etc., according to different embodiments. In different embodiments, these circuits may be implemented within a single hardware device (e.g., a single chip, card, and/or apparatus), or the functionality of these circuits may be partitioned across multiple hardware devices (e.g., multiple chips on the same card or on different cards). FIG. 14 illustrates a computer system 1400 that is configured to implement generating hash functions suitable for implementation within a hash function evaluation circuit or lookup circuit (and/or bit matrices thereof), configuring lookup circuits (which may include generating representations of various hash functions, testing them for suitability with the lookup circuits, and/or loading them into hash function sub-circuits), evaluating hash functions using such circuits, and/or accessing data in a lookup table using these techniques, according to various embodiments. The computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In various embodiments, one or more of the mechanisms for implementing configuring lookup circuits (which may include generating representations of various hash functions, testing them for suitability with the lookup circuits, and/or loading them into hash function sub-circuits), evaluating hash functions using such circuits, and/or accessing data in a lookup table using these techniques, as described herein, may be provided as a computer program product, or software, that may include a non-transitory, computer-readable storage medium having stored thereon instructions, which may be used to program a computer system 1400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette or hard disk); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1400 may include one or more processors 1470; each may include multiple cores, any of which may be single or multi-threaded. For example, multiple processor cores may be included in a single processor chip (e.g., a single processor 1470), and multiple processor chips may be included in computer system 1400. Each of the processors 1470 may include a cache or a hierarchy of caches 1475, in various embodiments. For example, each processor chip 1470 may include multiple L1 caches (e.g., one per processor core) and one or more other caches (which may be shared by the processor cores on a single processor). The computer system 1400 may also include one or more persistent storage devices 1450 (e.g. optical storage, magnetic storage, hard drive, tape drive, solid state memory, etc.) one or more system memories 1410 (e.g., one or more of cache, SRAM, DRAM, RDRAM, EDO RAM, DDR 10 RAM, SDRAM, Rambus RAM, EEPROM, etc.), one or more input/output interfaces 1485, and/or one or more input/output devices 1480 (e.g., keyboards, monitors, etc.). Other embodiments may include more, fewer, or different components than those illustrated in FIG. 14. For example, some embodiments may include additional components not illustrated in FIG. 14 (e.g., video cards, audio cards, additional network interfaces, peripheral devices, a network interface such as an ATM interface, a Frame Relay interface, an Ethernet interface, an Infiniband interface, etc.)

As illustrated in FIG. 14, the one or more processors 1470, the storage device(s) 1450, the input/output devices 1480, the input/output interfaces 1485, and the system memory 1410 may be coupled to the system interconnect 1440. One or more of the system memories 1410 may contain program instructions 1420. Program instructions 1420 may be executable to implement one or more applications, which may include application source code and/or executable application code that is configured to generate bit matrices (e.g., random bit matrices and/or sparse random bit matrices), generate a set of hash functions (e.g., perfect hash functions, minimal perfect hash functions or other types of hash functions), test pairs of hash functions for suitability in hashing a collection of keys, load various hash functions into a lookup circuit or a hash function evaluation circuit or otherwise program a lookup circuit or a hash function evaluation circuit to implement one or more hash functions, load information for key-value pairs in a lookup table, and/or initiate a table lookup operation that uses a lookup circuit or a hash function evaluation circuit to access the data associated with a presented key, as described herein. In some embodiments, program instructions 1420 may also include shared libraries, operating systems, or a compiler (e.g., one that compiles a user program written in a domain-specific programming language and/or a comma-separated values file to generate a lookup circuit configuration or a hash function evaluation circuit configuration that implements one or more selected hash functions).

Program instructions 1420 may be encoded in platform native binary, any interpreted language such as Java™ bytecode, or in any other language such as C/C++, Java™, etc., or in any combination thereof. In various embodiments, components and/or functions implemented by program instructions 1420 (e.g., compilers, applications, operating systems, and/or shared libraries) may each be implemented in any of various programming languages or methods. For example, in one embodiment, one or more components or functions implemented by program instructions 1420 may be Java based, while in another embodiment they may be written using the C or C++ programming languages. Similarly, applications may be written using Java, C, C++, or another programming language, according to various embodiments. Moreover, in some embodiments, the different components or functions implemented by program instructions 1420 may not be implemented using the same programming language. For example, an application implemented by program instructions 1420 may be C++ based, while a compiler implemented by program instructions 1420 may be developed using C.

In various embodiments, the program instructions 1420 may include any or all of the functions, operations, or procedures, and/or other processes for implementing configuring lookup circuits (which may include generating representations of various hash functions, testing them for suitability with the lookup circuits, and/or loading them into hash function sub-circuits), evaluating hash functions using such circuits, and/or accessing data in a lookup table using these techniques, as described herein. The system memory 1410 may further comprise data storage locations 1430 where data may be stored. For example, in some embodiments, data storage locations 1430 may store data that is associated with one or more sets of keys in lookup tables (e.g., data storage locations 1435 may include storage for one or more single-ported or dual-ported memories, each of which may store one or more lookup tables) or may store data for bit matrices, tabulated bit matrices, or bit vectors in one or more arrays (e.g. in data storage locations 1425). In other embodiments, data storage locations 1430 may store data in one or more hash tables (e.g., in data storage locations 1435), or may store parameter values, configuration information, and/or any other data usable to implement the techniques described herein for generating and/or using one or more hash evaluation circuits or hash function sub-circuits, some of which may include values that are configurable by the programmer or by a user (e.g., data storage locations 1435 within 1430 may include storage for one or more memories each of which may store one or more hash tables for various hash function sub-circuits).

As illustrated in FIG. 14, in some embodiments, computer system 1400 may include one or more hash evaluation circuits, such as lookup circuit 1460. As illustrated in this example, each lookup circuit 1460 may include one or more hash function sub-circuit(s) 1462, a selection sub-circuit 1464, and circuitry 1466 for performing output generation (which may include computational logic that modifies data values obtained from a lookup table before or after selection), data access, and key validation. In this example, lookup circuit 1460 also includes table memory 1468, which may include one or more memories, each of which may store one or more hash tables and/or lookup tables, such as those described herein. In other embodiments, one or more of these hash tables may be stored in memory included within hash function sub-circuits 1462 and/or output generation, data access, and validation circuitry 1466.

In some embodiments, interconnect 1440 may be configured to couple processor(s) 1470 and/or lookup circuit 1460 directly to a computer system network. In other embodiments, these (or other) components of computer system 1400 may be coupled to one or more external devices, network(s), and/or other computer system(s) through interconnect 1440 and input/output interface(s) 1485. For example, in some embodiments, computer system 1400 may include an interface 1485 through which network packets are received from one or more other computer systems (some of which may be similar to computer system 1400). These packets may then be routed to lookup circuit 1460 in order to perform a table lookup operation on information (keys) contained in those packets, as described herein. In some embodiments, interconnect 1470 and input/output interface(s) 1485 may be configured to implement one or more of various interface or network standards, e.g., Peripheral Component Interconnect (PCI), Ethernet, HyperTransport (HT), Infiniband, or any variant or successor of these or other suitable input/output protocols. In other embodiments, one or more of interconnect 1470 and input/output interface(s) 1485 may be configured to implement a custom interface.

Although the embodiments above have been described in considerable detail, numerous variations and modifications will become apparent to those skilled in the art once the above disclosure is fully appreciated. For example, although many of the embodiments are described in terms of particular types of data structures (e.g., hash tables), it should be noted that the techniques and mechanisms disclosed herein for implementing configuring lookup circuits (which may include generating representations of various hash functions, testing them for suitability with the lookup circuits, and/or loading them into hash function sub-circuits), evaluating hash functions using such circuits, and/or accessing data in a lookup table using these techniques may be applicable in other contexts and/or using structures and procedures other than those described in the examples herein. It is intended that the following claims be interpreted to embrace all such variations and modifications.

What is claimed:
1. A method, comprising:
  receiving data representing a collection of keys for multiple key-value pairs to be evaluated in a lookup circuit;
  generating a tabulated representation of a candidate hash function, wherein said generating comprises:
    generating the candidate hash function;
    applying the candidate hash function to the data representing the collection of keys to produce a collection of hash values for the candidate hash function; and
    storing the collection of hash values for the candidate hash function in a data structure as a tabulated representation of the candidate hash function;
  determining whether a set of hash functions comprising the candidate hash function and another hash function is suitable for hashing the collection of keys in the lookup circuit, wherein said determining comprises obtaining a tabulated representation of the other hash function from a pool of tabulated representations of hash functions; and
  in response to determining that the set of hash functions is not suitable for hashing the collection of keys in the lookup circuit:
    determining whether another set of hash functions comprising the candidate hash function and a different other hash function is suitable for hashing the collection of keys in the lookup circuit, wherein said determining comprises obtaining a tabulated representation of the different other hash function from a pool of tabulated representations of hash functions.

2. The method of claim 1, further comprising:
placing the tabulated representation of the candidate hash function in a pool of tabulated representations of hash functions.

3. The method of claim 1,
wherein the pool of tabulated representations of hash functions is one of two or more pools of tabulated representations of hash functions; and
wherein said determining whether another set of hash functions comprising the candidate hash function and a different other hash function is suitable for hashing the collection of keys in the lookup circuit comprises obtaining the tabulated representation of the different other hash function from a pool of tabulated representations of hash functions other than the pool of tabulated representations of hash functions from which the tabulated representation of the other hash function was obtained.

4. The method of claim 3, further comprising:
in response to determining that the set of hash functions is not suitable for hashing the collection of keys in the lookup circuit:
placing the tabulated representation of the candidate hash function in the pool of tabulated representations of hash functions from which the tabulated representation of the different other hash function was obtained.

5. The method of claim 1, further comprising:
in response to determining that the other set of hash functions is not suitable for hashing the collection of keys in the lookup circuit:
generating a tabulated representation of another candidate hash function, wherein said generating comprises:
generating the other candidate hash function;
applying the other candidate hash function to the data representing the collection of keys to produce a collection of hash values for the other candidate hash function; and
storing the collection of hash values for the other candidate hash function in a data structure as a tabulated representation of the other candidate hash function; and
determining whether a third set of hash functions comprising the other candidate hash function and another hash function is suitable for hashing the collection of keys in the lookup circuit, wherein said determining comprises obtaining a tabulated representation of the other hash function from a pool of tabulated representations of hash functions.

6. The method of claim 1,
wherein the set of hash functions comprises the candidate hash function and two or more other hash functions; and
wherein said determining whether the set of hash functions is suitable for hashing the collection of keys in the lookup circuit comprises obtaining tabulated representations of the two or more other hash functions from respective ones of two or more pools of tabulated representations of hash functions.

7. The method of claim 1,
wherein said receiving data representing a collection of keys comprises receiving a plurality of bit vectors, each representing a key in the collection of keys;
wherein said generating the candidate hash function comprises generating a bit matrix; and
wherein said applying the candidate hash function to the data representing the collection of keys comprises multiplying each of the plurality of bit vectors representing the keys with the bit matrix.

8. The method of claim 7, wherein said generating a bit matrix comprises:
performing a pre-processing operation that eliminates at least some bit positions in the bit vectors representing the keys and produces pre-computed key matrix data; and
generating the bit matrix dependent on the pre-computed key matrix data.

9. The method of claim 7, wherein said applying the candidate hash function to the data representing the collection of keys further comprises adding a constant bit vector to the results of multiplying each of the plurality of bit vectors representing the keys with the bit matrix.

10. The method of claim 1, wherein for at least one of the hash functions, the representation of the hash function comprises a random bit matrix that meets a pre-defined sparseness constraint.

11. A non-transitory, computer-readable storage medium storing program instructions that when executed on one or more computers cause the one or more computers to perform:
receiving data representing a collection of keys for multiple key-value pairs to be evaluated in a lookup circuit;
generating a tabulated representation of a candidate hash function, wherein said generating comprises:
generating the candidate hash function;
applying the candidate hash function to the data representing the collection of keys to produce a collection of hash values for the candidate hash function; and
storing the collection of hash values for the candidate hash function in a data structure as a tabulated representation of the candidate hash function;
determining whether a set of hash functions comprising the candidate hash function and another hash function is suitable for hashing the collection of keys in the lookup circuit, wherein said determining comprises obtaining a tabulated representation of the other hash function from a pool of tabulated representations of hash functions;
in response to determining that the set of hash functions is not suitable for hashing the collection of keys in the lookup circuit:
determining whether another set of hash functions comprising the candidate hash function and a different other hash function is suitable for hashing the collection of keys in the lookup circuit, wherein said determining comprises obtaining a tabulated representation of the different other hash function from a pool of tabulated representations of hash functions.

12. The non-transitory, computer-readable storage medium of claim 11, wherein when executed on the one or more computers the program instructions further cause the one or more computers to perform:
in response to determining that the other set of hash functions is not suitable for hashing the collection of keys in the lookup circuit:
placing the tabulated representation of the candidate hash function in a pool of tabulated representations of hash functions;
generating a tabulated representation of another candidate hash function, wherein said generating comprises:
generating the other candidate hash function;
applying the other candidate hash function to the data representing the collection of keys to produce a collection of hash values for the other candidate hash function; and storing the collection of hash values for the other candidate hash function in a data structure as a tabulated representation of the other candidate hash function; and determining whether a third set of hash functions comprising the other candidate hash function and another hash function is suitable for hashing the collection of keys in the lookup circuit, wherein said determining comprises obtaining a tabulated representation of the other hash function from a pool of tabulated representations of hash functions.

13. The non-transitory, computer-readable storage medium of claim 11, wherein said receiving data representing a collection of keys comprises receiving a plurality of bit vectors, each representing a key in the collection of keys;

wherein said generating the candidate hash function comprises generating a bit matrix;

wherein said applying the candidate hash function to the data representing the collection of keys comprises multiplying each of the plurality of bit vectors representing the keys with the bit matrix;

wherein said generating a bit matrix comprises one or more of:

performing a pre-processing operation that eliminates at least some bit positions in the bit vectors representing the keys;

performing a pre-processing operation that computes a diversity metric or a criticality metric for at least some of the bit positions in the plurality of bit vectors representing the keys;

applying a permutation to one or more rows of the bit matrix;

applying a permutation to one or more columns of the bit matrix;

constructing the bit matrix so as to mathematically guarantee that it is of full rank; or using Boolean Gaussian elimination to determine whether the bit matrix is of full rank.

14. A method, comprising:

receiving data representing a collection of keys for multiple key-value pairs to be evaluated in a lookup circuit, wherein said receiving comprises receiving a plurality of bit vectors, each representing a key in the collection of keys;

generating a candidate hash function, wherein said generating the candidate hash function comprises generating a bit matrix, and wherein said generating a bit matrix comprises:

performing a pre-processing operation that eliminates at least some bit positions in the bit vectors representing the keys and produces pre-computed key matrix data; and generating the bit matrix dependent on the pre-computed key matrix data;

determining whether a set of hash functions comprising the candidate hash function and another hash function is suitable for hashing the collection of keys in the lookup circuit; and in response to determining that the set of hash functions is not suitable for hashing the collection of keys in the lookup circuit, determining whether another set of hash functions comprising the candidate hash function and a different other hash function is suitable for hashing the collection of keys in the lookup circuit.

15. The method of claim 14, wherein said performing a pre-processing operation comprises:

eliminating one or more bit positions in the bit vectors representing the keys for which the values are constant; or using Boolean Gaussian elimination to identify one or more bit positions in the bit vectors representing the keys that are linearly dependent on other bit positions in the bit vectors representing the keys.

16. The method of claim 14, wherein said generating a bit matrix comprises applying a permutation to one or more rows of the bit matrix or applying a permutation to one or more columns of the bit matrix.

17. The method of claim 16, wherein said generating a bit matrix comprises performing a pre-processing operation that computes a diversity metric or a criticality metric for at least some of the bit positions in the plurality of bit vectors representing the keys; and wherein said applying a permutation to one or more columns of the bit matrix is dependent on the diversity metric or the criticality metric.

18. The method of claim 14, wherein said generating a bit matrix comprises constructing the bit matrix so as to mathematically guarantee that it is of full rank or using Boolean Gaussian elimination to determine whether the bit matrix is of full rank.

19. The method of claim 14, wherein the method further comprises, prior to said determining whether a set of hash functions comprising the candidate hash function and another hash function is suitable for hashing the collection of keys in the lookup circuit, generating a bit matrix for the other hash function; and wherein said generating the bit matrix for the other hash function comprises applying a pre-processing operation that eliminates at least some bit positions in the bit vectors representing the keys, applying a permutation to one or more rows of the bit matrix, or applying a permutation to one or more columns of the bit matrix.

20. The method of claim 19, wherein said generating the bit matrix comprises applying a different pre-processing operation than the pre-processing operation that was applied in said generating the bit matrix for the other hash function or applying a different permutation than a permutation that was applied in said generating the bit matrix for the other hash function.

21. The method of claim 14, wherein the method further comprises:

applying the candidate hash function to the data representing the collection of keys to produce a collection of hash values for the candidate hash function; and storing the collection of hash values for the candidate hash function in a data structure as a tabulated representation of the candidate hash function;

wherein said determining whether a set of hash functions comprising the candidate hash function and another hash function is suitable for hashing the collection of keys in the lookup circuit comprises obtaining a tabulated representation of the other hash function from a pool of tabulated representations of hash functions.

22. The method of claim 21, wherein said applying the candidate hash function to the data representing the collection of keys comprises:

multiplying each of the plurality of bit vectors representing the keys with the bit matrix; and adding a constant bit vector to the results of multiplying each of the plurality of bit vectors representing the keys with the bit matrix.

23. A non-transitory, computer-readable storage medium storing program instructions that when executed on one or more computers cause the one or more computers to perform:
receiving data representing a collection of keys for multiple key-value pairs to be evaluated in a lookup circuit, wherein said receiving comprises receiving a plurality of bit vectors, each representing a key in the collection of keys;
generating a candidate hash function, wherein said generating the candidate hash function comprises generating a bit matrix, and wherein said generating a bit matrix comprises:
performing a pre-processing operation that eliminates at least some bit positions in the bit vectors representing the keys and produces pre-computed key matrix data; and
generating the bit matrix dependent on the pre-computed key matrix data;
determining whether a set of hash functions comprising the candidate hash function and another hash function is suitable for hashing the collection of keys in the lookup circuit; and
in response to determining that the set of hash functions is not suitable for hashing the collection of keys in the lookup circuit, determining whether another set of hash functions comprising the candidate hash function and a different other hash function is suitable for hashing the collection of keys in the lookup circuit.

24. The computer-readable storage medium of claim 23, wherein said generating a bit matrix comprises one or more of:
eliminating one or more bit positions in the bit vectors representing the keys for which the values are constant;
using Boolean Gaussian elimination to identify one or more bit positions in the bit vectors representing the keys that are linearly dependent on other bit positions in the bit vectors representing the keys;
performing a pre-processing operation that computes a diversity metric or a criticality metric for at least some of the bit positions in the plurality of bit vectors representing the keys;
applying a permutation to one or more rows of the bit matrix;
applying a permutation to one or more columns of the bit matrix;
constructing the bit matrix so as to mathematically guarantee that it is of full rank; or
using Boolean Gaussian elimination to determine whether the bit matrix is of full rank.

25. The computer-readable storage medium of claim 23, wherein when executed on the one or more computers the program instructions further cause the one or more computers to perform:
applying the candidate hash function to the data representing the collection of keys to produce a collection of hash values for the candidate hash function, wherein said applying the candidate hash function to the data representing the collection of keys comprises multiplying each of the plurality of bit vectors representing the keys with the bit matrix; and
storing the collection of hash values for the candidate hash function in a data structure as a tabulated representation of the candidate hash function; and
wherein said determining whether a set of hash functions comprising the candidate hash function and another hash function is suitable for hashing the collection of keys in the lookup circuit comprises obtaining a tabulated representation of the other hash function from a pool of tabulated representations of hash functions.

26. A system, comprising:
one or more processors; and
a memory coupled to the one or more processors and storing program instructions that when executed on the one or more processors cause the one or more processors to perform:
receiving data representing a collection of keys for multiple key-value pairs to be evaluated in a lookup circuit, wherein said receiving comprises receiving a plurality of bit vectors, each representing a key in the collection of keys;
generating a candidate hash function, wherein said generating the candidate hash function comprises generating a bit matrix, and wherein said generating a bit matrix comprises:
performing a pre-processing operation that eliminates at least some bit positions in the bit vectors representing the keys and produces pre-computed key matrix data; and
generating the bit matrix dependent on the pre-computed key matrix data;
determining whether a set of hash functions comprising the candidate hash function and another hash function is suitable for hashing the collection of keys in the lookup circuit; and
in response to determining that the set of hash functions is not suitable for hashing the collection of keys in the lookup circuit, determining whether another set of hash functions comprising the candidate hash function and a different other hash function is suitable for hashing the collection of keys in the lookup circuit.

27. The system of claim 26,
wherein said generating a bit matrix comprises one or more of:
eliminating one or more bit positions in the bit vectors representing the keys for which the values are constant;
using Boolean Gaussian elimination to identify one or more bit positions in the bit vectors representing the keys that are linearly dependent on other bit positions in the bit vectors representing the keys;
performing a pre-processing operation that computes a diversity metric or a criticality metric for at least some of the bit positions in the plurality of bit vectors representing the keys;
applying a permutation to one or more rows of the bit matrix;
applying a permutation to one or more columns of the bit matrix;
constructing the bit matrix so as to mathematically guarantee that it is of full rank; or
using Boolean Gaussian elimination to determine whether the bit matrix is of fill rank.

28. The system of claim 26, wherein when executed on the one or more processors the program instructions further cause the one or more processors to perform:
    in response to determining that the set of hash functions is suitable for hashing the collection of keys in the lookup circuit, transferring a representation of each of the hash functions in the set of hash functions to the lookup circuit.

\* \* \* \* \*